(12) United States Patent
Wolters et al.

(10) Patent No.: US 11,249,579 B2
(45) Date of Patent: Feb. 15, 2022

(54) DEVICES, METHODS, AND GRAPHICAL USER INTERFACES FOR MANIPULATING EMBEDDED INTERACTIVE CONTENT

(71) Applicant: Apple Inc., Cupertino, CA (US)

(72) Inventors: Glenn Wolters, San Jose, CA (US); Michel Elings, Bussum (NL)

(73) Assignee: APPLE INC., Cupertino, CA (US)

( * ) Notice: Subject to any disclaimer, the term of this patent is extended or adjusted under 35 U.S.C. 154(b) by 643 days.

(21) Appl. No.: 15/620,716

(22) Filed: Jun. 12, 2017

(65) Prior Publication Data

US 2017/0357402 A1 Dec. 14, 2017

Related U.S. Application Data

(60) Provisional application No. 62/349,039, filed on Jun. 12, 2016.

(51) Int. Cl.
| | | |
|---|---|---|
| *G06F 3/041* | (2006.01) | |
| *G06F 3/0488* | (2013.01) | |
| *G06F 3/0484* | (2013.01) | |
| *G06F 3/0485* | (2013.01) | |

(Continued)

(52) U.S. Cl.
CPC .......... *G06F 3/0416* (2013.01); *G06F 3/016* (2013.01); *G06F 3/0485* (2013.01); *G06F 3/0488* (2013.01); *G06F 3/04815* (2013.01); *G06F 3/04845* (2013.01); *G06F 3/04847* (2013.01); *G06F 3/04883* (2013.01); *G06F 3/04842* (2013.01); *G06F 2203/04806* (2013.01)

(58) Field of Classification Search
CPC .............. G06F 3/0416; G06F 3/04842; G06F 3/04847; G06F 3/04883; G06F 3/0488; G06F 3/04845; G06F 3/0485; G06F 3/04815; G06F 3/016; G06F 2203/04806
See application file for complete search history.

(56) References Cited

U.S. PATENT DOCUMENTS 8,209,628 B1 * 6/2012 Davidson .............. G06F 3/0487
715/790
8,477,109 B1 * 7/2013 Freed .................. G06F 3/04842
345/173

(Continued)

*Primary Examiner* — David S Posigian
(74) *Attorney, Agent, or Firm* — Morgan, Lewis & Bockius LLP

(57) ABSTRACT

An electronic device: displays an interactive UI object that conditionally exhibits respective interactive behavior responsive to changes in detected contact intensity, and content that does not exhibit the respective interactive behavior. The device detects a first input over the interactive UI object. In accordance with a determination that the first input meets first appearance-manipulation criteria (e.g., an intensity of the contact exceeds a first intensity threshold), the device changes an appearance of the interactive UI object based on the intensity of the contact and independent of lateral movement of the contact. In accordance with a determination that the first input meets second appearance-manipulation criteria (e.g., the intensity of the contact exceeds a second intensity threshold, greater than the first intensity threshold), the device changes the appearance of the interactive UI object based on lateral movement of the contact detected after the intensity of the contact exceeds the second intensity threshold.

43 Claims, 38 Drawing Sheets

(51) Int. Cl.
    *G06F 3/0481*    (2013.01)
    *G06F 3/01*    (2006.01)

(56) References Cited

U.S. PATENT DOCUMENTS

| | | |
|---|---|---|
| 9,030,419 B1 * | 5/2015 | Freed .................... G06F 3/0416 345/156 |
| 9,760,241 B1 * | 9/2017 | Lewbel ............... G06F 3/04812 |
| 10,019,096 B1 * | 7/2018 | Rosenberg .......... G06F 3/04847 |
| 10,275,087 B1 * | 4/2019 | Smith ..................... G06F 3/045 |
| 2014/0137029 A1 * | 5/2014 | Stephenson ........... G06F 3/0486 715/784 |
| 2018/0011628 A1 * | 1/2018 | Kano ................... G06F 3/0488 |

* cited by examiner

600

602 Display, on a display of an electronic device with a touch-sensitive surface and one or more sensors to detect intensities of contacts with the touch-sensitive surface:

(i) first content that includes an interactive user interface object that conditionally exhibits respective interactive behavior responsive to changes in detected contact intensity, and (ii) second content, distinct from the first content, that does not exhibit the respective interactive behavior responsive to changes in detected contact intensity

604 Detect a first input by a contact while a focus selector is over the interactive user interface object on the display

606 In accordance with a determination that the first input meets scrolling criteria, scroll the first content and the second content in a first direction on the display

608 The scrolling criteria do not require that a characteristic intensity of the contact increase above the first intensity threshold during the first input in order for the scrolling criteria to be met

610 Scrolling the first content and the second content includes presenting on the display a preview of the respective interactive behavior of the interactive user interface object while scrolling the first content and the second content

612 Presenting the preview includes tilting at least one 3D feature within the interactive user interface object out of a frame surrounding the interactive user interface object on the display

614 Scrolling the second content includes maintaining an appearance of the second content while presenting the preview of the respective interactive behavior of the interactive user interface object

616 In accordance with a determination that the first input meets first appearance-manipulation criteria (e.g., the first appearance-manipulation criteria include a criterion that is met when a characteristic intensity of the contact exceeds a first intensity threshold during the first input):

618 Change an appearance of the interactive user interface object based on the characteristic intensity of the contact and independent of lateral movement of the contact across the touch-sensitive surface

620 Changing the appearance of the interactive user interface object based on the characteristic intensity of the contact includes tilting at least one 3D feature within the interactive user interface object out of a frame surrounding the interactive user interface object on the display

622 Continue to display the second content while changing the appearance of the interactive user interface object

624 Provide first tactile output via the electronic device

626 After the determination that the first input meets first appearance-manipulation criteria:
    (i) detect a decrease in the characteristic intensity of the contact such that the characteristic intensity of the contact falls below the first intensity threshold;
    (ii) while the characteristic intensity of the contact remains below the first intensity threshold, detect vertical movement of the contact on the touch-sensitive surface; and,
    (iii) in response to detecting the vertical movement of the contact, scroll the first content and the second content on the display

628 After changing the appearance of the interactive UI object in accordance with the determination that the first input meets the first appearance-manipulation criteria:
    (i) detect an end of the first input; and,
    (ii) in response to detecting the end of the first input, revert back to the appearance of the interactive user interface object before the increase in intensity of the contact was detected (B)

Figure 6B

DEVICES, METHODS, AND GRAPHICAL USER INTERFACES FOR MANIPULATING EMBEDDED INTERACTIVE CONTENT

RELATED APPLICATIONS

This application claims priority to U.S. Provisional Application Ser. No. 62/349,039, filed Jun. 12, 2016, entitled "Devices, Methods, and Graphical User Interfaces for Manipulating Embedded Interactive Content," which is incorporated by reference herein in its entirety.

TECHNICAL FIELD

This relates generally to electronic devices with touch-sensitive surfaces, including but not limited to electronic devices with touch-sensitive surfaces that allow for manipulation of embedded interactive content.

BACKGROUND

Users of electronic devices with touch-sensitive displays often access a variety of content. While accessing a particular content item (e.g., a news article within a news application or browser), users often want to manipulate a portion of the content (e.g., an embedded image or other content object within the news article) so that they can quickly learn more about or explore the portion of the content. Users are typically unable to perform these manipulations and often attempt cumbersome and inefficient processes in order to find a way to try to perform a desired manipulation (e.g., by accessing the portion of the content item using a different application besides the example news application).

Conventional methods for performing these manipulations (if available at all) are cumbersome and inefficient. For example, having to leave an application in order to use a different application that may provide similar content that can be manipulated is tedious and requires a user to increase the number, extent, and/or nature of inputs needed to manipulate embedded content. In addition, these methods (if available at all) take longer than necessary, thereby wasting energy. This latter consideration is particularly important in battery-operated devices.

SUMMARY

Accordingly, there is a need for electronic devices with faster, more efficient methods and interfaces for manipulating embedded interactive content. Such methods and interfaces optionally complement or replace conventional methods for manipulating embedded interactive content. Such methods and interfaces reduce the number, extent, and/or nature of the inputs from a user and produce a more efficient human-machine interface, thereby providing users with easy-to-use and intuitive ways to manipulate embedded interactive content. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note-taking, and/or digital video playing. Executable instructions for performing these functions are, optionally, included in a non-transitory computer readable storage medium or other computer program product configured for execution by one or more processors.

(A1) In accordance with some embodiments, a method is performed at an electronic device with a display, a touch-sensitive surface, and one or more sensors to detect intensity of contacts with the touch-sensitive surface. The method includes: displaying, on the display: (i) first content that includes an interactive user interface object that conditionally exhibits respective interactive behavior responsive to changes in detected contact intensity, and (ii) second content, distinct from the first content, that does not exhibit the respective interactive behavior responsive to changes in detected contact intensity. The method also includes: detecting a first input by a contact while a focus selector is over the interactive user interface object on the display. In accordance with a determination that the first input meets first appearance-manipulation criteria, the method includes: changing an appearance of the interactive user interface object based on the characteristic intensity of the contact and independent of lateral movement of the contact across the touch-sensitive surface. In some embodiments, the first appearance-manipulation criteria include a criterion that is met when a characteristic intensity of the contact exceeds a first intensity threshold during the first input. In accordance with a determination that the first input meets second appearance-manipulation criteria, the method includes: changing the appearance of the interactive user interface object based on lateral movement of the contact across the touch-sensitive surface that is detected after the characteristic intensity of the contact exceeds the second intensity threshold. In some embodiments, the second appearance-manipulation criteria include a criterion that is met when the characteristic intensity of the contact exceeds a second intensity threshold, greater than the first intensity threshold, during the first input.

(A2) In accordance with some embodiments of the method of A1, the method includes: after the determination that the first input meets the second appearance-manipulation criteria, continuing to change the appearance of the interactive user interface object as the characteristic intensity of the contact increases above the second intensity threshold.

(A3) In accordance with some embodiments of the method of any one of A1-A2, the method includes: in accordance with the determination that the first input meets the second appearance-manipulation criteria, ceasing to display the second content.

(A4) In accordance with some embodiments of the method of any one of A1-A3, the method includes: in accordance with the determination that the first input meets the first appearance-manipulation criteria, continuing to display the second content while changing the appearance of the interactive user interface object.

(A5) In accordance with some embodiments of the method of any one of A1-A4, the method includes: in accordance with a determination that the first input meets scrolling criteria, scrolling the first content and the second content in a first direction on the display. In some embodiments, the scrolling criteria do not require that a characteristic intensity of the contact increase above the first intensity threshold during the first input in order for the scrolling criteria to be met.

(A6) In accordance with some embodiments of the method of A5, scrolling the first content and the second content includes presenting on the display a preview of the respective interactive behavior of the interactive user interface object while scrolling the first content and the second content.

(A7) In accordance with some embodiments of the method of A6, presenting the preview includes tilting at least one 3D feature within the interactive user interface object out of a frame surrounding the interactive user interface object on the display.

(A8) In accordance with some embodiments of the method of A6, scrolling the second content includes maintaining an appearance of the second content while presenting the preview of the respective interactive behavior of the interactive user interface object.

(A9) In accordance with some embodiments of the method of any one of A1-A8, changing the appearance of the interactive user interface object based on the characteristic intensity of the contact includes tilting at least one 3D feature within the interactive user interface object out of a frame surrounding the interactive user interface object on the display.

(A10) In accordance with some embodiments of the method of any one of A1-A9, the method includes: providing first tactile output, via the electronic device, in accordance with the determination that the first input meets the first appearance-manipulation criteria.

(A11) In accordance with some embodiments of the method of any one of A1-A10, the method includes: after the determination that the first input meets first appearance-manipulation criteria, detecting a decrease in the characteristic intensity of the contact such that the characteristic intensity of the contact falls below the first intensity threshold. While the characteristic intensity of the contact remains below the first intensity threshold, the method includes: detecting vertical movement of the contact on the touch-sensitive surface. In response to detecting the vertical movement of the contact, the method includes: scrolling the first content and the second content on the display.

(A12) In accordance with some embodiments of the method of any one of A1-A11, the method includes: after changing the appearance of the interactive user interface object in accordance with the determination that the first input meets the first appearance-manipulation criteria, detecting an end of the first input. In response to detecting the end of the first input, the method includes: reverting back to the appearance of the interactive user interface object before the increase in intensity of the contact was detected.

(A13) In accordance with some embodiments of the method of any one of A1-A12, the method includes: providing second tactile output, via the electronic device, in accordance with the determination that the first input meets the second appearance-manipulation criteria.

(A14) In accordance with some embodiments of the method of any one of A1-A13, the method includes: after the determination that the first input meets the second appearance-manipulation criteria, detecting a decrease in the characteristic intensity of the contact such that the characteristic intensity of the contact falls below the second intensity threshold. While the characteristic intensity of the contact remains below the second threshold, the method includes: continuing to change the appearance of the interactive user interface object based on lateral movement of the contact across the touch-sensitive surface.

(A15) In accordance with some embodiments of the method of any one of A1-A14, the method includes: after the determination that the first input meets the second appearance-manipulation criteria, detecting vertical movement of the contact on the touch-sensitive surface. In response to detecting the vertical movement of the contact, the method includes: changing the appearance of the interactive user interface object based on the vertical movement without scrolling the second content.

(A16) In accordance with some embodiments of the method of any one of A1-A15, the method includes: after changing the appearance of the interactive user interface object in accordance with the determination that the first input meets the second appearance-manipulation criteria, detecting an end of the first input. In response to detecting the end of the first input, the method includes: reversing the changes to the appearance of the interactive user interface object.

(A17) In accordance with some embodiments of the method of any one of A1-A16, the method includes: in accordance with a determination that the first input meets third appearance-manipulation criteria, ceasing to display the second content and displaying the interactive user interface object in an increased-interaction display mode. In some embodiments, the third appearance-manipulation criteria include a criterion that is met when the characteristic intensity of the contact exceeds a third intensity threshold, greater than the first intensity threshold and greater than the second intensity threshold, during the first input.

(A18) In accordance with some embodiments of the method of A17, the method includes: while displaying the interactive user interface object in the increased-interaction display mode, detecting an end of the first input. In response to detecting the end of the first input, the method includes: maintaining display of the interactive user interface object in the increased-interaction display mode.

(A19) In accordance with some embodiments of the method of A17, the method includes: providing third tactile output, via the electronic device, in accordance with the determination that the first input meets the third appearance-manipulation criteria.

(A20) In accordance with some embodiments of the method of A17, the method includes: receiving a second input while the interactive user interface object is displayed in the increased-interaction display mode. In response to receiving the second input, the method includes: exiting the increased-interaction display mode and displaying the interactive user interface object with the second content.

(A21) In accordance with some embodiments of the method of any one of A1-A20, the interactive object includes a 3D object that is associated with a first axis of rotation and a second axis of rotation; the respective interactive behavior includes rotating the 3D object about the first axis of rotation in accordance with the change in intensity of the contact without rotating the 3D object about the second axis of rotation; and changing the appearance of the interactive user interface object based on lateral movement of the contact across the touch-sensitive surface includes rotating the 3D object about the second axis of rotation in accordance with the lateral movement of the contact across the touch-sensitive surface.

(A22) In accordance with some embodiments of the method of any one of A1-A21, the interactive user interface object includes a 3D feature having separate component parts, and changing the appearance of the interactive user interface object based on the characteristic intensity of the contact includes dynamically expanding the 3D feature to reveal the separate component parts.

(A23) In accordance with some embodiments of the method of any one of A1-A22, the interactive user interface object includes two or more location-based identifiers, and changing the appearance of the interactive user interface object based on the characteristic intensity of the contact includes updating the interactive user interface object to move between displaying each of the two or more location-based identifiers.

(A24) In accordance with some embodiments, an electronic device includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: display, on the display: (i) first content that includes an interactive user interface object that conditionally exhibits respective interactive behavior responsive to changes in detected contact intensity, and (ii) second content, distinct from the first content, that does not exhibit the respective interactive behavior responsive to changes in detected contact intensity. The processing unit is also configured to: detect a first input by a contact while a focus selector is over the interactive user interface object on the display. In accordance with a determination that the first input meets first appearance-manipulation criteria, the processing unit is configured to: change an appearance of the interactive user interface object based on the characteristic intensity of the contact and independent of lateral movement of the contact across the touch-sensitive surface. In some embodiments, the first appearance-manipulation criteria include a criterion that is met when a characteristic intensity of the contact exceeds a first intensity threshold during the first input. In accordance with a determination that the first input meets second appearance-manipulation criteria, the processing unit is configured to: change the appearance of the interactive user interface object based on lateral movement of the contact across the touch-sensitive surface that is detected after the characteristic intensity of the contact exceeds the second intensity threshold. In some embodiments, the second appearance-manipulation criteria include a criterion that is met when the characteristic intensity of the contact exceeds a second intensity threshold, greater than the first intensity threshold, during the first input.

(A25) In accordance with some embodiments of the electronic device of A24, the processing unit is further configured to: perform the method of any one of A2-A23.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein (e.g., any one of the methods described in A1-A23 above). In accordance with some embodiments, a computer-readable storage medium has stored therein instructions which, when executed by an electronic device with a display, a touch-sensitive surface, and one or more sensors to detect intensity of contacts with the touch-sensitive surface, cause the electronic device to perform or cause performance of the operations of any of the methods described herein (e.g., any one of the methods described in A1-A23 above). In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described herein (e.g., any one of the methods described in A1-A23 above), which are updated in response to inputs, as described in any of the methods described herein. In accordance with some embodiments, an electronic device includes: a display, a touch-sensitive surface, and one or more sensors to detect intensity of contacts with the touch-sensitive surface; and means for performing or causing performance of the operations of any of the methods described herein (e.g., any one of the methods described in A1-A23 above). In accordance with some embodiments, an information processing apparatus, for use in an electronic device with a display and a touch-sensitive surface, and one or more sensors to detect intensity of contacts with the touch-sensitive surface, includes means for performing or causing performance of the operations of any of the methods described herein (e.g., any one of the methods described in A1-A23 above).

Thus, electronic devices with displays, touch-sensitive surfaces and optionally one or more sensors to detect intensity of contacts with the touch-sensitive surface are provided with faster, more efficient methods and interfaces for manipulating embedded interactive content, thereby increasing the effectiveness, efficiency, and user satisfaction with such devices. Such methods and interfaces may complement or replace conventional methods for manipulating embedded interactive content.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are a flow diagram of a method of manipulating embedded interactive content in accordance with some embodiments.

DESCRIPTION OF EMBODIMENTS

The methods, devices, and graphical user interfaces ("GUIs") described herein provide visual and/or haptic feedback that makes manipulation of user interface objects more efficient and intuitive for a user. Some methods, devices, and GUIs described herein allow for changing an appearance of an interactive user interface ("UP") object (e.g., a map object that is included within a news article) based on satisfaction of appearance-manipulation criteria (e.g., including criterion that compare a characteristic intensity of a contact that is over the interactive user interface object to one or more intensity thresholds).

For example, a preview of appearance changes for the interactive UI object is first provided in response to a scrolling input by the contact while the characteristic intensity of the contact is below a first intensity threshold (in order to provide users with a visual cue that the interactive user interface object exhibits interactive behavior responsive to changes in detected contact intensity). Then, the appearance of the interactive user interface object is changed as the characteristic intensity of the contact continues to increase (e.g., above a first intensity threshold, the appearance of the interactive UI object is changed independent of lateral movement of the contact, and above a second intensity threshold, the appearance of the interactive UI object is changed based on lateral movement of the contact). In this way, users can easily discover that a particular interactive UI object responds to changes in detected contact intensity, and then seamlessly use intuitive, force-sensitive gestures to explore the particular interactive UI object.

Figure 3:
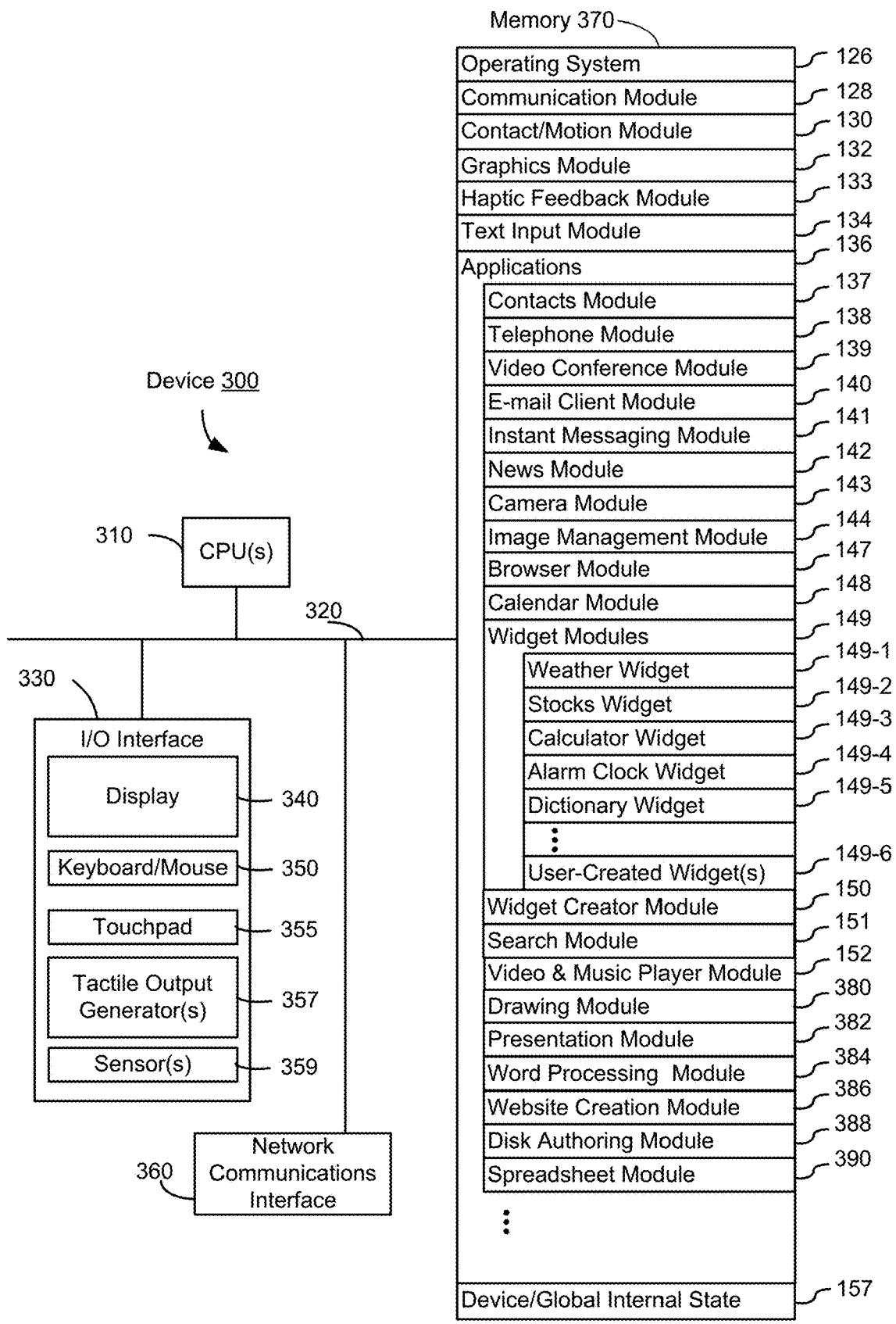
FIG. 3 is a block diagram of an example of a multifunction device with a display and a touch-sensitive surface in accordance with some embodiments.
Figure 4A:
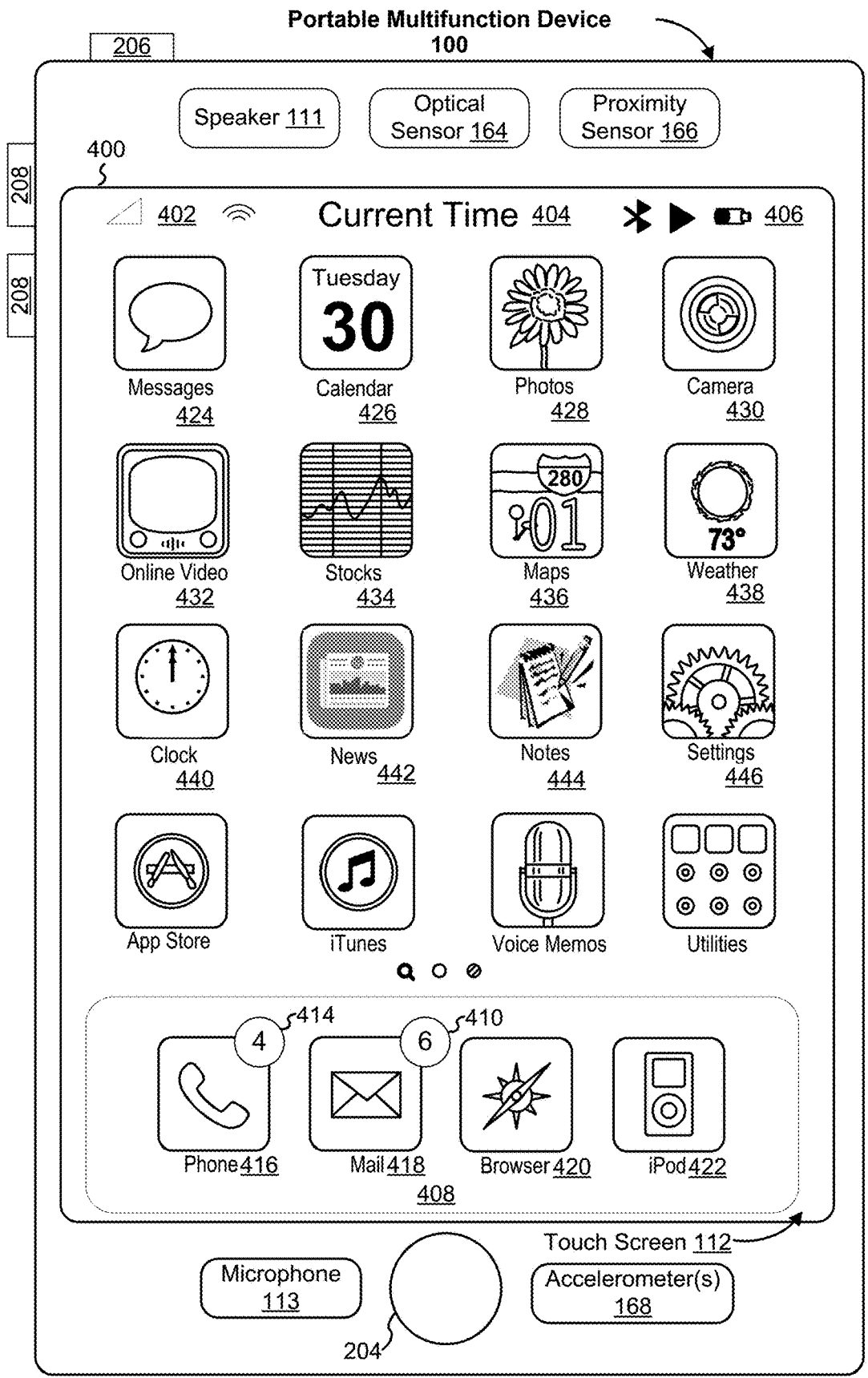
FIG. 4A illustrates an example user interface for a menu of applications on a portable multifunction device in accordance with some embodiments.
Figure 4B:
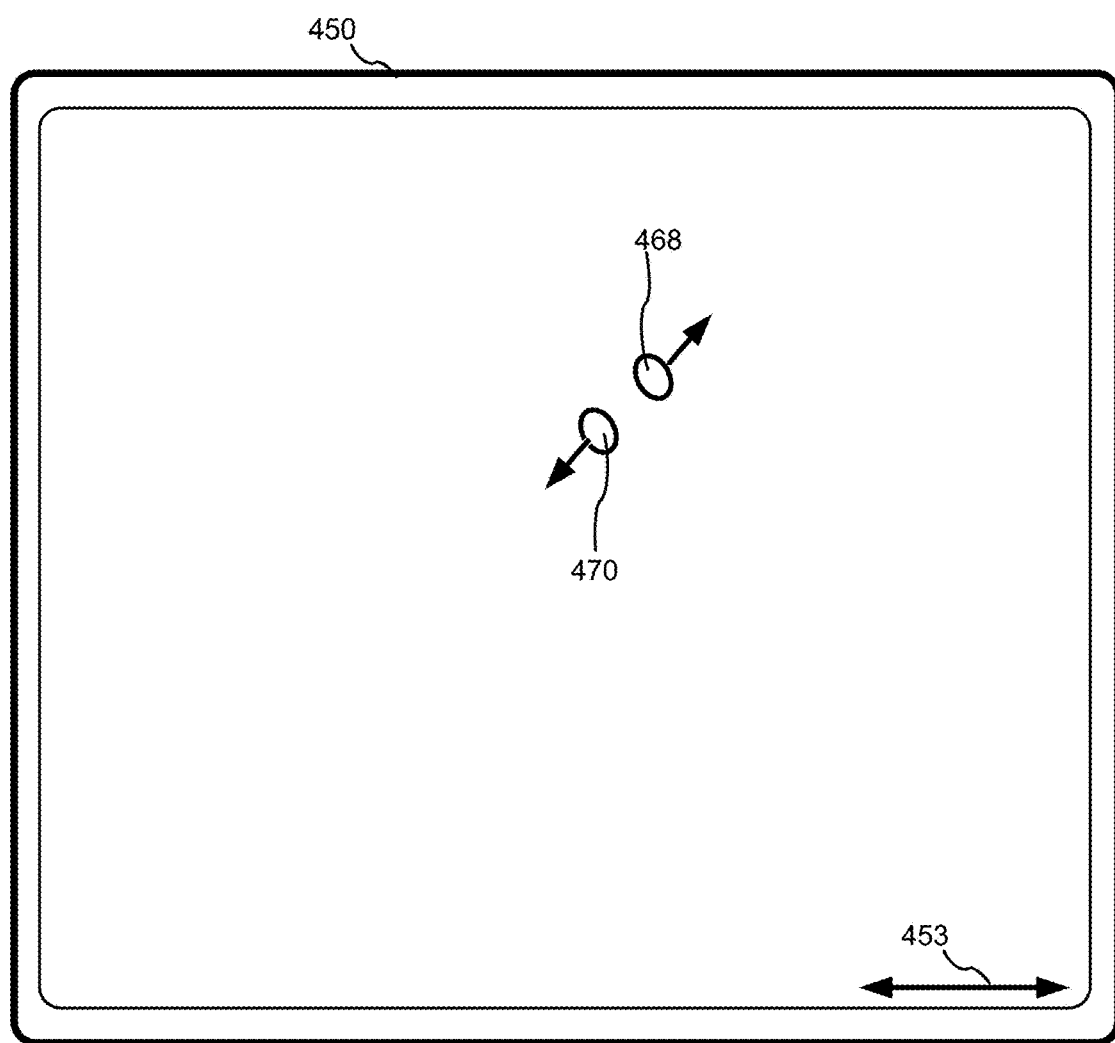
FIG. 4B illustrates an example user interface for a multifunction device with a touch-sensitive surface that is separate from the display in accordance with some embodiments.
Figure 4B:
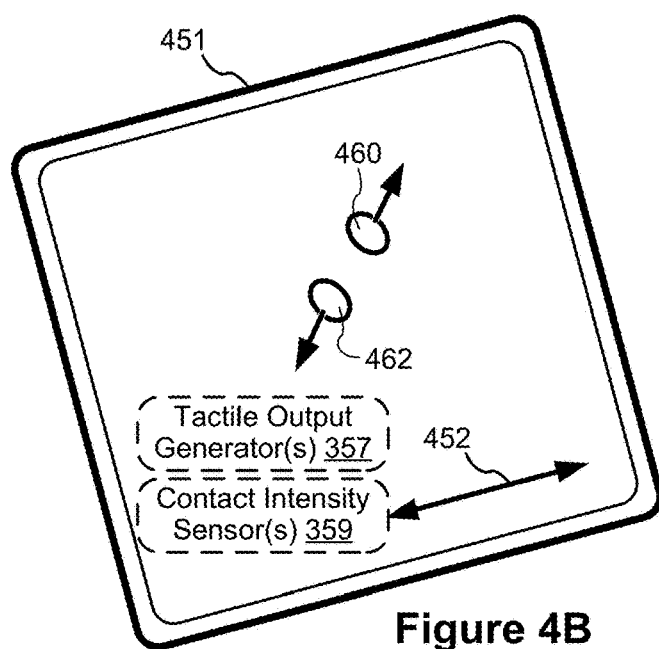
Figure 4C:
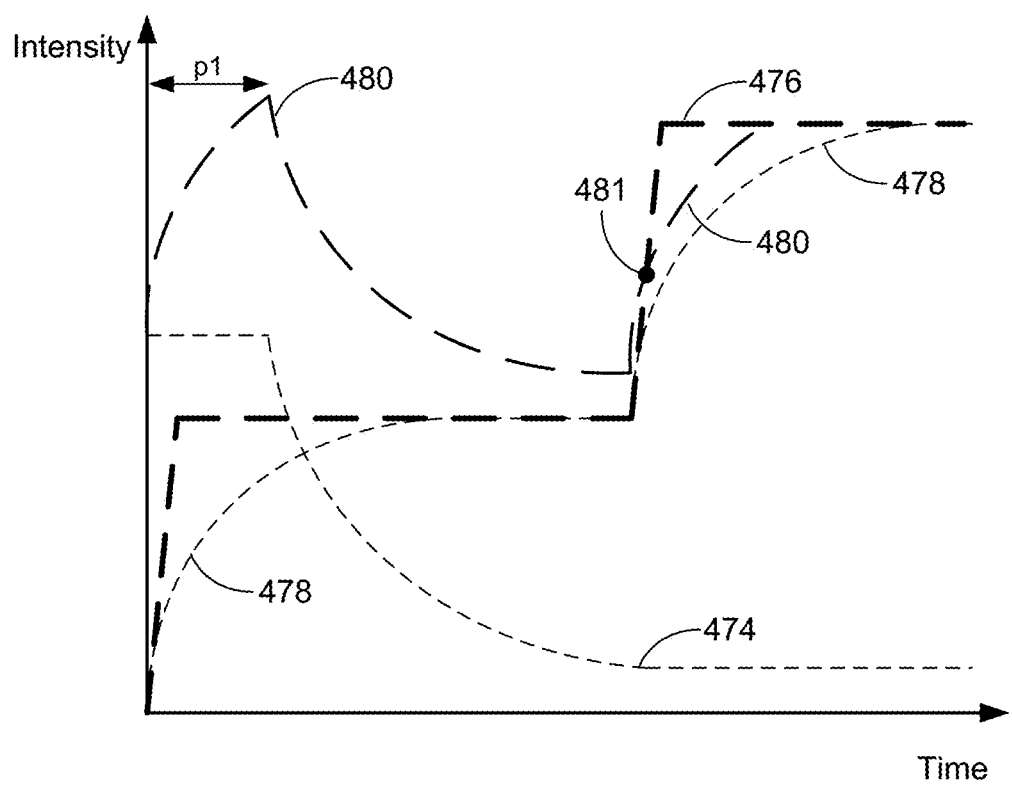
FIGS. 4C-4E illustrate examples of dynamic intensity thresholds in accordance with some embodiments.
Figure 4D:
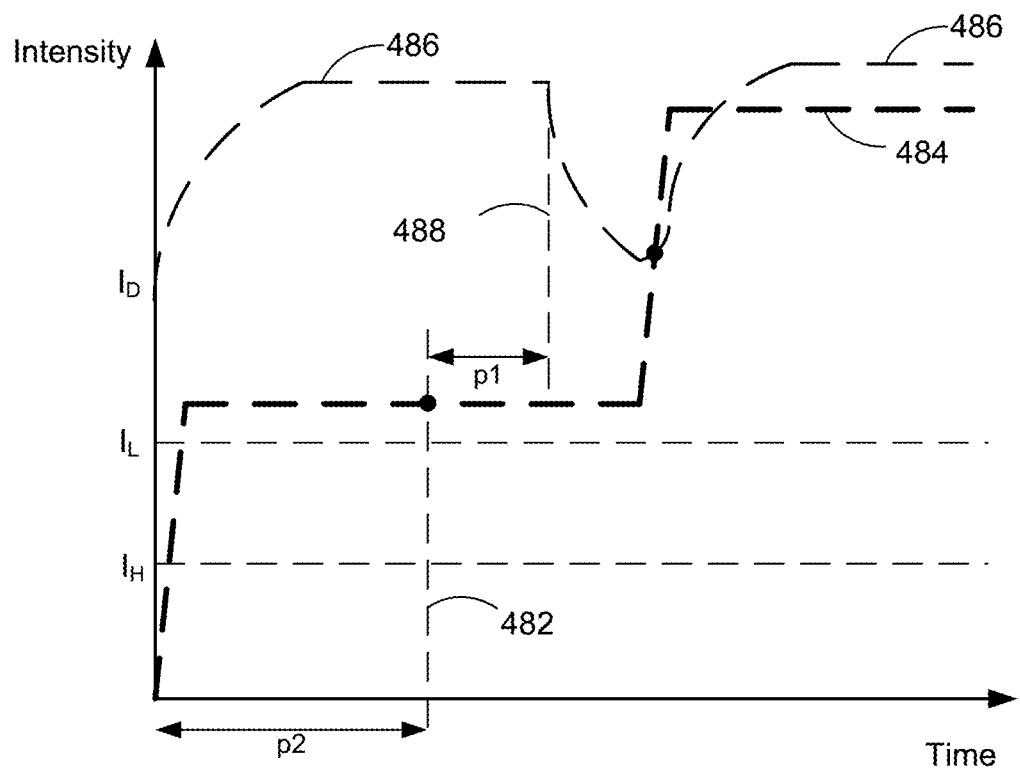
Figure 4E:
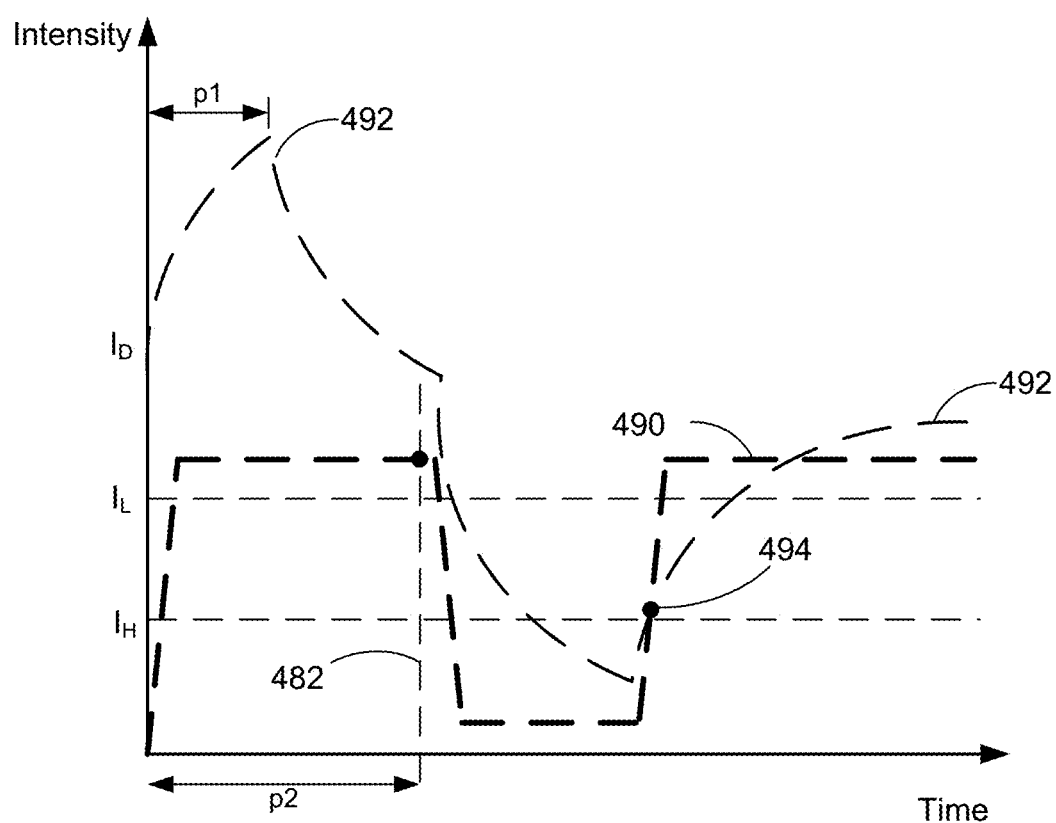
Figure 5A:
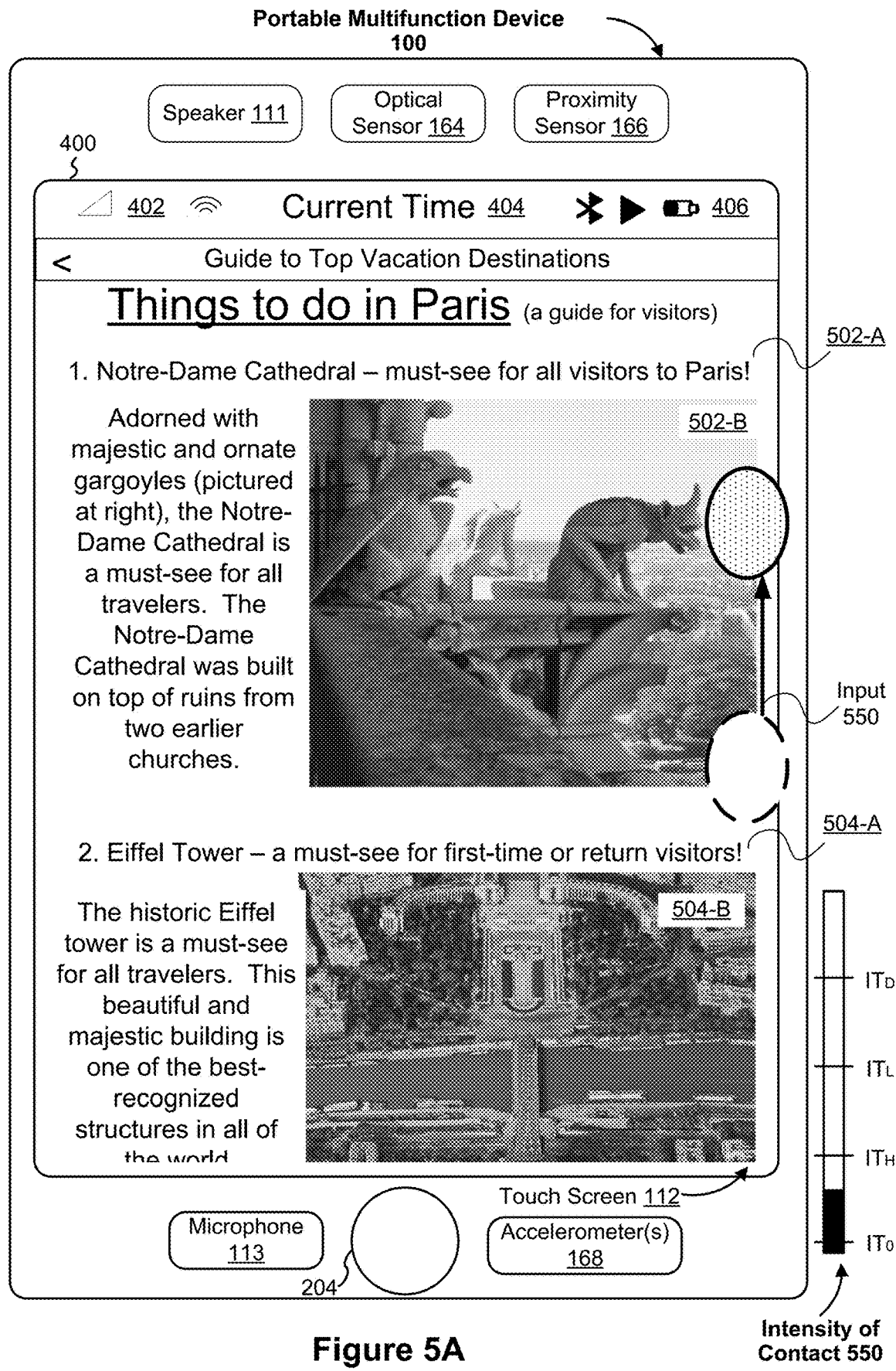
FIGS. 5A-5L illustrate example user interfaces for changing an appearance of an interactive user interface object in accordance with some embodiments.

Example devices are first described below, and are followed by descriptions of example user interfaces and associated processes. Specifically, FIGS. 1A-1B, 2, and 3 provide a description of example devices and FIGS. 4A-4B illustrate example user interfaces for a portable multifunction device and for a multifunction device with a touch-sensitive surface that is separate from the display, respectively. FIGS. 4C-4E illustrate examples of dynamic intensity thresholds and FIG. 4F illustrates changes to a viewpoint in a three-dimensional object based on changes to characteristic intensity of a contact. FIGS. 5A-5X illustrate example user interfaces for manipulating embedded content (e.g., changing an appearance of an interactive user interface object). FIGS. 6A-6D are a flow diagram of a method of manipulating embedded interactive content. The user interfaces in FIGS. 5A-5X are used to illustrate the processes shown in FIGS. 6A-6D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described.

It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
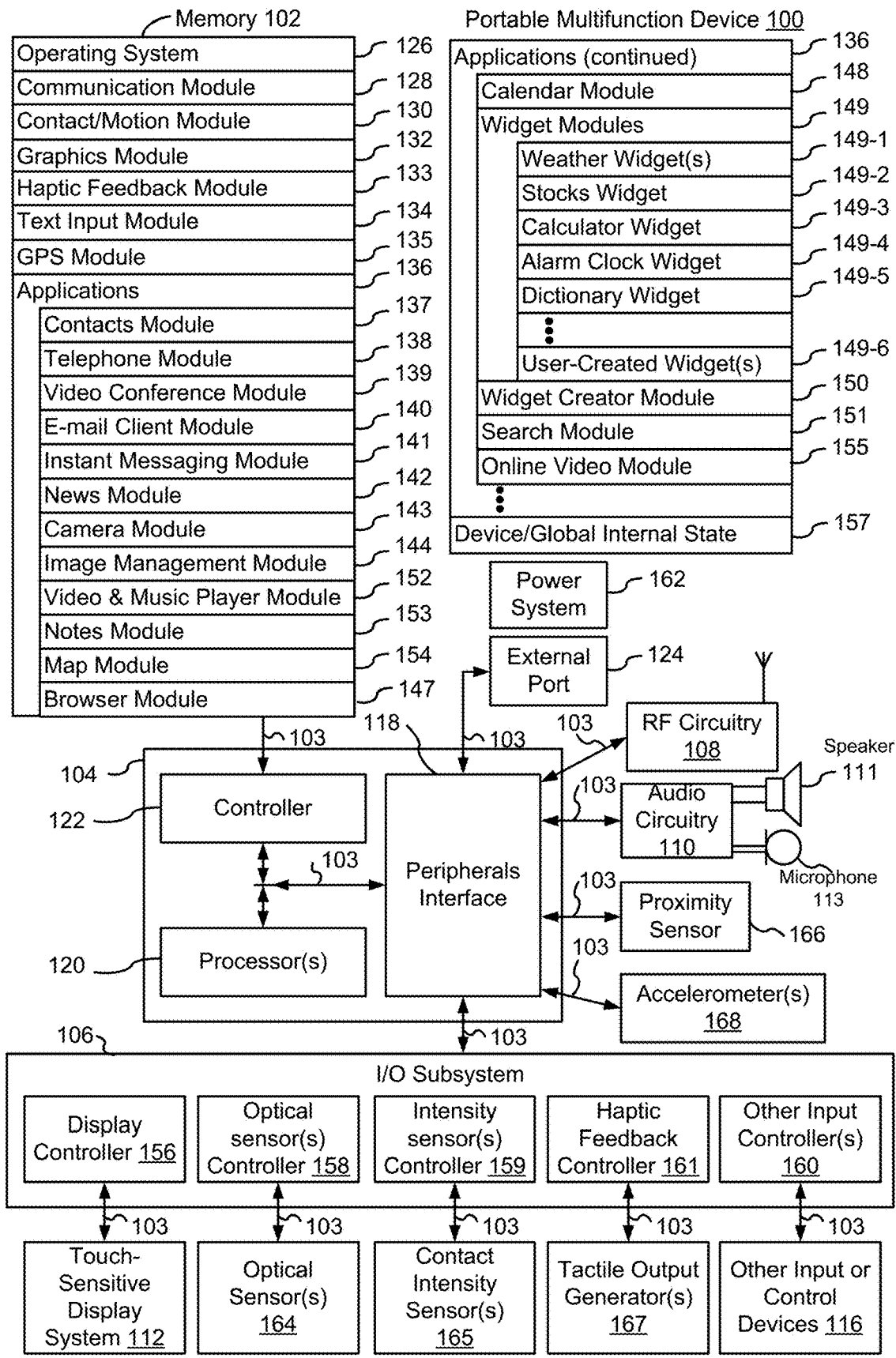
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- news module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with touch-sensitive display system 112, display controller 156, contact/motion module 130, and graphics module 132, news module 142 includes executable instructions to display user-specific news articles (e.g., articles collected from a variety of publication sources based on user-specific preferences) and allow users to interact with the user-specific news articles (or to interact with portions of content included within the user-specific news articles). In some embodiments, allowing users to interact with the user-specific news articles includes changing an appearance of an interactive user interface object (e.g., a map object associated with map module 154, FIG. 1A) based on a characteristic intensity of a contact over the interactive user interface object (as discussed in more detail below in reference to FIGS. 5A-5X and 6A-6D). In some embodiments, the news module 142 also stores appearance-manipulation criteria that are used to determine when to change the appearance of the interactive user interface object (appearance-manipulation criteria are discussed in more detail below in reference to FIGS. 5A-5X and 6A-6D).

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
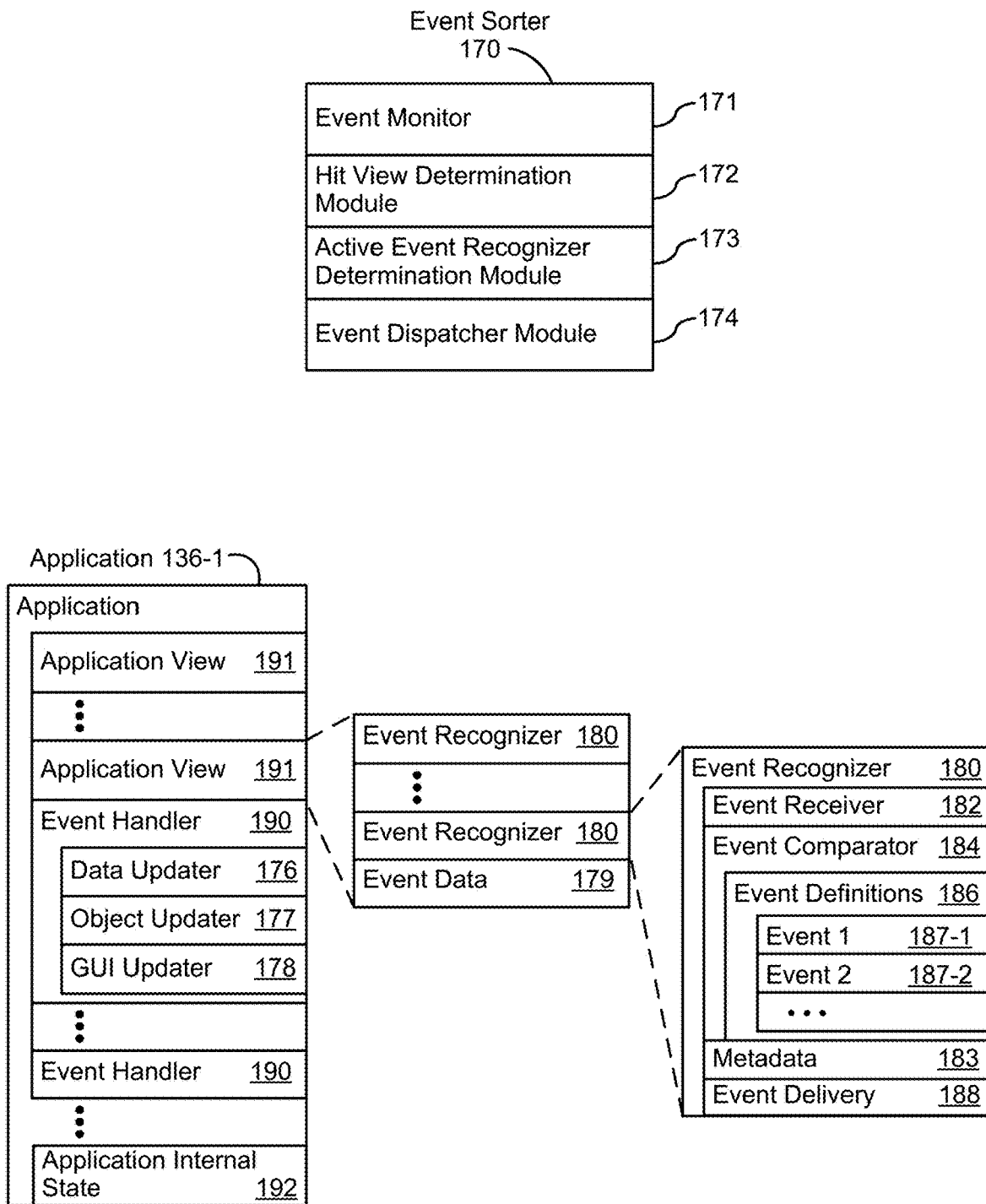
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
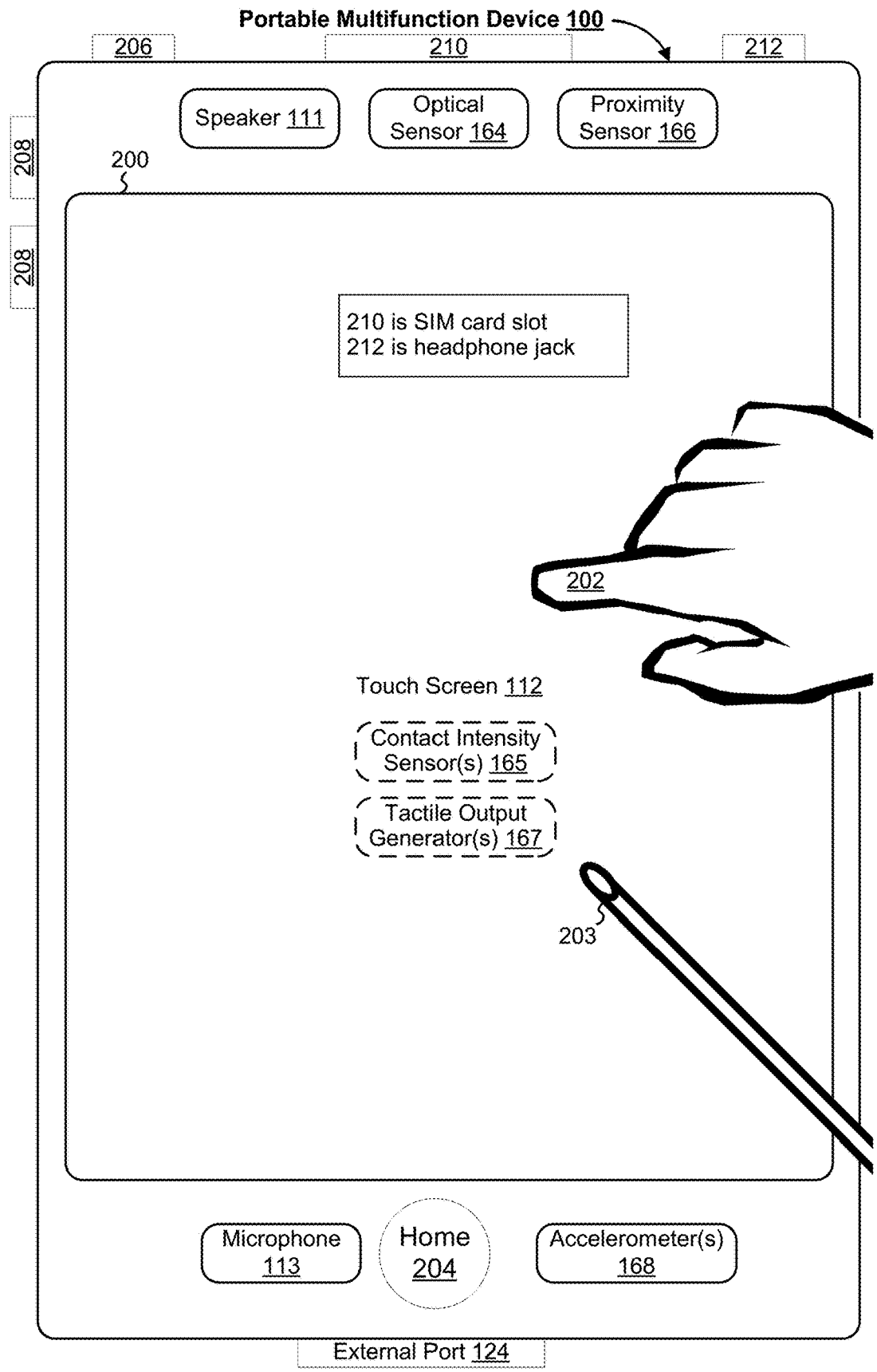
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example of a multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for news module 142, labeled "News;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300. Although many of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 5A-5X) described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces (e.g., those illustrated in FIGS. 5A-5X) and associated processes (e.g., those shown in FIGS. 6A-6D) that may be implemented on an electronic device, such as portable multifunction device 100 or device 300, with a display, a touch-sensitive surface, and one or more sensors to detect intensities of contacts with the touch-sensitive surface.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 (FIG. 1A). For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5L illustrate example user interfaces for changing an appearance of an interactive user interface object in accordance with some embodiments. In particular, FIG. 5A illustrates a user interface (e.g., for an article displayed by a news application such as news module 142 or for an article displayed by a browser such as browser module 147, FIG. 1A) in which a user is viewing an article about "Things to do in Paris." As pictured in FIG. 5A, the article includes first content 502-A (e.g., textual content describing the Notre-Dame cathedral), second content 502-B that is adjacent to and associated with first content 502-A (e.g., graphical content showing an image of gargoyles), third content 504-A (e.g., textual content describing the Eiffel Tower), and fourth content 504-B that is adjacent to and associated with third content 504-A (e.g., graphical content that includes an image of the Eiffel Tower). In some embodiments, some of the content (e.g., first, second, third, or fourth content) also includes interactive user interface objects. In other words, some of the content conditionally exhibits respective interactive behavior that is responsive to changes in detected contact intensity (e.g., graphical content 504-B includes an interactive user interface object) and some of the content does not exhibit the respective interactive behavior (e.g., graphical content 502-B does not include an interactive user interface object).

In order to provide users with a visual clue as to which content includes an interactive user interface object (and thus exhibits the respective interactive behavior), news module 142 or browser module 147 (in conjunction with other components, such as graphics module 132 and contact/motion module 130, FIG. 1A) presents a preview of the respective interactive behavior as the user begins to scroll through the article (e.g., as shown in FIG. 5A, using scroll input 550 that includes a contact over the displayed article followed by movement of the contact in a substantially upward direction, while the characteristic intensity of the contact remains below $IT_H$).

Figure 5B:
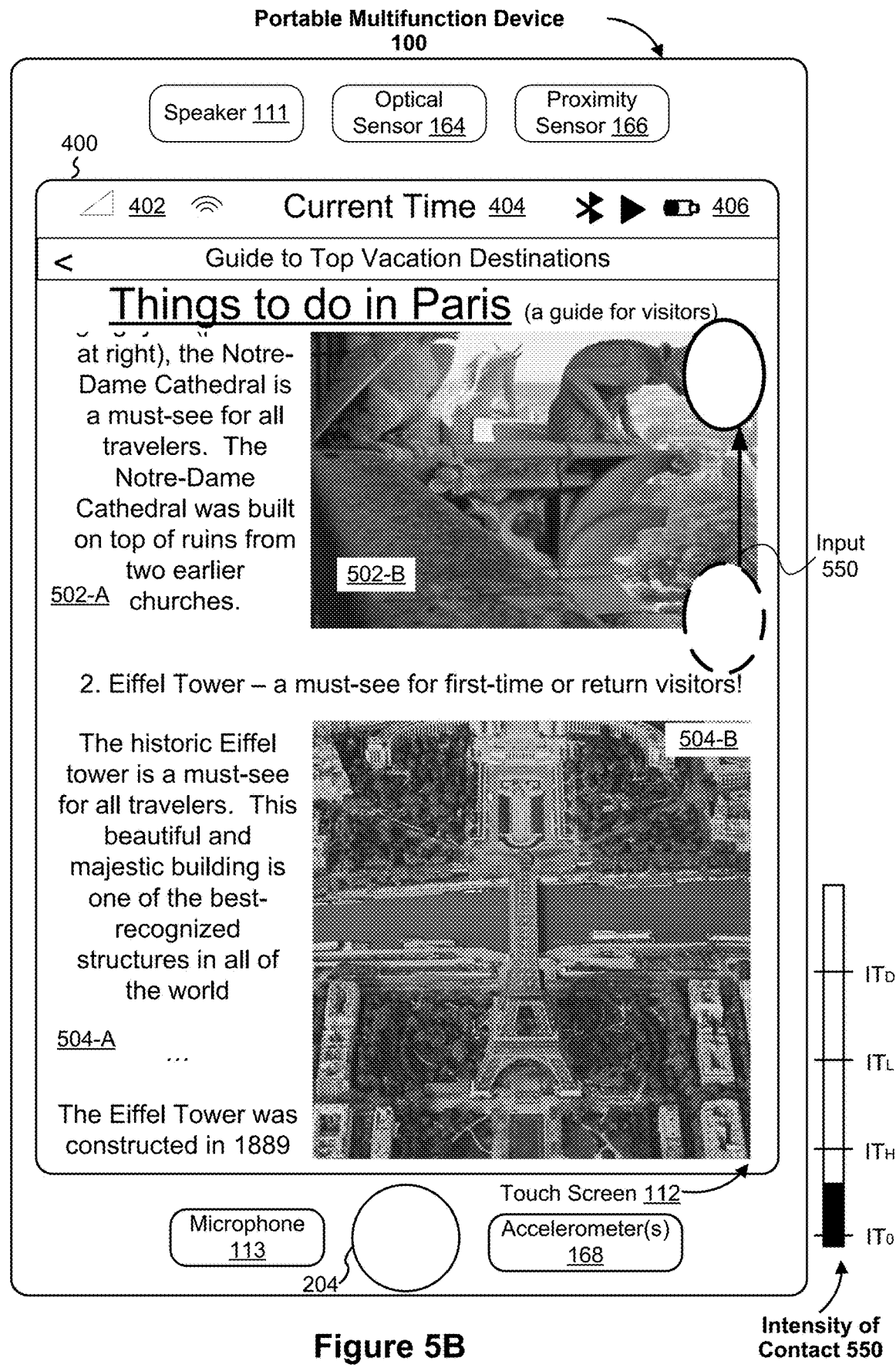

As shown in FIG. 5B, in response to the scroll input 550 shown in FIG. 5A, a preview of respective interactive behavior for the graphical content 504-B is presented by displaying a "vitality" hint of the Eiffel Tower tilting. As the scroll input 550 continues to move in the substantially upward direction, the Eiffel Tower continues to tilt slightly (shown in the sequence of user interfaces of FIGS. 5A-5C). In some embodiments, the preview continues until the interactive UI object has reached a predetermined tilt position (or a default display position for the interactive user interface object), so that the user is provided with the visual cue but is not distracted by constantly tilting graphics. In some embodiments, the preview of the respective interactive behavior is not shown for the graphical content 502-B (e.g., a viewpoint of the image of the gargoyles remains the same between FIGS. 5A-5B), because the second content 502-B does not exhibit the respective interactive behavior.

Figure 5C:
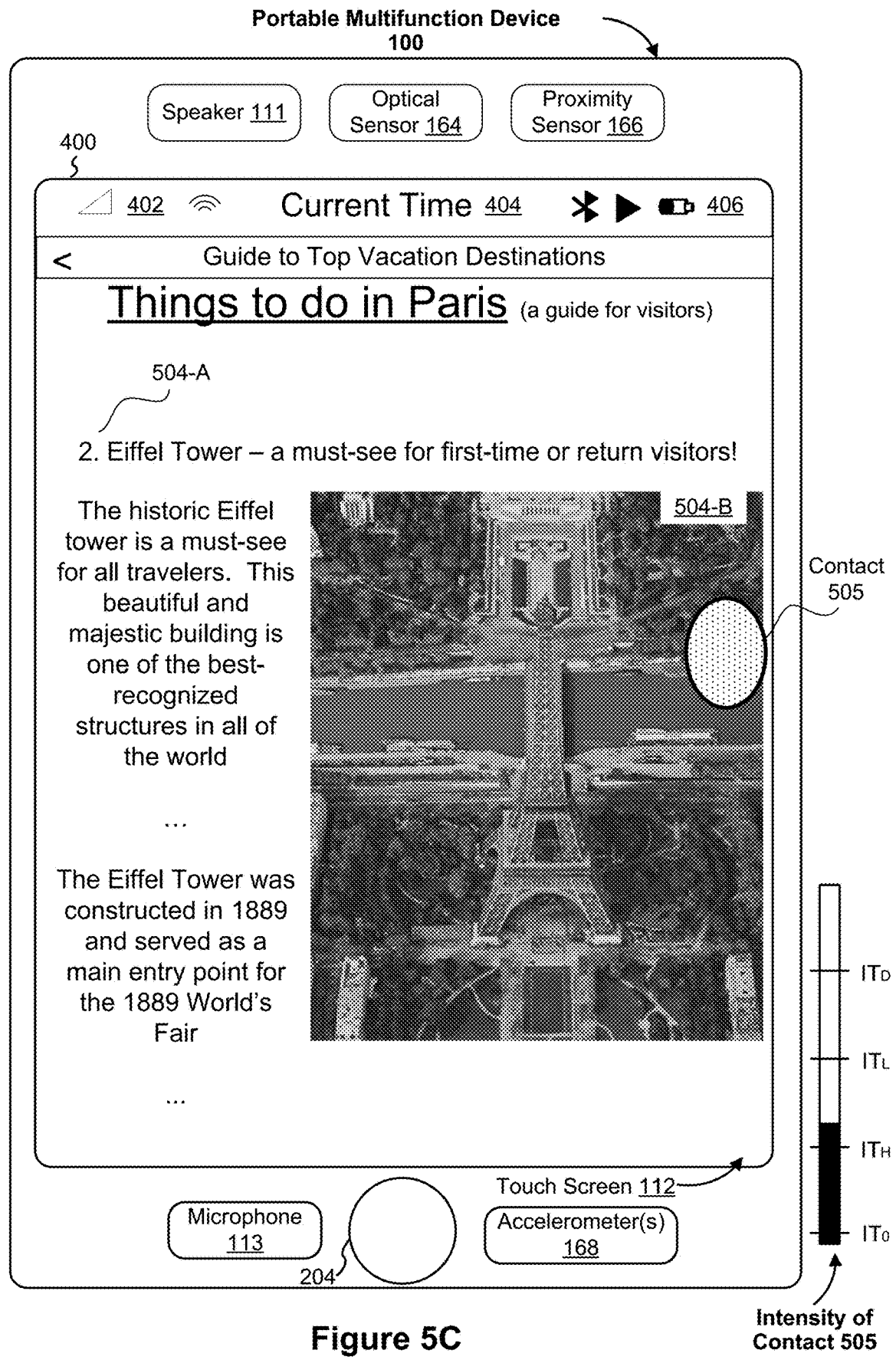
Figure 5D:
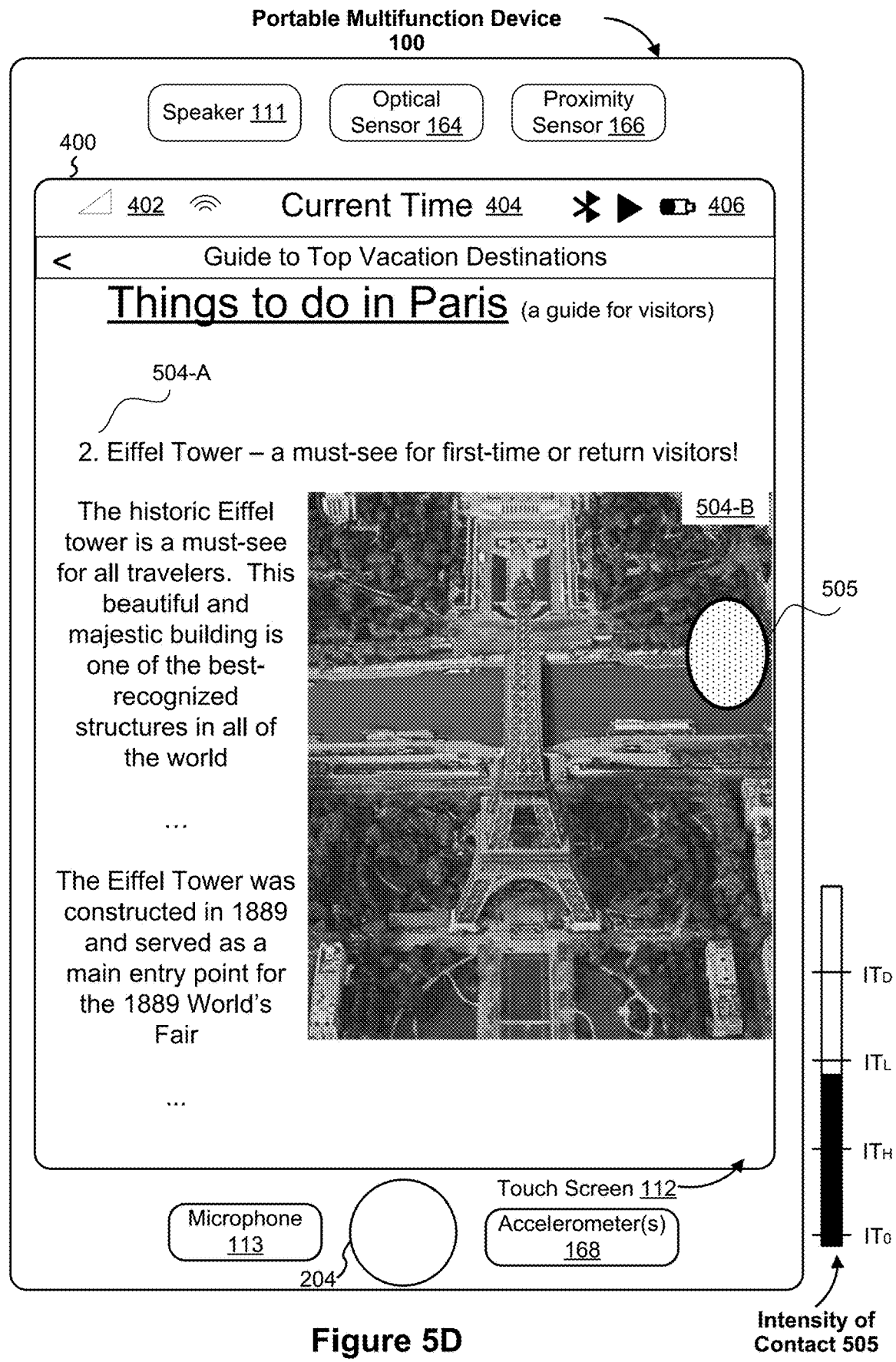
Figure 5E:
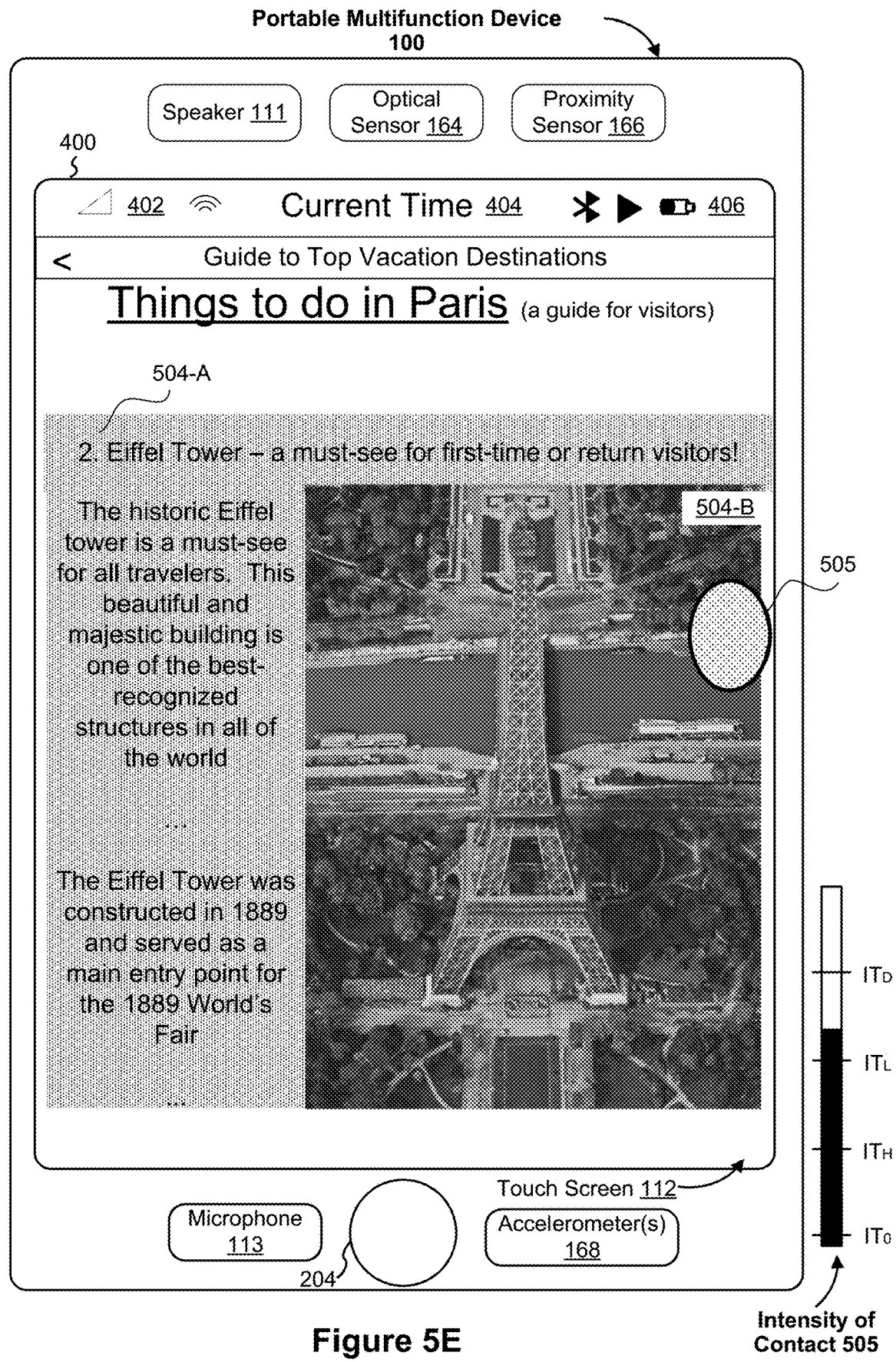

In addition to viewing a preview of the respective interactive behavior during a scroll input, a user can also change a characteristic intensity of a contact in order to activate the respective interactive behavior. For example, FIGS. 5C-5E show a contact 505 over the map object 504-B and the contact 505 has a characteristic intensity that is increasing from just above $IT_H$ (FIG. 5C) to just below $IT_L$ (FIG. 5D) and then above $IT_L$ (FIG. 5E). As the characteristic intensity of contact 505 continues to increase, the appearance of the interactive user interface object included in the graphical content 504-B continues to change (e.g., the Eiffel Tower continues to tilt within the graphical content 504-B from FIGS. 5C-5E). In some embodiments, contact 505 is a continuation of the scroll input 550 (e.g., the scroll input 550 continues scrolling the article until the textual content 502-A and graphical content 502-B are no longer visible and then remains in contact with the touch screen 112). In some embodiments, contact 505 is a new contact that is distinct from the scroll input 550 (e.g., the scroll input 550 concludes when the user lifts-off from the touch screen 112 and then the user then later initiates contact 505 with the touch screen 112).

In some embodiments, when the characteristic intensity of contact 505 exceeds $IT_L$, the textual content 504-A is blurred in order to provide the user with a visual cue that the interactive user interface object included in 504-B is now available for additional interactions. In some embodiments, the blurring of textual content 504-A dynamically increases as the characteristic intensity of contact continues to increase (e.g., as shown in FIGS. 5E-5H, the third content 504-A is blurred more as the characteristic intensity of contact 505 continues to increase).

Figure 5F:
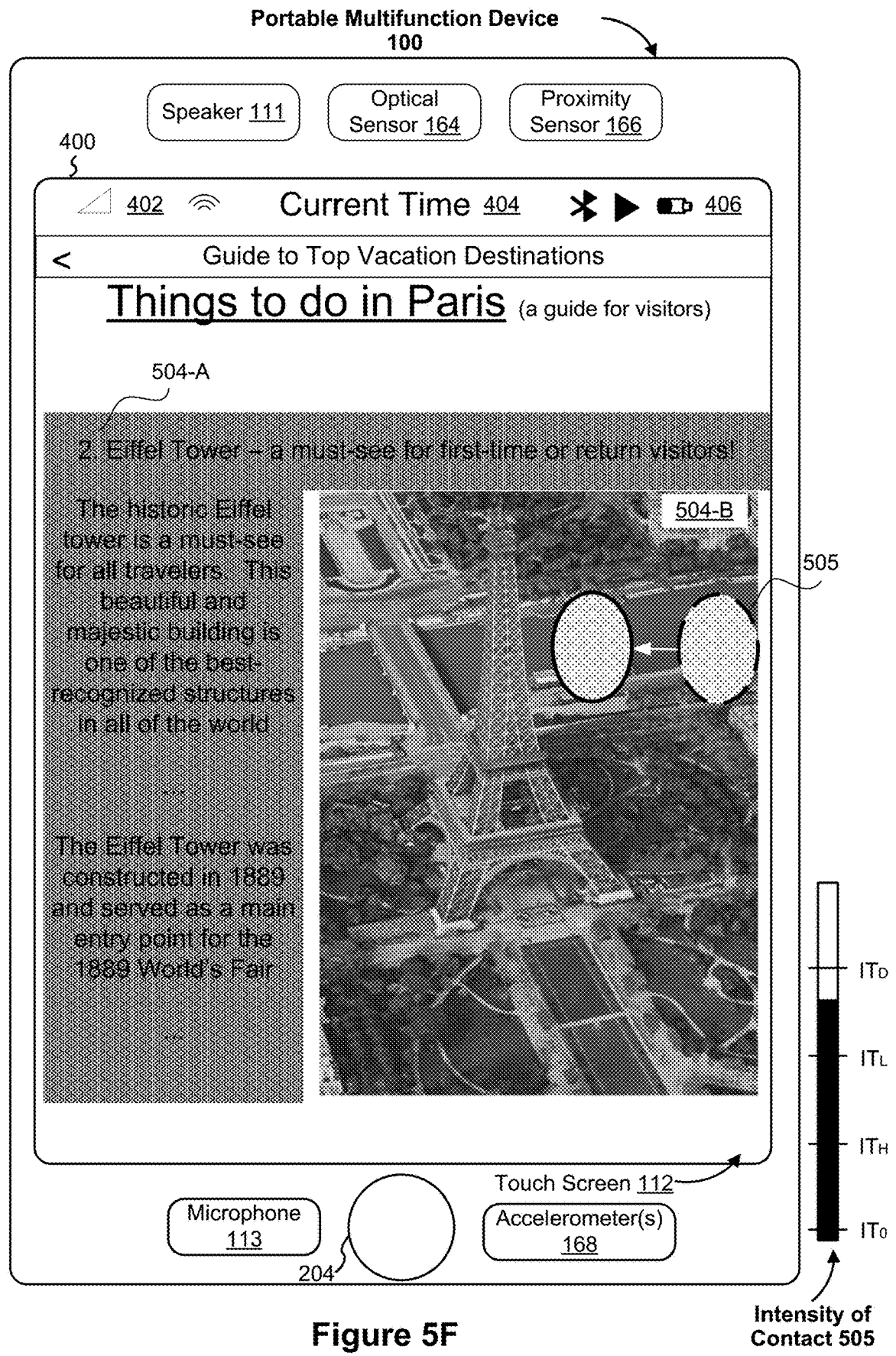
Figure 5G:
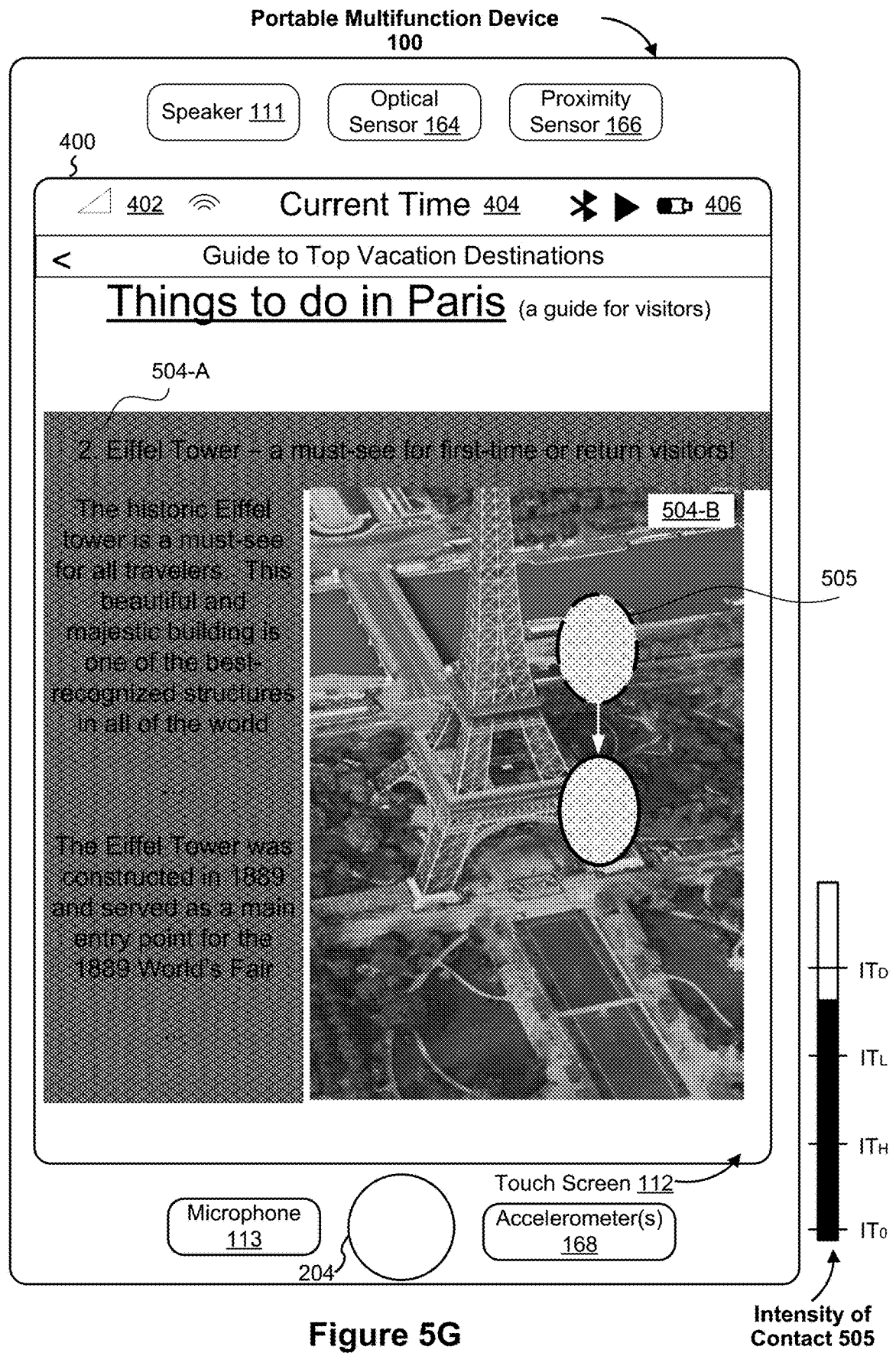

Some additional interactions include the ability to further manipulate a viewpoint for the interactive user interface object in addition to changing tilt of the viewpoint. For example, once the characteristic intensity of the contact 505 is above $IT_L$, the user is able to rotate the interactive user interface object by moving contact 505 in a lateral direction. For example, as shown in FIG. 5F, in accordance with a determination that the characteristic intensity of the contact 505 exceeds $IT_L$ and in response to substantially leftward movement of the contact 505, the viewpoint for the interactive user interface object included in graphical content 504-B is rotated in accordance with the substantially leftward movement of the contact 505. As another example of the additional interactions, once the characteristic intensity of the contact 505 is above $IT_L$, the user is able to manipulate the interactive user interface object by moving contact 505 in a vertical direction (e.g., as shown in FIG. 5G, in accordance with a determination that the characteristic intensity of the contact 505 exceeds $IT_L$ and in response to substantially downward movement of contact 505, the viewpoint for the interactive user interface object is shifted in the substantially downward direction).

Figure 5H:
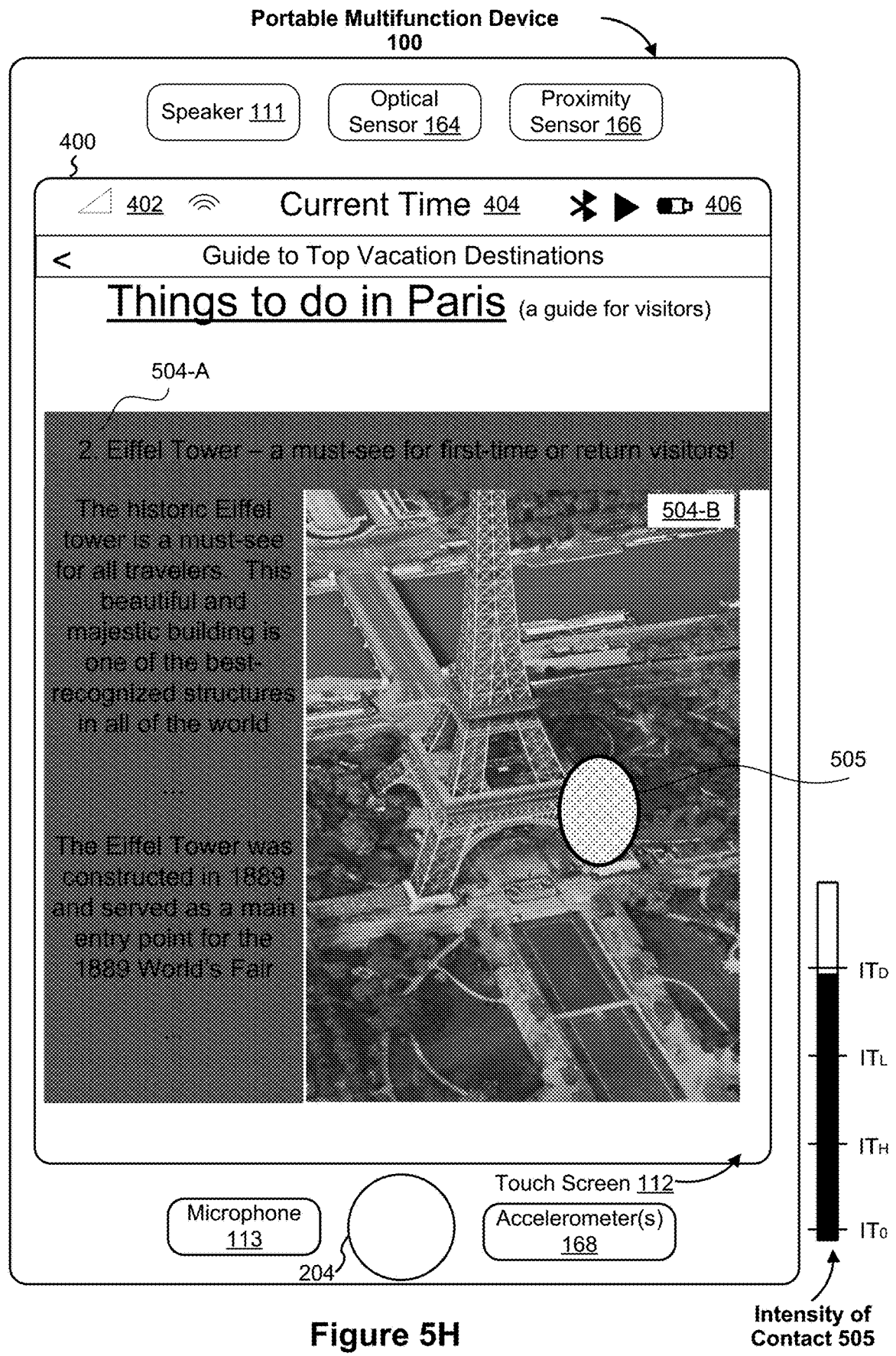
Figure 5I:
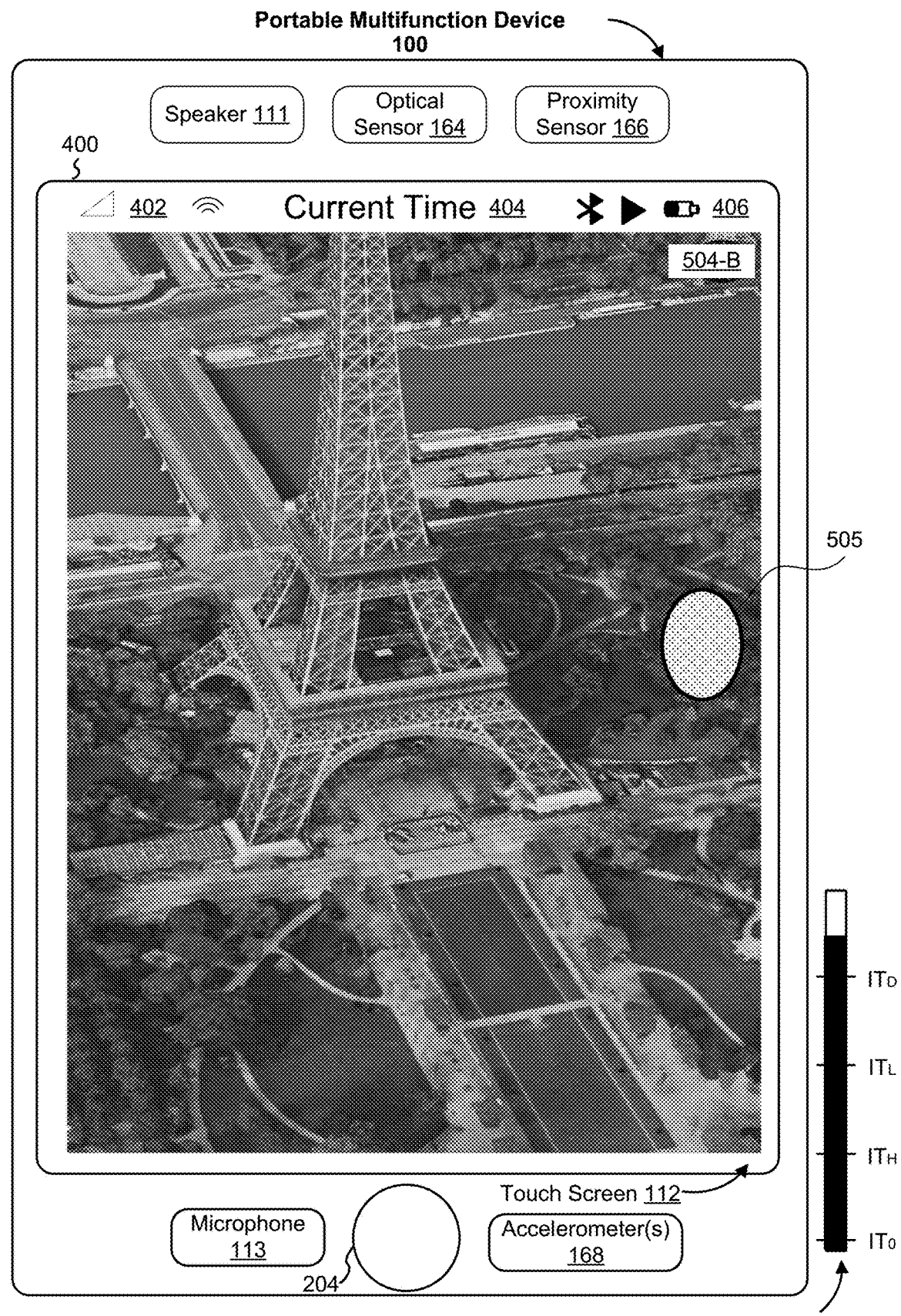
Figure 5J:
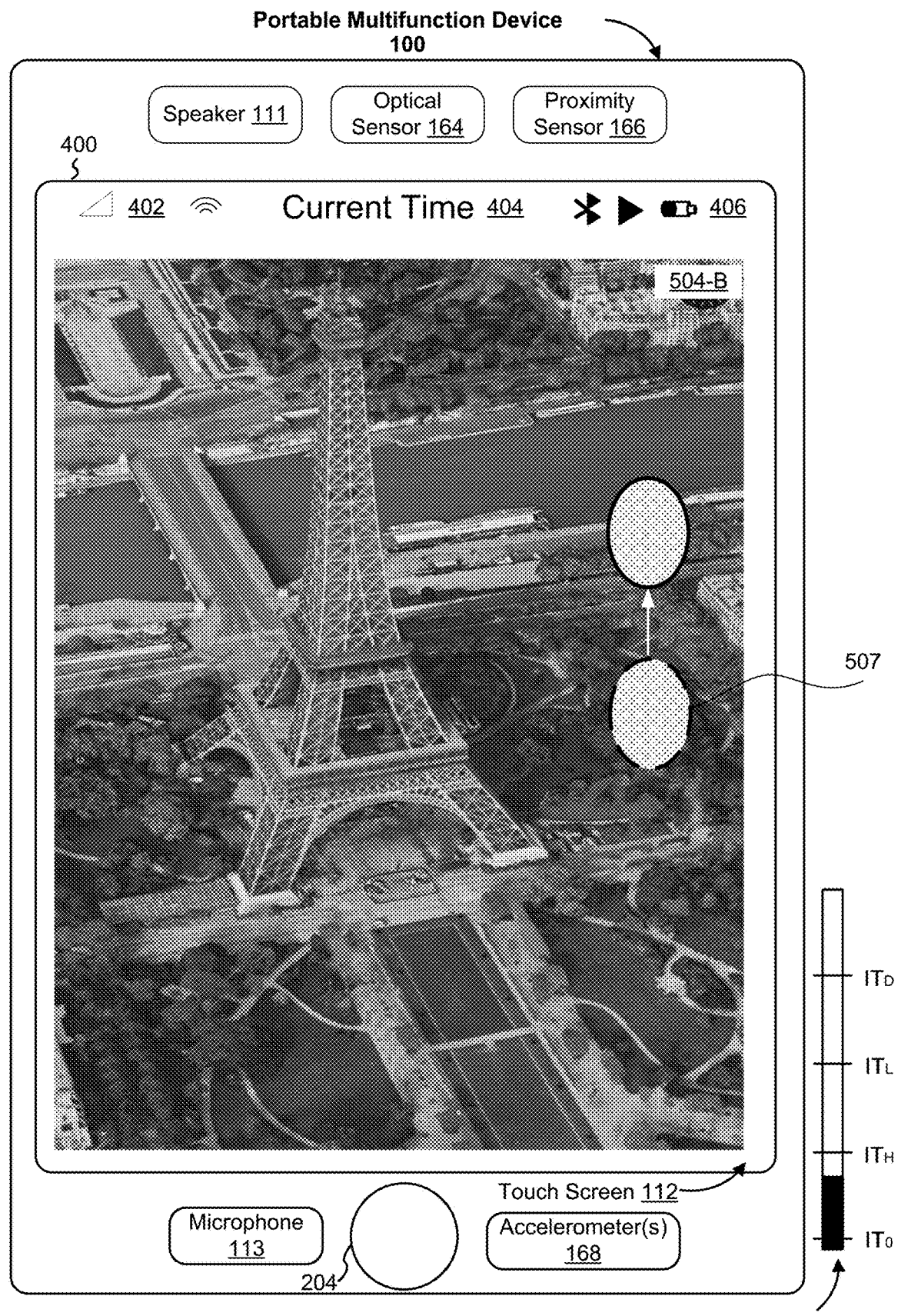
Figure 5K:
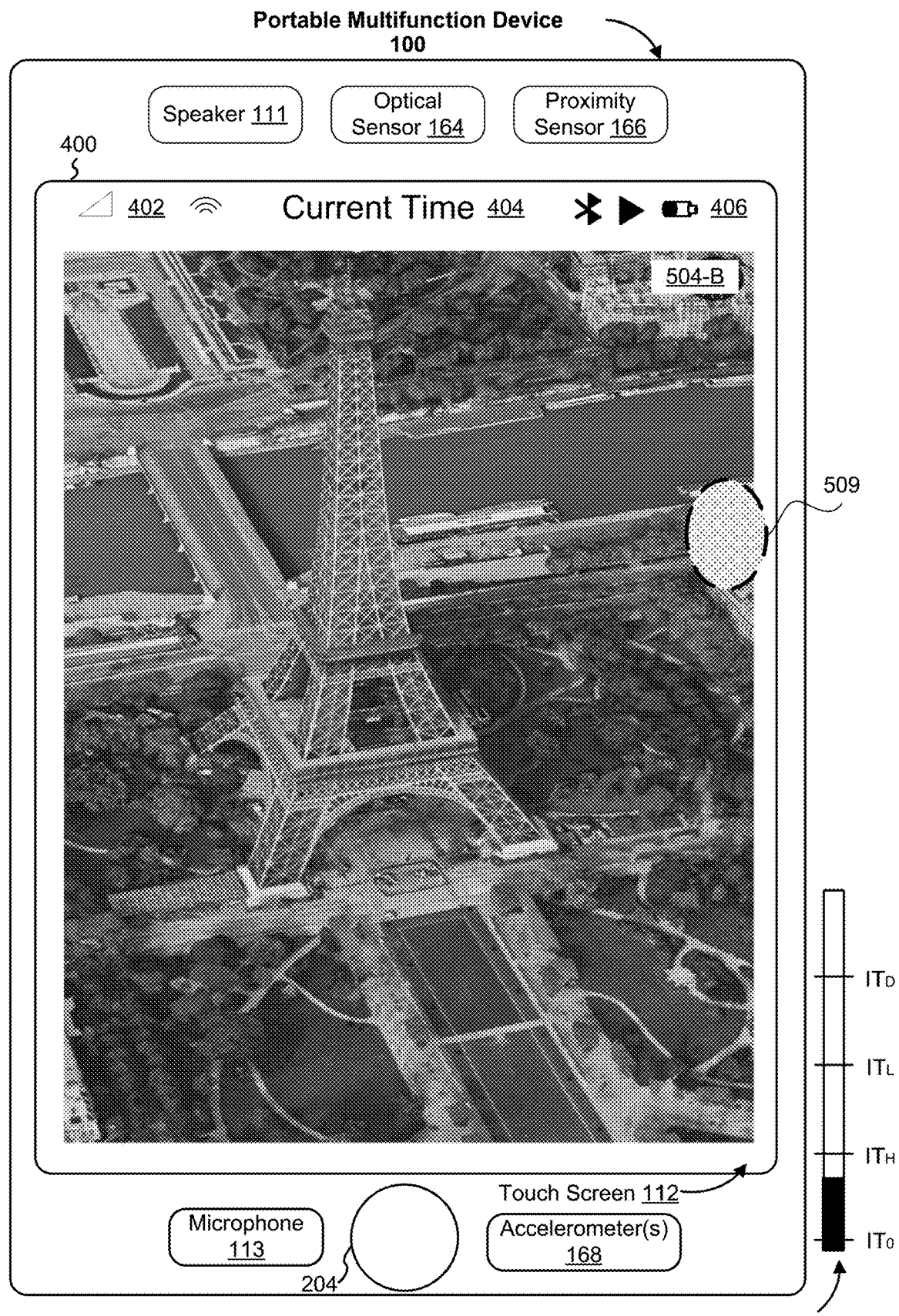
Figure 5L:
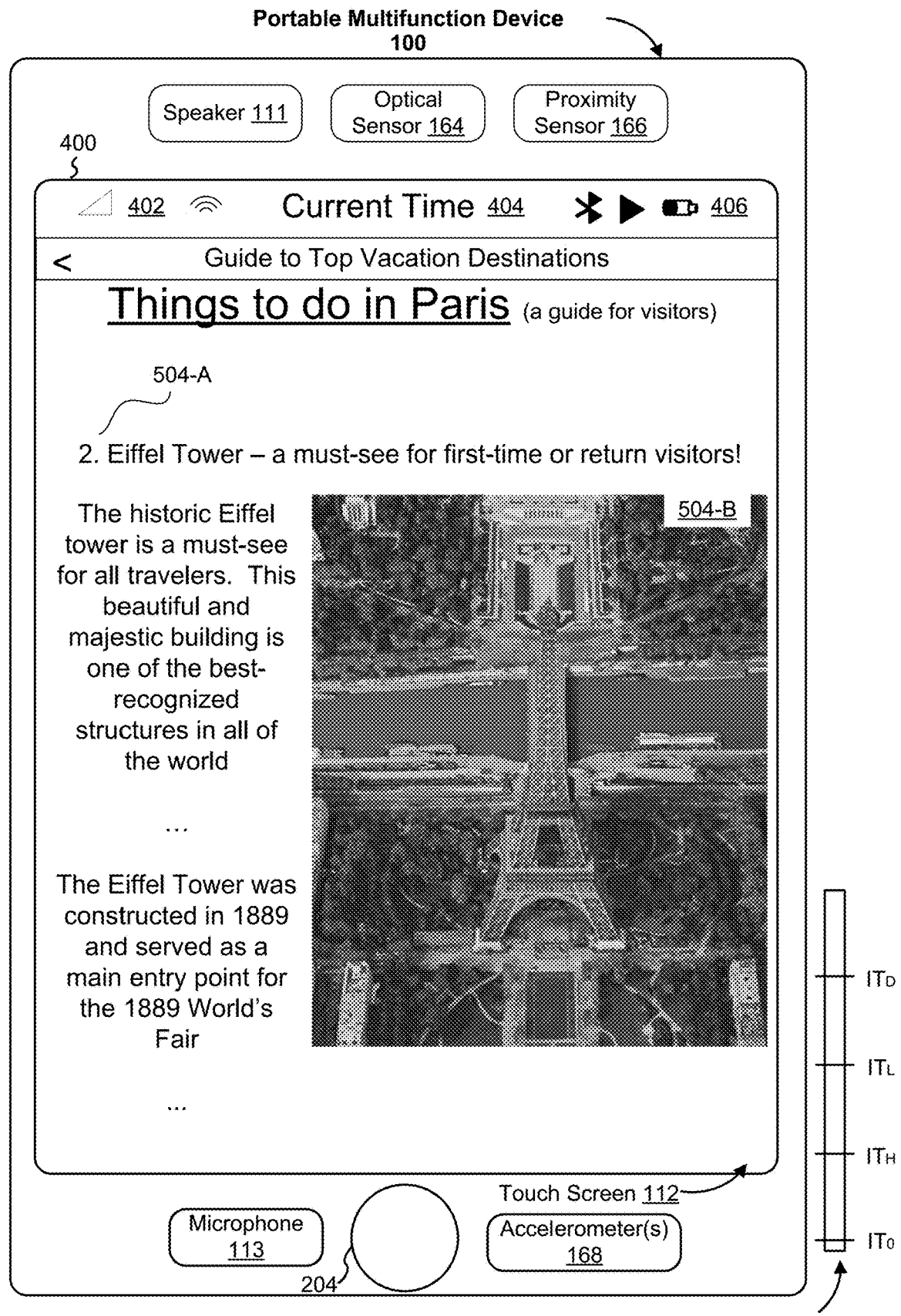

In some embodiments, an increased-interaction display mode is also available for manipulating the interactive user interface object. As shown in FIG. 5H, the characteristic intensity of contact 505 increases to just below $IT_D$ and then the characteristic intensity of contact 505 exceeds $IT_D$ in FIG. 5I. In accordance with a determination that the characteristic intensity of the contact exceeds $IT_D$, the interactive user interface object is presented in the increased-interactive display mode (as shown in FIG. 5I). In some embodiments, the user can continue to manipulate the interactive user interface object while it is presented in the increased-interactive display mode (e.g., using contact 507 and then moving the contact 507 in a substantially upward direction, in order to view more of the Eiffel Tower, as shown in FIG. 5J). In some embodiments, changes made to the appearance of the interactive user interface object while in the increased-interaction display mode are persistent (e.g., as shown in FIG. 5K, even after contact 507 lifts-off of the touch screen 112, the changes made to the appearance of the interactive user interface object based on vertical movement of the contact 507 remain).

In some embodiments, the user can exit the increased-interaction display mode by inputting a predefined gesture (e.g., a double-tap or additional deep press (in addition to the deep press to activate the increased-interaction display mode) over the interactive user interface object while it is displayed in the increased-interaction display mode). For example, FIG. 5K illustrates a double-tap (e.g., contact 509) over the interactive user interface object while it is displayed in the increased-interaction display mode and, in response, the interactive user interface object is no longer displayed in the increased-interaction display mode and is instead shown again adjacent to textual content 504-A (as pictured in FIG. 5L). In some embodiments, an animation is presented that shows the interactive user interface object decreasing in size and moving back into position adjacent to the textual content 504-A and, while the interactive user interface object decreases in size, the textual content 504-A begins coming back into focus (e.g., is no longer blurred).

Figure 5M:
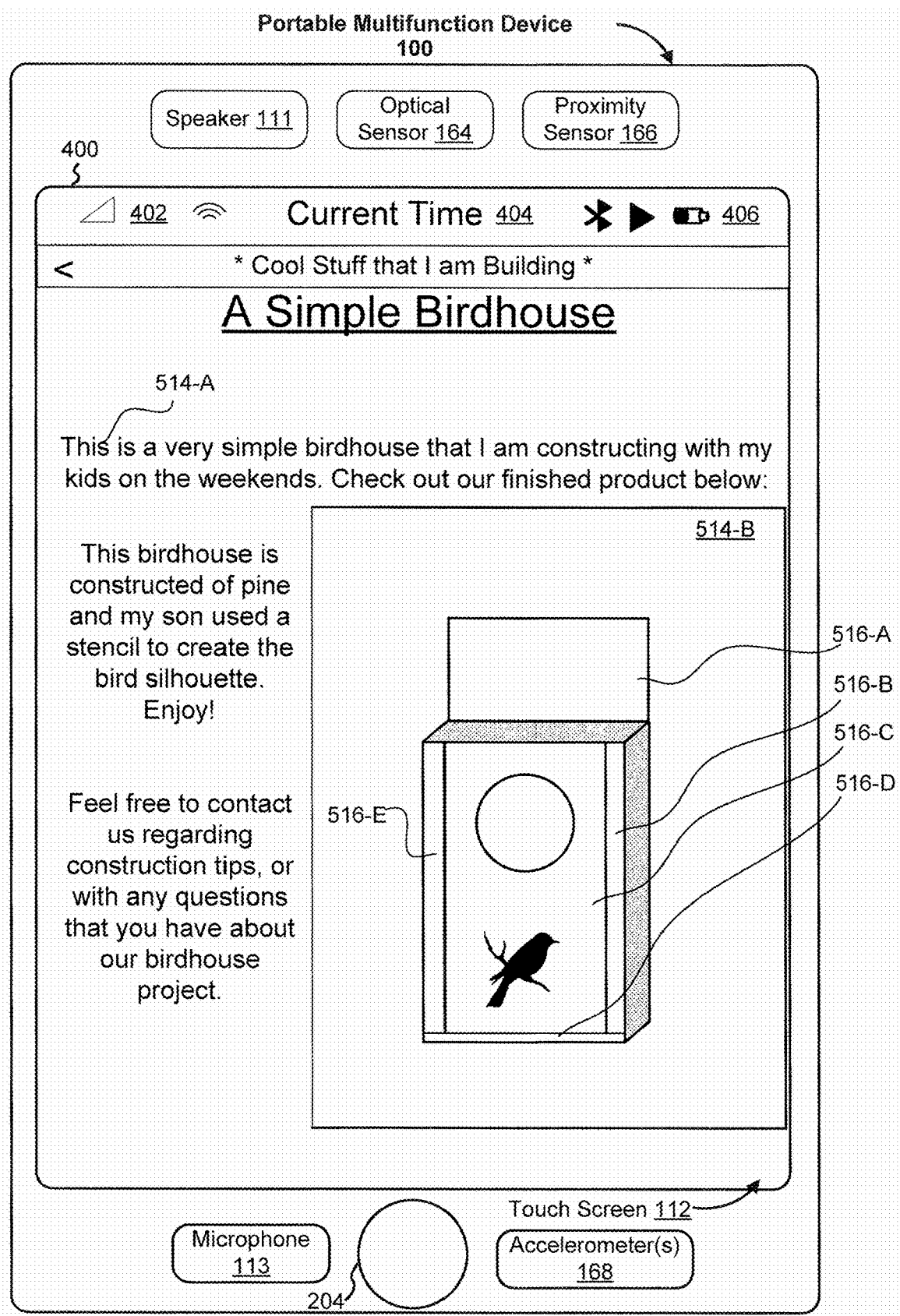
FIG. 5M-5R illustrate example user interfaces for dynamically expanding separate component parts of a 3D feature in accordance with some embodiments.

In some embodiments, changing an appearance of the interactive user interface object includes dynamically expanding separate component parts of a 3D feature. FIG. 5M-5R illustrate example user interfaces for dynamically expanding separate component parts of a 3D feature in accordance with some embodiments. In particular, FIG. 5M illustrates a user interface for a news application (e.g., news module 142, FIG. 1A) or a browser application (e.g., browser module 147, FIG. 1A) in which a user is viewing an article about "A Simple Birdhouse." As shown in FIG. 5M, the user interface includes textual content 514-A and associated graphical content 514-B. In some embodiments, the associated graphical content 514-B is a 3D feature (e.g., a constructed birdhouse or a portion thereof) having separate component parts (e.g., each panel 516-A to 516-E forms a portion of the constructed birdhouse). In some embodiments, an intensity-based gesture is detected that allows the user to easily view an exploded view of the 3D feature and its separate component parts.

Figure 5N:
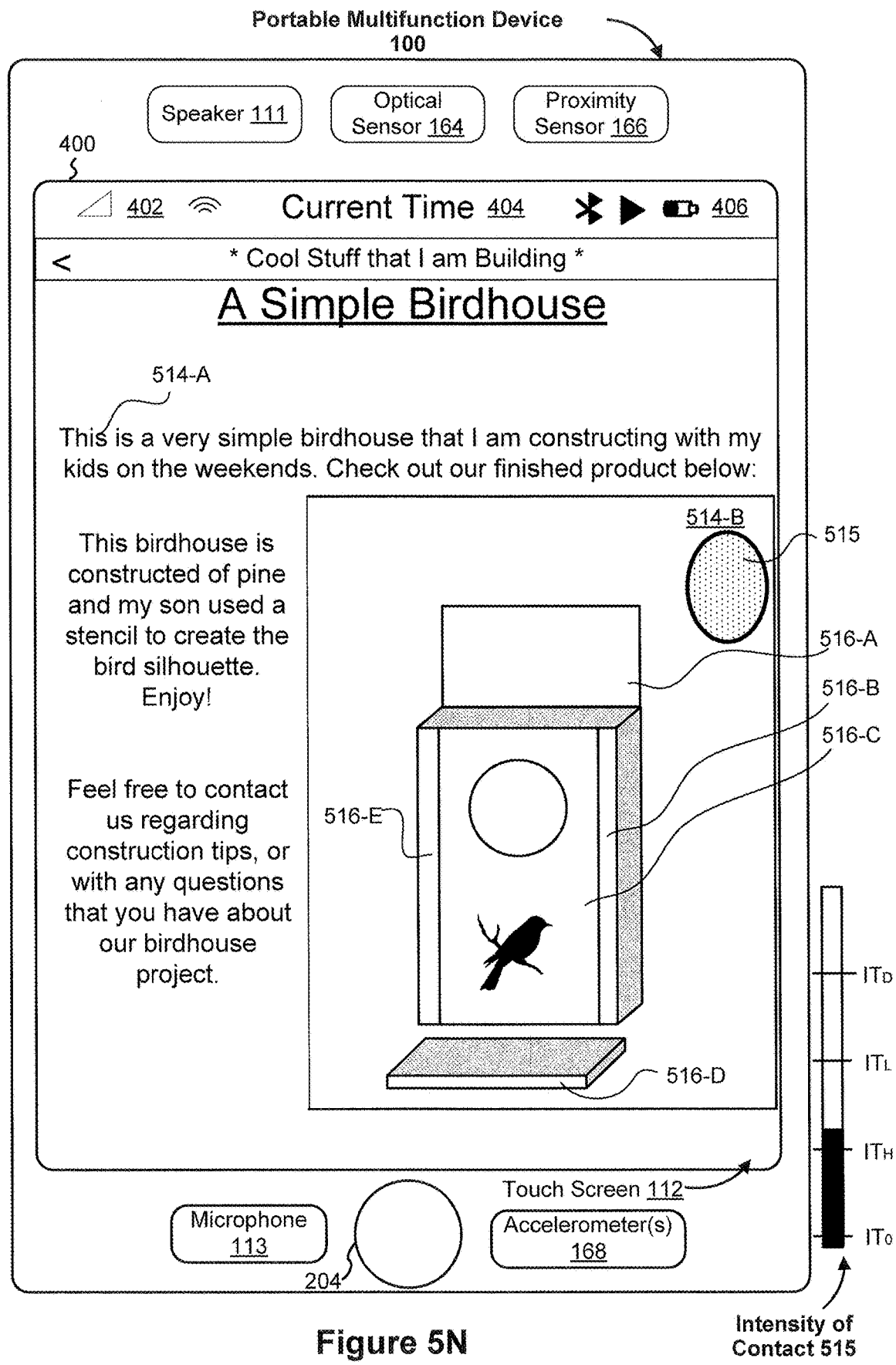

For example, the sequence of user interfaces shown in FIGS. 5M-5S illustrates that as the user increases a characteristic intensity of a contact (e.g., contact 515 over the graphical content 514-B), the exploded view of the 3D feature is presented showing each of the separate component parts. As shown in FIG. 5N, when the characteristic intensity of the contact 515 exceeds a first intensity threshold (e.g., $IT_H$), a first separate component part of the 3D feature (e.g., bottom panel 516-D of the birdhouse) is separated from the rest of the 3D feature. In this way, the user is provided with a visual cue that the 3D feature included within graphical content 514-B exhibits respective interactive behavior responsive to changes in detected contact intensity.

Figure 5O:
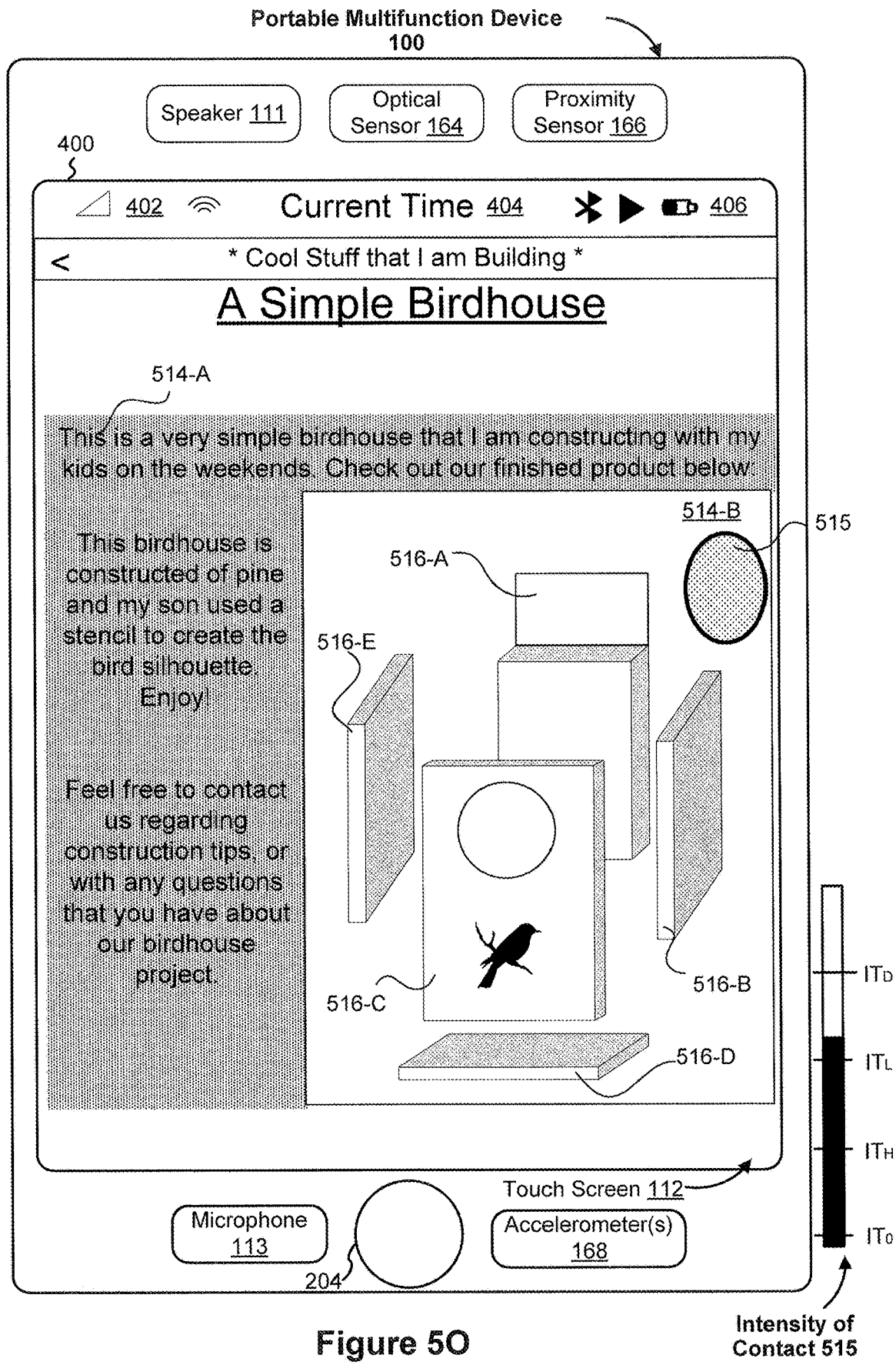

Turning now to FIG. 5O, when the characteristic intensity of the contact 515 exceeds a second intensity threshold (e.g., $IT_L$), the other separate component parts of the 3D feature (e.g., first side panel 516-E, second side panel 516-B, front panel 516-C, and back panel 516-A) are now also separated. In some embodiments, a distance between the 3D feature and the first separate component part of the 3D feature also increases (e.g., the bottom panel 516-D is further separated from the other component parts).

Figure 5P:
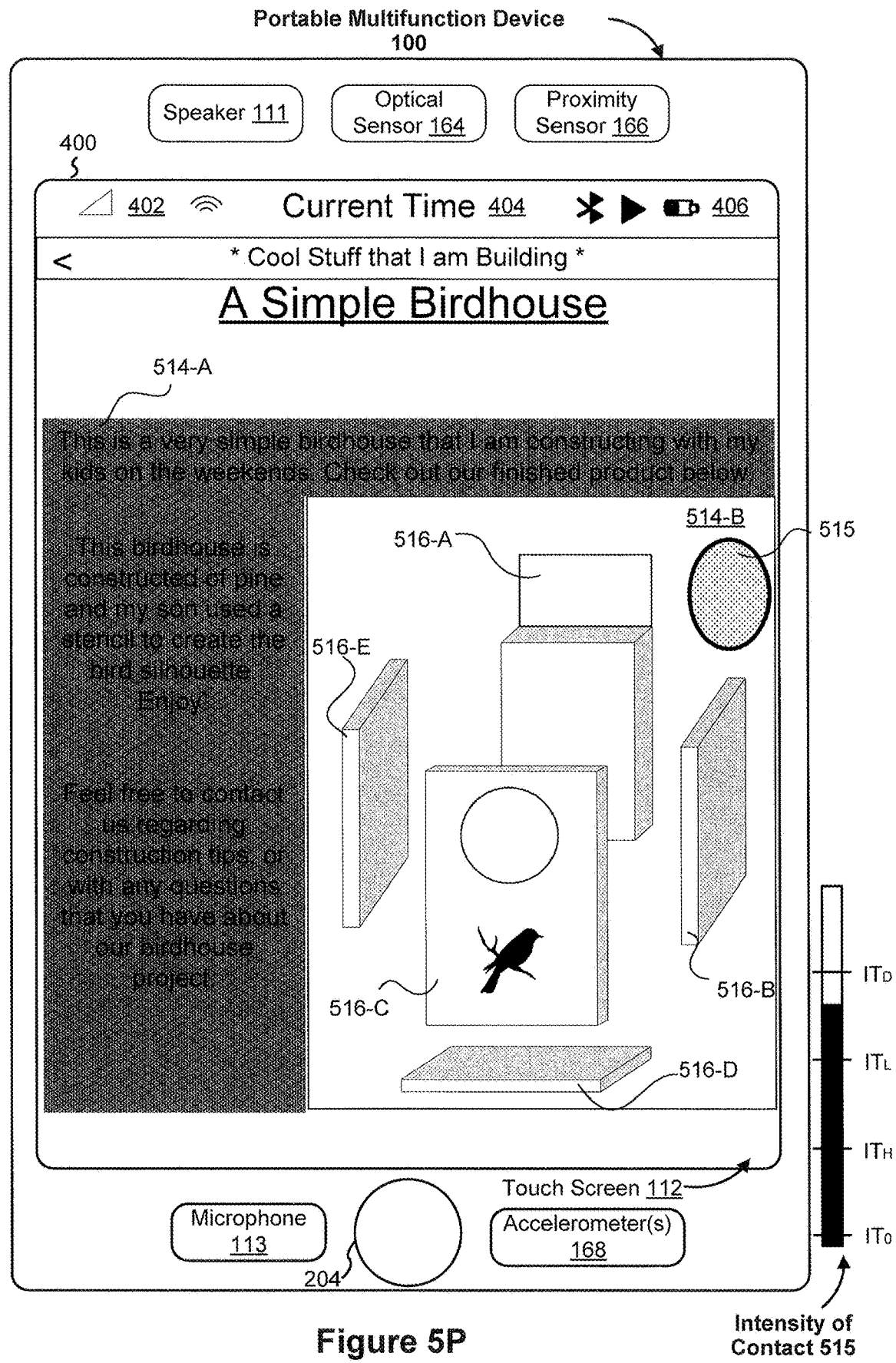
Figure 5Q:
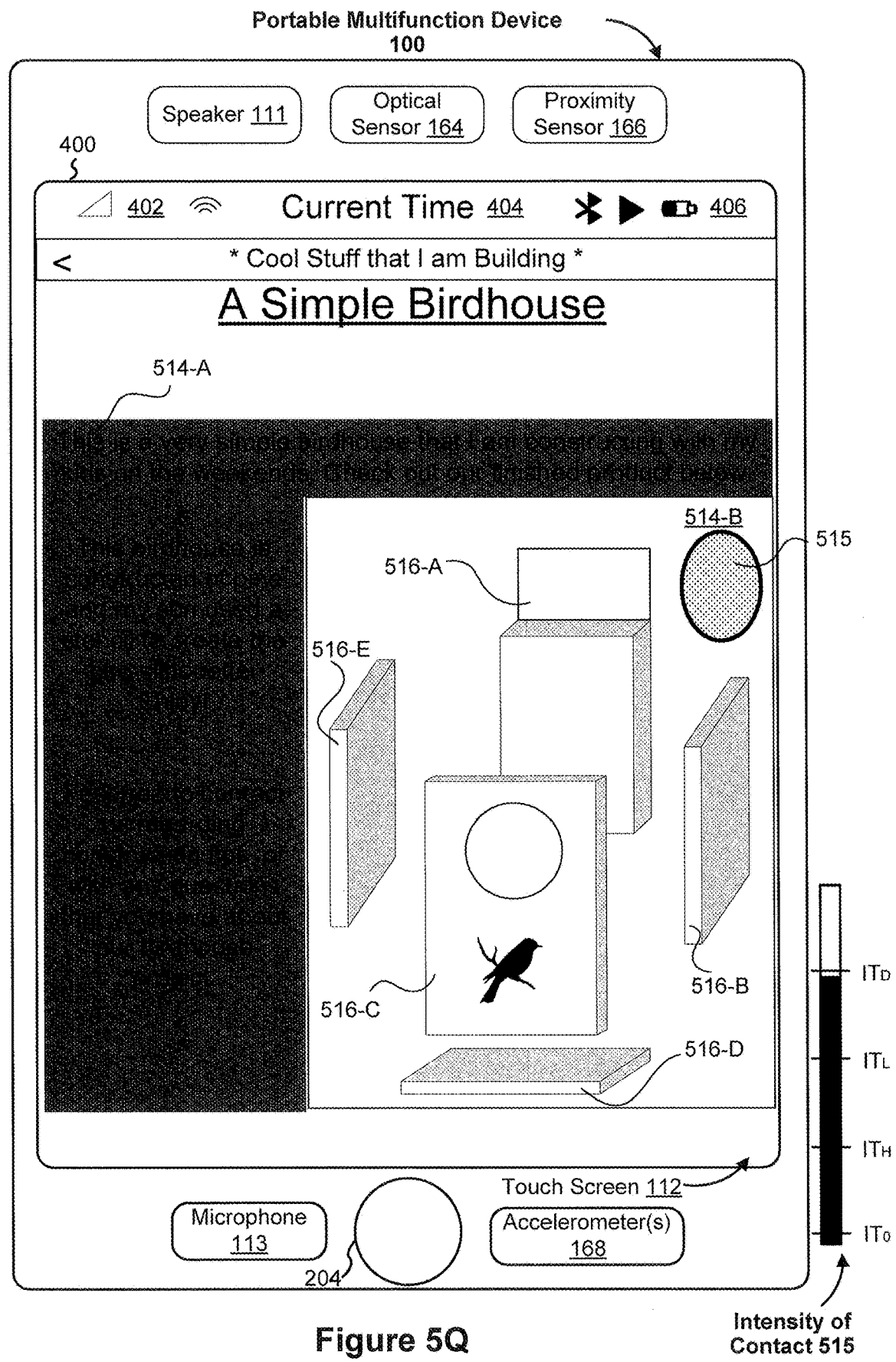

Turning now to FIGS. 5P and 5Q, as the characteristic intensity of the contact 515 increases, additional separation of the separate component parts occurs in response (e.g., each of the panels 516-A to 516-E are now shown at a greater distance apart, as the characteristic intensity of the contact 515 increases). In some embodiments, as the characteristic intensity of the contact 515 increases, a blurring of the textual content 514-A also increases (as shown in FIGS. 5O-5Q).

Figure 5R:
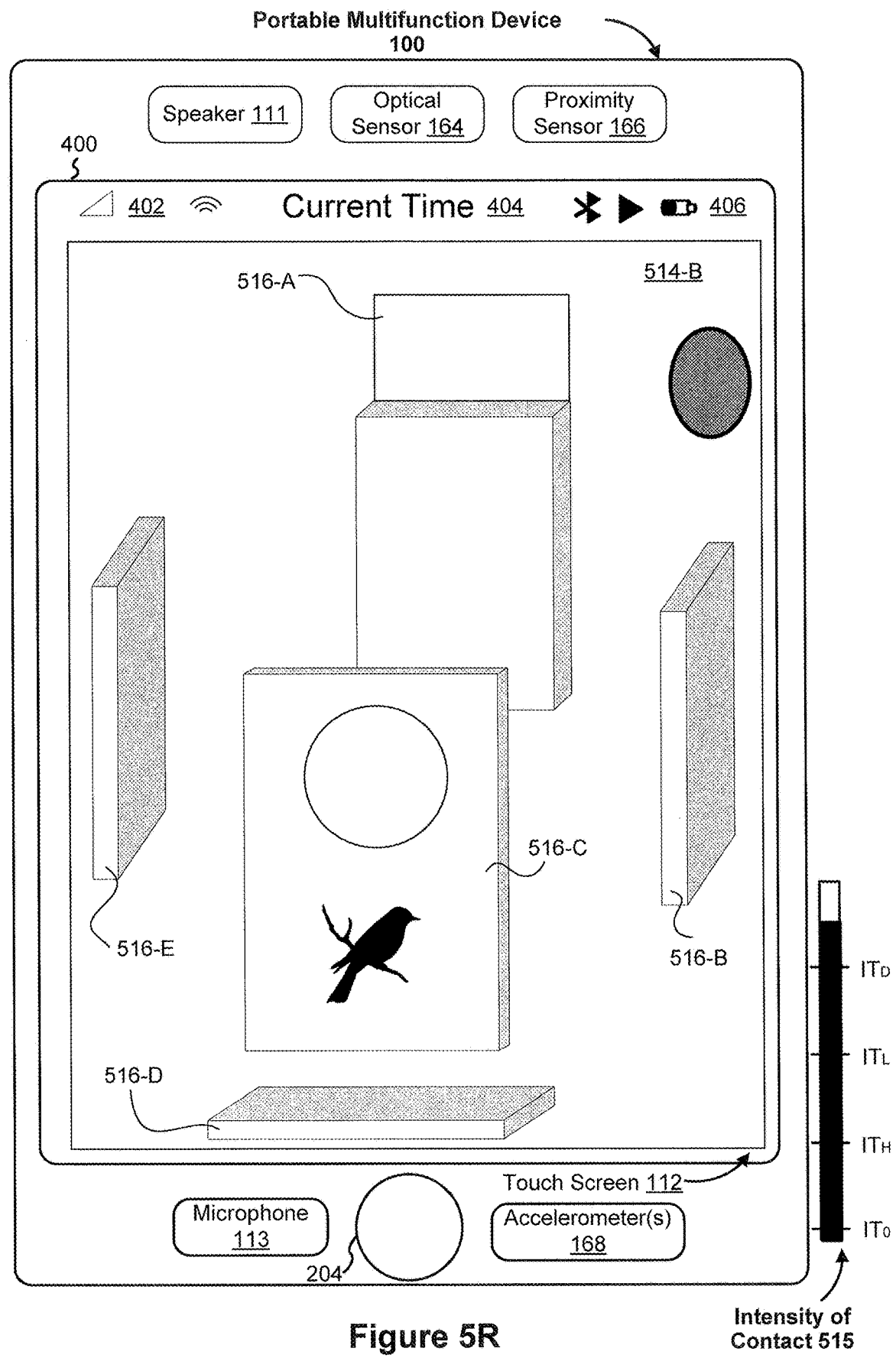

In some embodiments and as shown in FIG. 5R, when the characteristic intensity of the contact exceeds a third intensity threshold (e.g., $IT_D$), the graphical content 514-B is shown in an increased-interaction display mode with each of the separate component parts shown at a greater distance apart as well. In some embodiments, all of the graphical content 514-B is shown in the increased-interaction display mode while, in some embodiments only the 3D feature is shown in the increased-interaction display mode (e.g., the birdhouse and its separate component parts are shown in the increased-interaction display mode, while background images (a tree on which the birdhouse is installed) are not shown in the increased-interaction display mode).

Figure 5S:
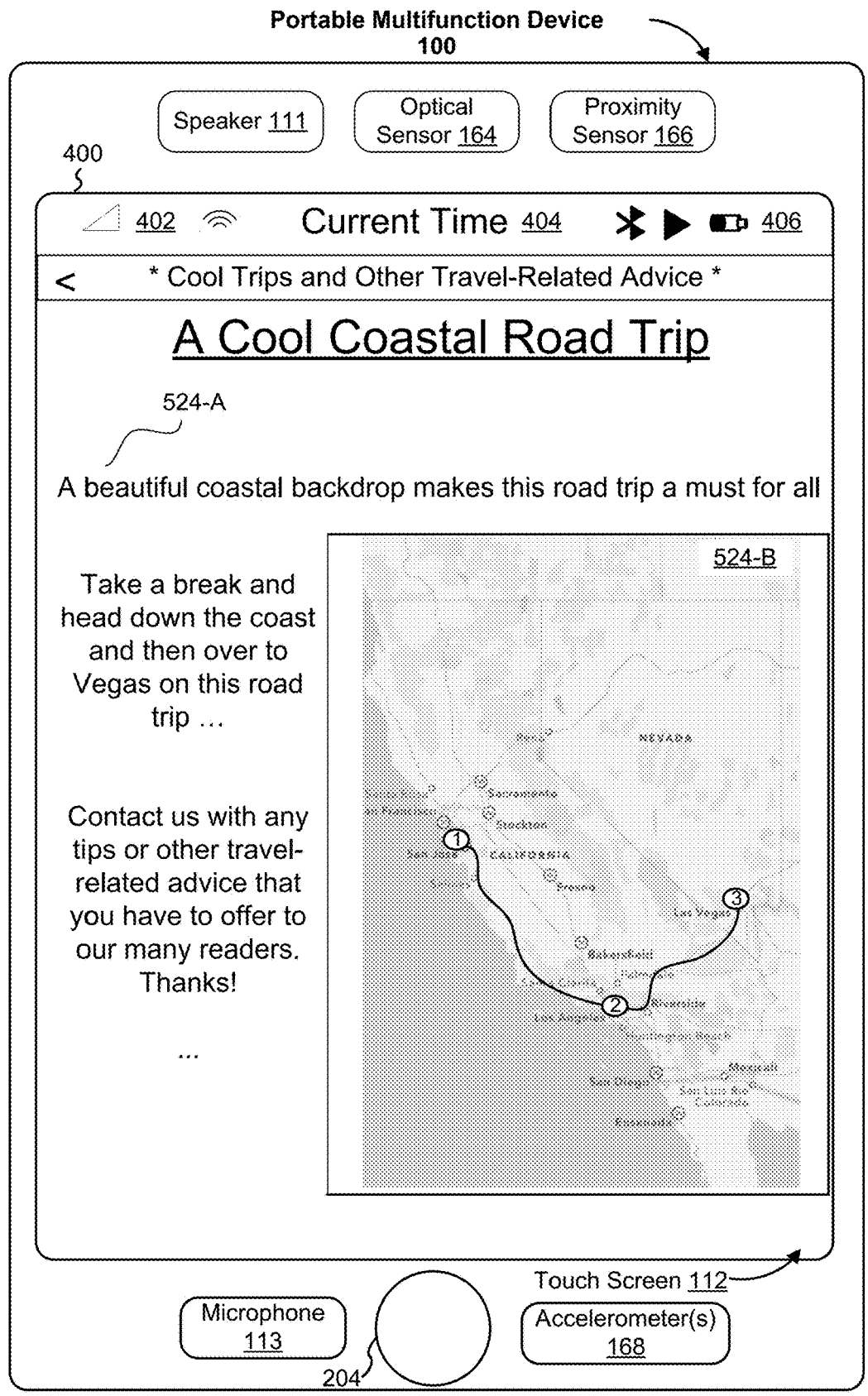
FIGS. 5S-5X illustrate example user interfaces for updating an interactive user interface object to move between displaying each of two or more location-based identifiers in accordance with some embodiments.

In some embodiments, changing an appearance of the interactive user interface object includes updating an interactive user interface object to move between displaying each of two or more location-based identifiers (e.g., destinations or waypoints on a map). FIGS. 5S-5X illustrate example user interfaces for updating an interactive user interface object to move between displaying each of two or more location-based identifiers in accordance with some embodiments. As shown in FIG. 5S, a user is viewing an article about "A Cool Coastal Road Trip" and the article includes textual content 524-A and graphical content 524-B. In some embodiments, the graphical content 524-B includes an interactive user interface object such as a map object with a number of location-based identifiers (e.g., waypoints along a route, such as a first waypoint in the vicinity of Palo Alto ("1"), a second waypoint in the vicinity of Los Angeles ("2"), and a third waypoint in the vicinity of Las Vegas ("3"), as shown in FIG. 5S).

Figure 5T:
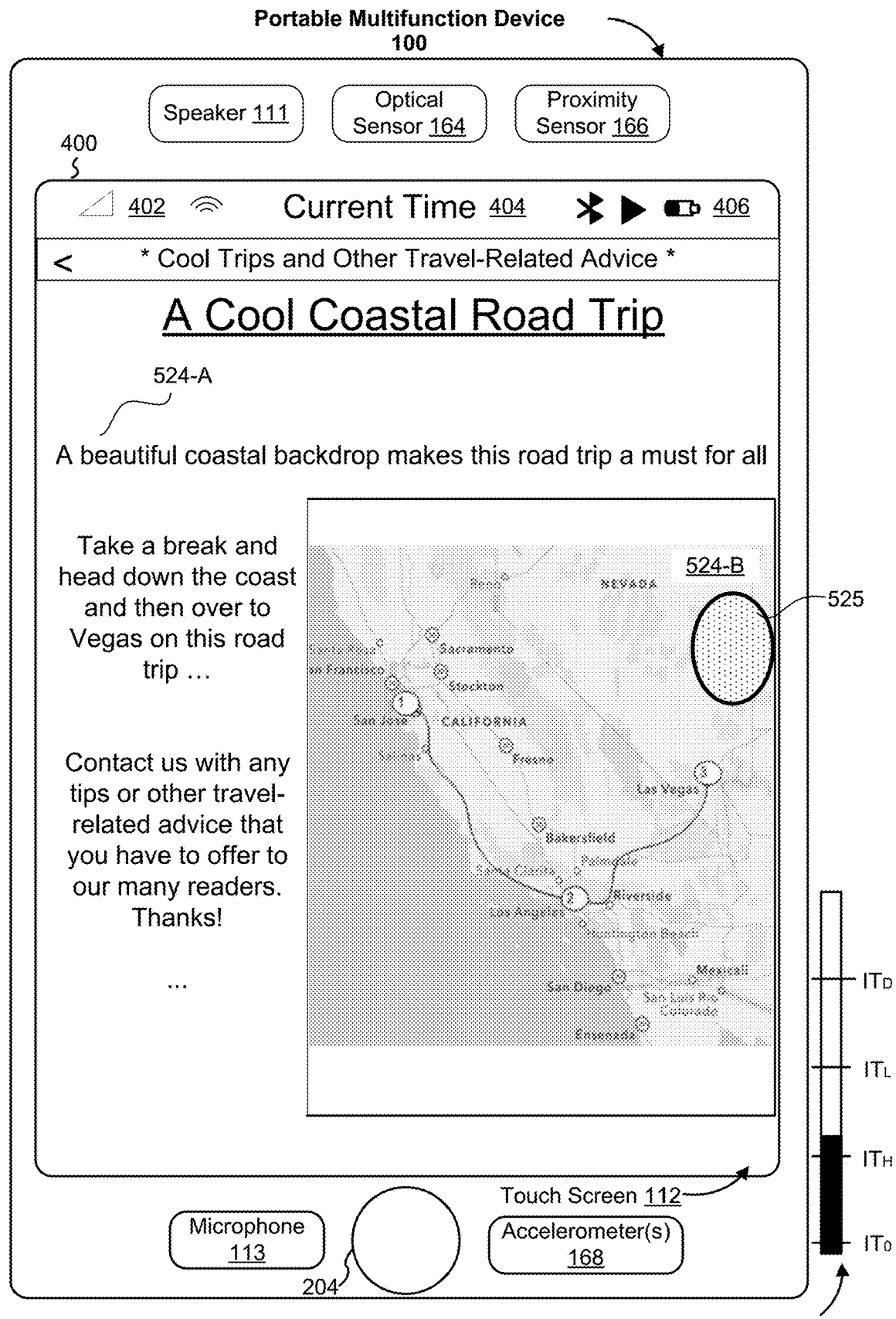

Turning now to FIG. 5T, when a characteristic intensity of a contact (e.g., characteristic intensity of the contact 525) over the map object exceeds a first intensity threshold (e.g., $IT_H$), the map object is updated so that the route can be viewed in more detail (e.g., a zoom level of the map object is increased in FIG. 5T, as compared to that shown in FIG. 5S).

Figure 5U:
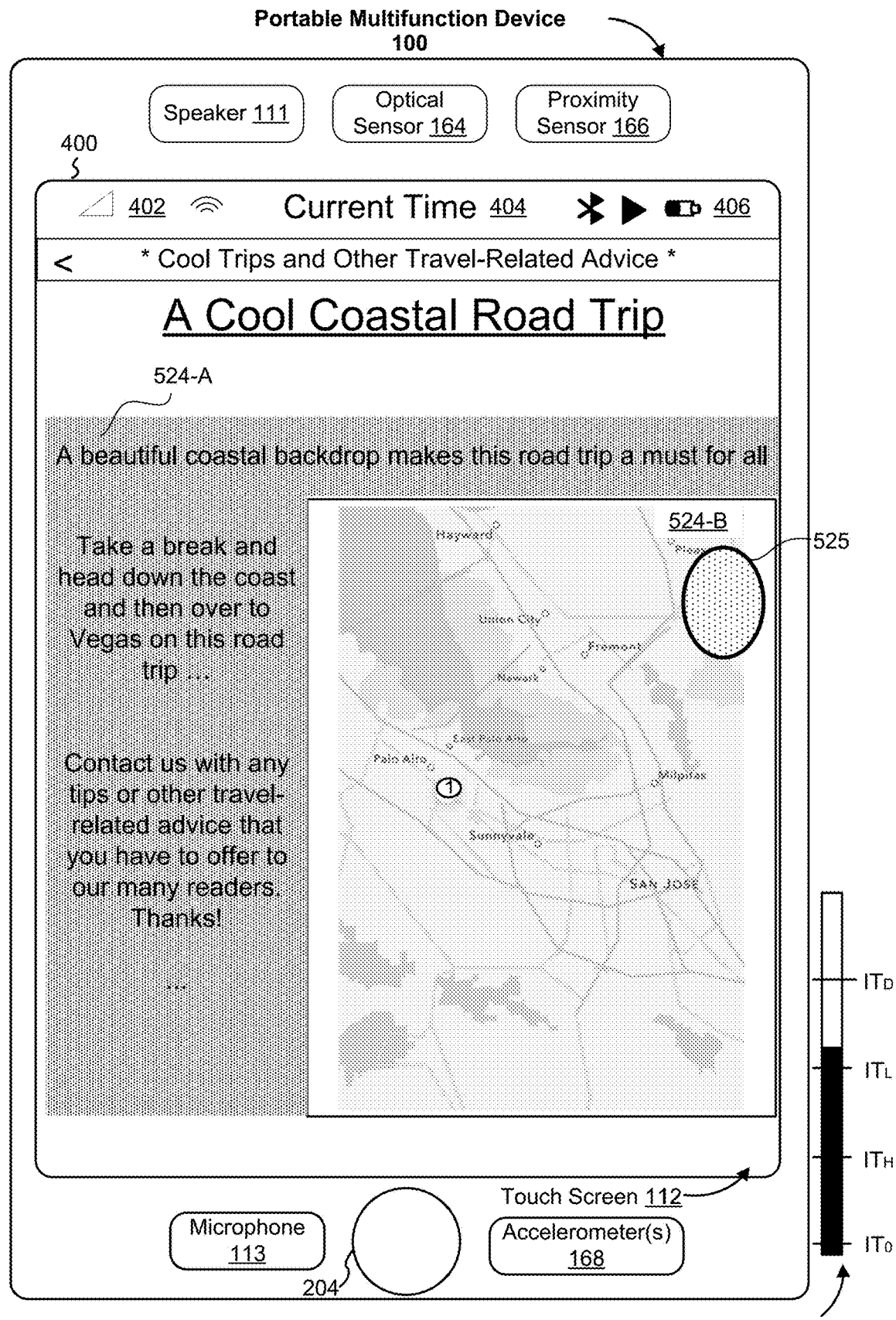
Figure 5V:
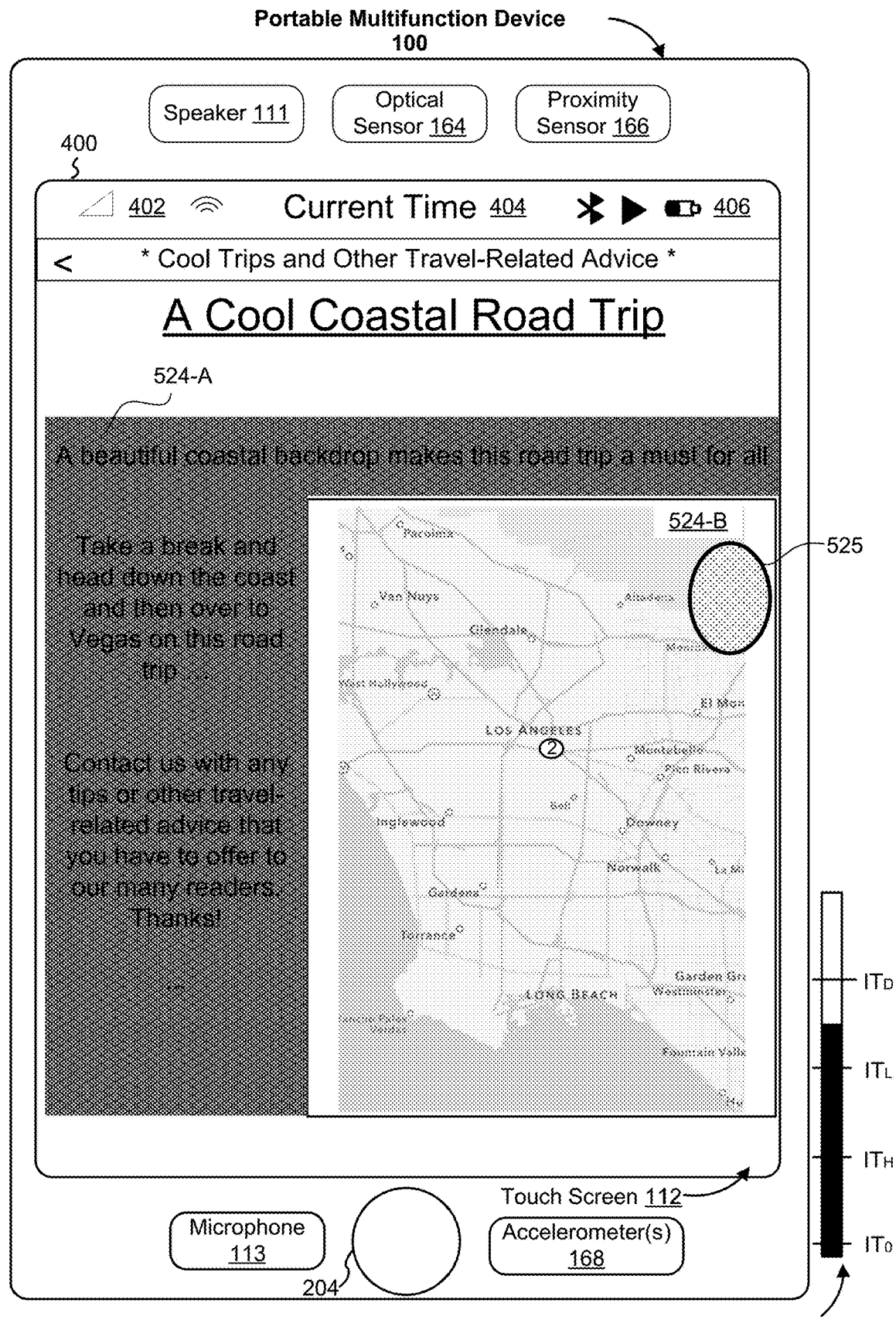
Figure 5W:
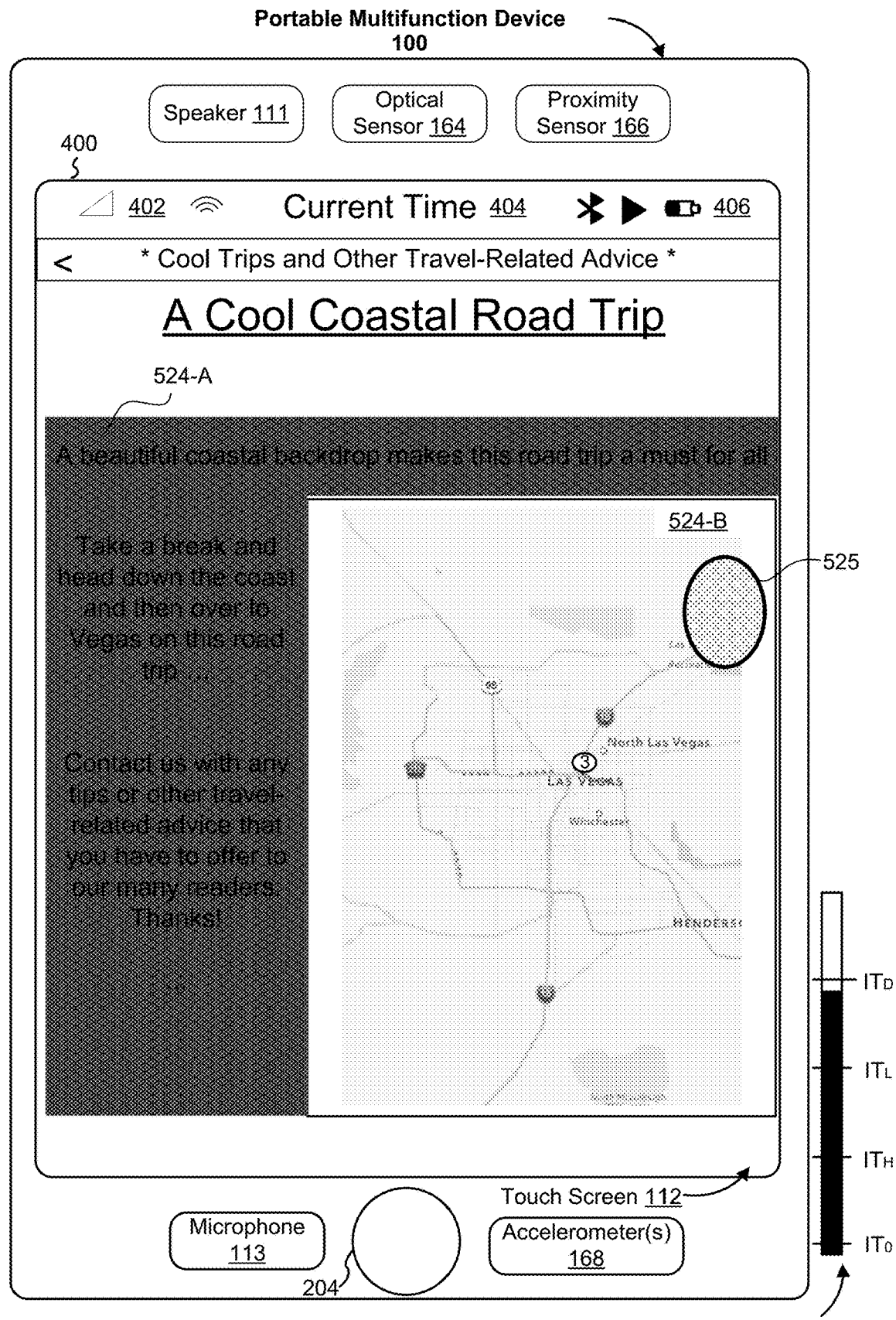
Figure 5X:
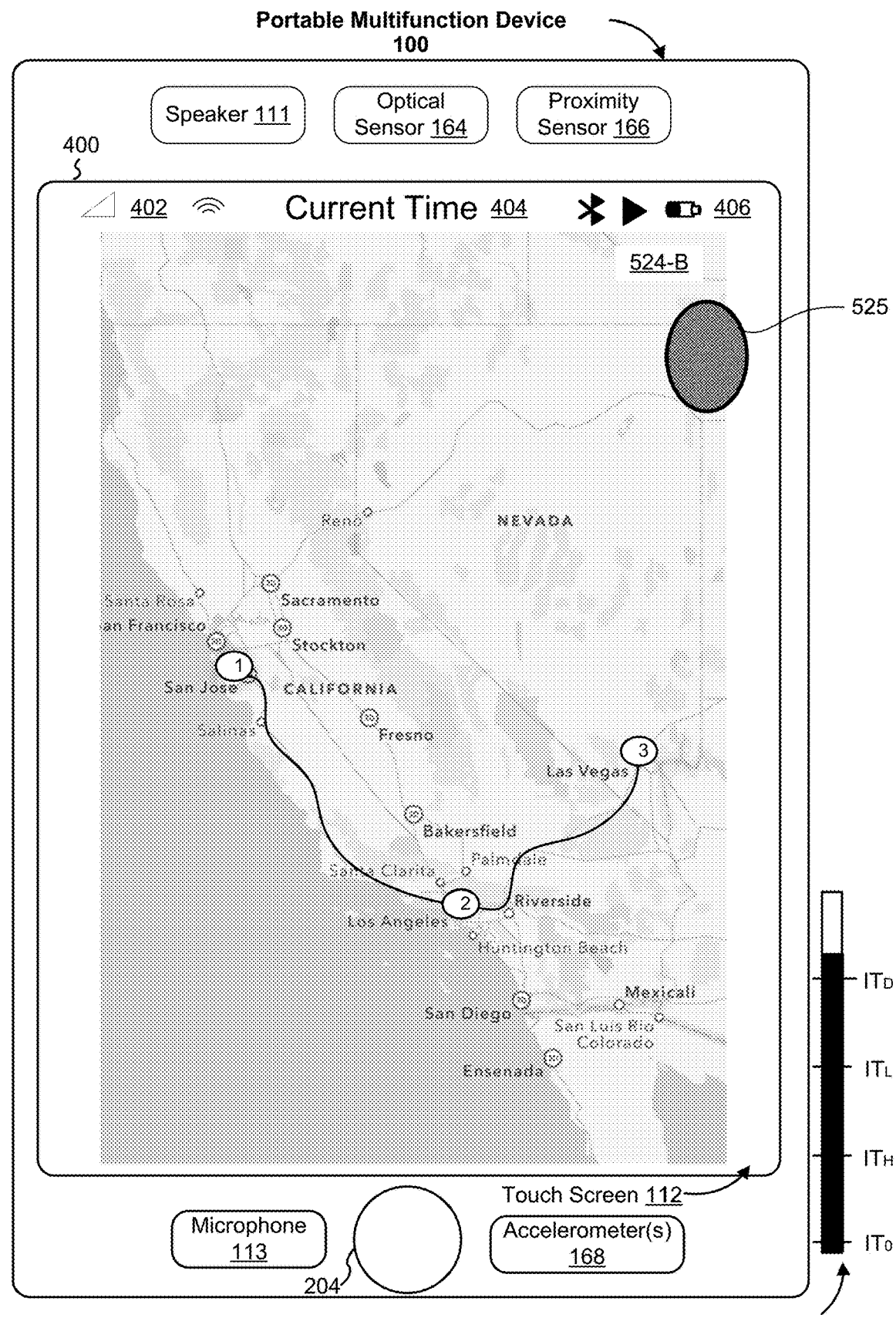
Figure 6C:
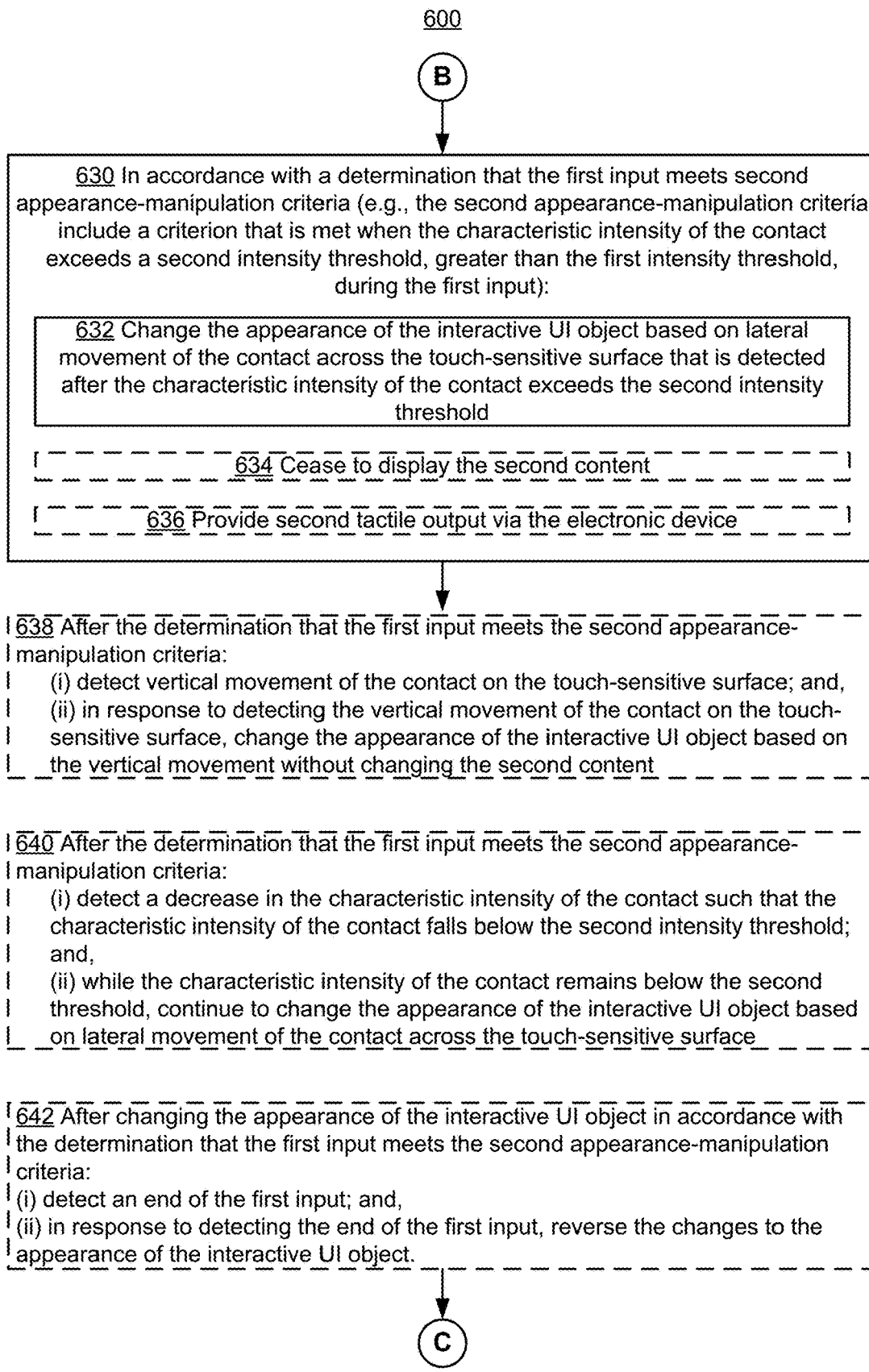
Figure 6D:
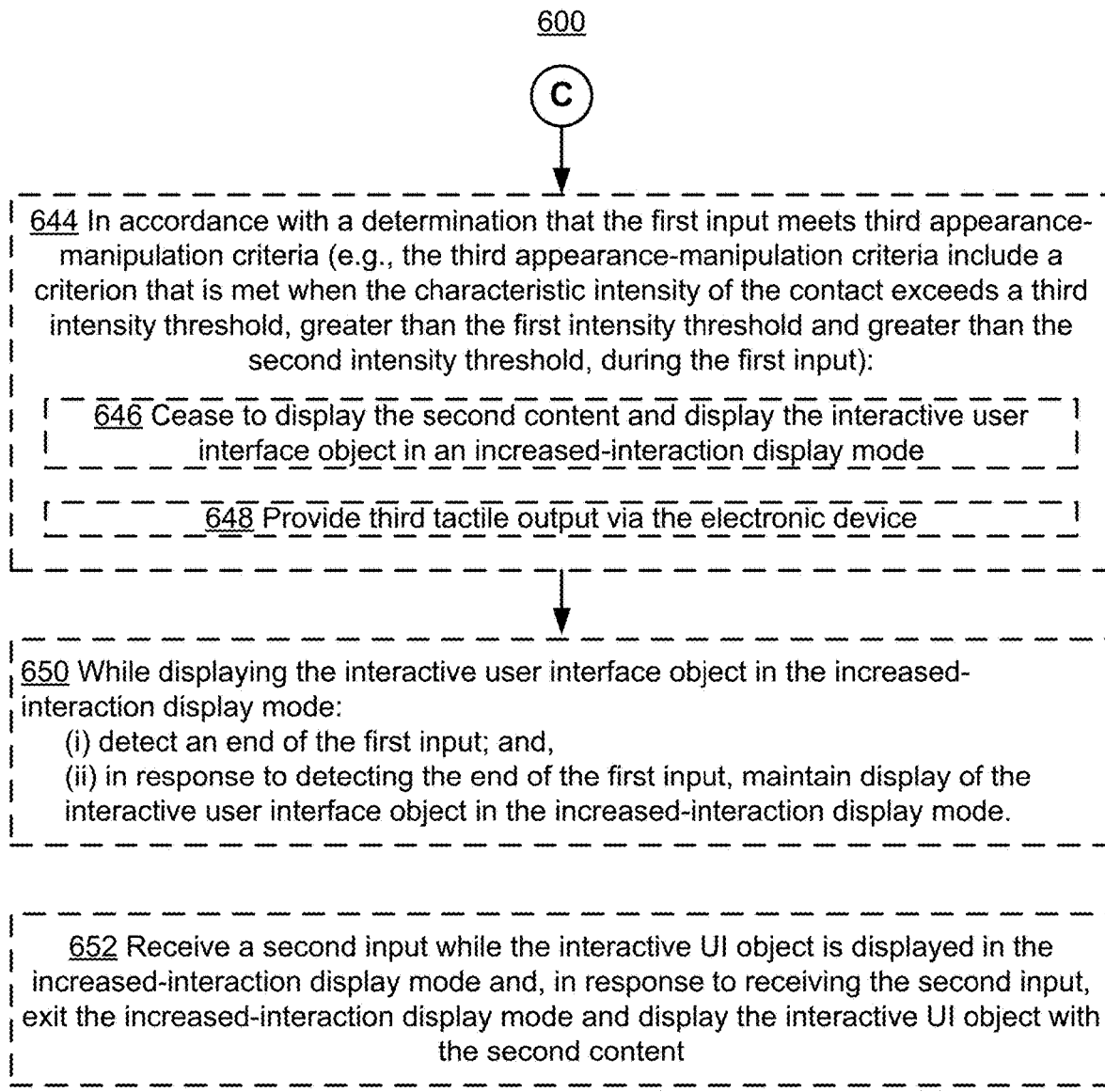

In some embodiments, as the characteristic intensity of the contact 525 continues to increase, the map object is updated to move between displaying each of the location-based identifiers. For example, when the characteristic intensity of the contact 525 over the map object increases above a second intensity threshold (e.g., $IT_L$), the map object is updated so that each waypoint can be easily viewed as the characteristic intensity of the contact 525 continues to increase above $IT_L$ (e.g., as shown in FIGS. 5U-W). In some embodiments, in conjunction with updating the map object to show each waypoint, the textual content 524-A is blurred as the characteristic intensity of the contact increases.

In some embodiments, when the characteristic intensity of contact 525 exceeds a third intensity threshold (e.g., $IT_D$), the graphical content 524-B is shown in an increased-interaction display mode. In some embodiments, the full map object is displayed at its original zoom level in the increased-interaction display mode (e.g., as pictured in FIG. 5X, the full map object, including all waypoints, is shown in the increased-interaction display mode). In some embodiments, the map object as it appeared immediately before the characteristic intensity of the contact exceeded $IT_D$ is shown in the increased-interaction display mode (e.g., the map object shown in 524-B of FIG. 5W is instead shown in the increased-interaction display mode, instead of the full map object).

Additional details regarding FIGS. 5A-5X (and the user interfaces shown therein) are provided below in reference to FIGS. 6A-6D.

FIGS. 6A-6D are a flow diagram depicting a method 600 of manipulating embedded interactive content (e.g., interactive user interface objects shown within a news application) in accordance with some embodiments. FIGS. 5A-5X are used to illustrate the methods and/or processes of FIGS. 6A-6D. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 4B.

In some embodiments, the method 600 is performed by an electronic device (e.g., portable multifunction device 100, FIG. 1A) and/or one or more components of the electronic device (e.g., I/O subsystem 106, operating system 126, etc.). In some embodiments, the method 600 is governed by instructions that are stored in a non-transitory computer-readable storage medium and that are executed by one or more processors of a device, such as the one or more processors 122 of device 100 (FIG. 1A). For ease of explanation, the following describes method 600 as performed by the device 100. In some embodiments, with reference to FIG. 1A, the operations of method 600 are performed by or use, at least in part, a news application (e.g., news module 142), a contact/motion module (e.g., contact/motion module 130), a graphics module (e.g., graphics module 132), a map module (e.g., map module 154), a haptic feedback module (e.g., haptic feedback module 133) in conjunction with a haptic feedback controller and a tactile output generator (e.g., 161 and 167), and a touch-sensitive display (e.g., touch-sensitive display system 112). Some operations in method 600 are, optionally, combined and/or the order of some operations is, optionally, changed.

As described below, the method 600 (and associated interfaces) reduces the number, extent, and/or nature of the inputs from a user and produces a more efficient human-machine interface for manipulating embedded interactive content, thereby providing users with easy-to-use and intuitive ways to interact with such content. For battery-operated electronic devices, allowing for efficient, seamless, and fast manipulations of embedded interactive content both conserves power and increases the time between battery charges (e.g., by reducing the requirement for extensive and inefficient user interactions that drain battery power).

The device displays (602), on a display (e.g., touch-sensitive display system 112, FIG. 1A), (i) first content (e.g., graphical content 504-B, FIG. 5A) that includes an interactive user interface object that conditionally exhibits respective interactive behavior responsive to changes in detected contact intensity and (ii) second content (e.g., textual content 504-A, FIG. 5A), distinct from the first content, that does not exhibit the (same) respective interactive behavior responsive to changes in detected contact intensity. In some embodiments, the interactive user interface object is a virtual 3D object. In some embodiments, the virtual 3D object is a map or a zoomed-in portion of a map (e.g., graphical content 504-B of FIGS. 5A-5H or graphical content 524-B of FIGS. 5S-5W) that is displayed within a scrollable electronic document or other content. In some embodiments, the scrollable electronic document is an article in a news application (e.g., news module 142, FIG. 1A) or web browsing application (e.g., browser module 147, FIG. 1A) available on the electronic device. In some embodiments, the virtual 3D object is only partially visible within the scrollable electronic document (e.g., a first portion of the virtual 3D object is currently visible within the scrollable electronic document and a second portion is not visible until the scrollable electronic document is scrolled to reveal the second portion). For example, as shown in FIG. 5A, a first portion of an interactive user interface object included within graphical content 504-B is shown and the second portion of the interactive user interface object is only visible after scrolling the scrollable electronic document, as shown in FIG. 5C. In some embodiments, the second content is text content describing or otherwise related to the interactive user interface object (e.g., 502-A of FIGS. 5A-5H, 514-A of FIGS. 5M-5Q, or 524-A of FIGS. 5S-5W).

The device detects (604) a first input by a contact while a focus selector is over the interactive user interface object on the display (e.g., contact 505, FIG. 5C). In some embodiments, the focus selector is not over the interactive user interface object when the first input by the contact is detected (e.g., the focus selector is within a region of a scrollable electronic document that is adjacent to or surrounding the interactive user interface object, such as a hidden hit region for the interactive user interface object).

In some embodiments, in accordance with a determination that the first input meets scrolling criteria, the device scrolls (606) the first content and the second content in a first direction on the display (e.g., as shown in FIGS. 5A-5C, first content 504-A and second content 504-B are scrolled in a substantially upward direction on the touch screen 112 in response to scroll input 550). In some embodiments, the scrolling criteria (608) do not require that a characteristic intensity of the contact increase above the first intensity threshold during the first input in order for the scrolling criteria to be met (e.g., a characteristic intensity of contact 550 remains below $IT_H$). In some embodiments, the content being scrolled is an electronic document. In some embodiments, scrolling the electronic document is performed in conjunction with dynamically changing a displayed view of the interactive user interface object (e.g., a virtual 3D object, such as a map object included in graphical content 504-B, as shown in FIGS. 5A-5C) to a view (or viewpoint) that moves away from an initial view (or viewpoint) of the interactive UI object. For example, while scrolling the electronic document, a pitch of a view with respect to the virtual 3D object is dynamically changed to provide a visual cue to a user of the device that the virtual 3D object is interactive (e.g., as the content scrolls in a downward direction, the pitch of the view is modified, as shown in FIGS. 5A-5C for the Eiffel Tower shown in graphical content 504-B).

In some embodiments, the scrolling criteria include a first time-based criterion that is met when a length of time in which the first input remains in contact with the touch-sensitive surface remains below a first time-based threshold. In some embodiments, the inclusion of the first time-based criterion in the scrolling criteria is mutually exclusive with the inclusion of the intensity-based criterion regarding the characteristic intensity of the contact remaining below the first intensity threshold during the first input. In some embodiments, inclusion of either criterion is determined based on the type of electronic device and/or based on availability/operability of one or more intensity sensors (e.g., the intensity-based criterion is included in accordance with a determination that the one or more sensors to detect intensity of contacts with the touch-sensitive surface are available and operable and the first time-based criterion is included in accordance with a determination that the one or more sensors to detect intensity of contacts with the touch-sensitive surface are not available and/or are not currently operable).

In some embodiments, the visual cue described above includes a preview of available intensity-based interactions (e.g., the respective interactive behavior) with the virtual 3D object. For example, in accordance with method 600, scrolling the first content and the second content includes presenting (610) on the display a preview of the respective interactive behavior of the interactive user interface object while scrolling the first content and the second content (e.g., displaying a "vitality" hint that shows a preview of the progressive intensity-based animation). For example, in FIGS. 5A-5C, the Eiffel Tower shown in graphical content 504-B tilts slightly as the first and second content are scrolled. In some embodiments, the appearance of the second content remains the same while the "vitality" hint is provided with respect to the interactive user interface object included in the first content. By providing the visual cue that indicates to a user that respective interactive behavior is available for the virtual 3D object, operability of the device 100 is enhanced and the user-device interface is made more efficient (e.g., by helping the user to provide proper inputs and reducing user mistakes when locating virtual 3D objects for which respective interactive behavior is available).

In some embodiments, presenting the preview includes tilting (612) at least one 3D feature (e.g., the Eiffel Tower) within the interactive user interface object out of a frame surrounding the interactive user interface object on the display. In other words, the tilting of the at least one 3D feature creates a visual effect in which the at least one 3D feature appears to extend out of the frame and towards a user of the electronic device (e.g., a top of the Eiffel Tower appears to extend out of touch screen 112 and towards the user).

In some embodiments, scrolling the second content includes maintaining (614) an appearance of the second content while presenting the preview of the respective interactive behavior of the interactive user interface object. In some embodiments, the second content is textual content (e.g., as shown for 504-A in FIGS. 5A-5C) and the interactive user interface element is graphical content associated with the textual content (e.g., images in a news article, such as a map object showing the Eiffel tower, as shown for 504-B in FIGS. 5A-5C). Maintaining the appearance of the second content while presenting the preview of the respective interactive behavior of the interactive user interface object provides the user with visual feedback about a portion of content for which respective interactive behavior is available. Providing such improved visual feedback to the user enhances the operability of the device and makes the user-device interface more efficient (e.g., by helping the user to quickly locate content for which respective interactive behavior is available and reducing user mistakes and errors when attempting to located content for which respective interactive behavior is available).

In accordance with a determination that the first input meets first appearance-manipulation criteria, the device performs operation 618 and optionally performs one or more of operations 622 and 624. As to operation 618, in accordance with a determination that the first input meets first appearance-manipulation criteria, the device changes (616) an appearance of the interactive user interface object based on the characteristic intensity of the contact and independent of lateral movement of the contact across the touch-sensitive surface. For example, a virtual 3D model associated with the interactive user interface object is tilted at a rate based on the magnitude of the characteristic intensity or the 3D model is tilted by an amount that corresponds to a current magnitude (or a rate of change) of the characteristic intensity. In some embodiments, the first appearance-manipulation criteria include a criterion that is met when a characteristic intensity of the contact exceeds a first intensity threshold during the first input (and does not exceed a second intensity threshold) (e.g., the first appearance-manipulation criteria require that the characteristic intensity of the contact exceed the first intensity threshold during the first input in order for the first appearance-manipulation criteria to be met).

In some embodiments, changing the appearance of the interactive user interface object in operations 616 and 618 is performed dynamically as the intensity of the contact changes. In some embodiments, changing the appearance includes displaying a predefined/pre-recorded/canned animation that is provided independently of any lateral movement of the contact across the touch-sensitive surface. In some embodiments, changing the appearance of the interactive user interface object includes displaying an animation that is adjusted (dynamically) in accordance with changes to the characteristic intensity of the contact (e.g., continuing to provide the animation as the characteristic intensity of the contact increases and decreases, yet still remains below a second intensity threshold, in a first appearance manipulation mode). In this way, a user of the electronic device is provided with a predefined intensity-activated hint that the interactive user interface object is capable of being manipulated further (e.g., in a second appearance manipulation mode).

In some embodiments, changing the appearance includes changing a displayed view of the interactive user interface object and the displayed view is changed away from an initial view of the interactive user interface object. In some embodiments, the first appearance-manipulation criteria include a criterion that is met when a length of time in which the contact in the first input remains in contact with the touch-sensitive surface exceeds a first time-based threshold (e.g., instead of an intensity-based criterion in electronic devices that do not have one or more sensors to detect intensities of contacts with the touch-sensitive surface). In some embodiments, changing the appearance of the interactive user interface object based on the characteristic intensity of the contact includes tilting (620) at least one 3D feature within the interactive user interface object out of a frame surrounding the interactive user interface object on the display. In some embodiments, tilting the at least one 3D feature creates a visual effect in which the at least one 3D feature appears to extend out of the frame and towards a user of the electronic device and optionally covers at least a portion of the second content.

Returning to optional performance of operation 622 discussed above, in accordance with a determination that the first input meets first appearance-manipulation criteria (and does not meet the second-appearance manipulation criteria), the device optionally continues to display (622) the second content while changing the appearance of the interactive user interface object. In some embodiments, the second content is gradually faded or blurred out as the appearance of the interactive user interface object is modified and the characteristic intensity of the contact gets closer to the second intensity threshold (e.g., as shown in FIGS. 5E to 5H for 504-A).

Returning to optional performance of operation 624 discussed above, in accordance with a determination that the first input meets first appearance-manipulation criteria (and does not meet the second-appearance manipulation criteria), the device optionally provides (624) first tactile output (e.g., so as to generate haptic feedback for the user) via the electronic device.

In some embodiments, after the determination that the first input meets first appearance-manipulation criteria, the device (626): detects (626-i) a decrease in the characteristic intensity of the contact such that the characteristic intensity of the contact falls below the first intensity threshold; (626-ii) and while the characteristic intensity of the contact remains below the first intensity threshold, the device detects vertical movement of the contact on the touch-sensitive surface; and, (626-iii) in response to detecting the vertical movement of the contact, scrolls the first content and the second content on the display. In some embodiments, scrolling the first content and the second content includes providing a hint that the interactive UI object has force-sensitive behaviors available. In this way, a user is able to fluidly change intensity of a contact and easily switch between modifying the appearance of the interactive object and scrolling through other content that does not exhibit the same respective interactive behavior. For example, in FIGS. 5E-5H, the device tilts the Eiffel Tower within the graphical content 504-B after detecting a contact (e.g., contact 505) that exceeds the first intensity threshold and later scrolls through the article that contains the graphical object 504-B when the detected intensity falls below the first intensity threshold and a vertical drag gesture is detected. For example, if the characteristic intensity of contact 505 is reduced to below the first intensity threshold at FIG. 5H, then a subsequent vertical drag gesture that is in a substantially downward direction while the characteristic intensity remains below the first threshold, causes the device to scroll the article to again reveal information about the Notre Dame Cathedral with content 502-A and 502-B, FIGS. 5A-5B).

In some embodiments, after changing the appearance of the interactive user interface object in accordance with the determination that the first input meets the first appearance-manipulation criteria (without meeting the second appearance-manipulation criteria), the device (628): detects (628-*i*) an end of the first input (e.g., detects liftoff of a contact from the touch-sensitive surface); and, in response to detecting the end of the first input, reverts back (628-*ii*) to the appearance of the interactive user interface object before the increase in intensity of the contact was detected. In some embodiments, the device reverses the changes to the appearance of the interactive user interface object (e.g., by providing an animation in which the changes are undone and the interactive UI object reverts to its original appearance, prior to the first input). For example, if the contact 505 is lifted-off from the touch screen 112 at FIG. 5D, then the interactive user interface object included in the graphical content 504-B reverts back to its original appearance before contact 505 was detected (e.g., FIG. 5C). In some embodiments, the changes to the appearance of the interactive user interface object are displayed over time to generate the appearance of the interactive user interface object gently falling back into place adjacent to or within the second content. Reverting back to the appearance of the interactive user interface object before the increase in intensity of the contact was detected provides the user with a clear indication of how the interactive user interface object was manipulated during the first input and easily reverts back the appearance without requiring the user to remember all changes that were made during the first input. In this way, operability of the device is enhanced and user-device interfaces are made more efficient (e.g., by reverting appearances without requiring any user assistance).

In accordance with a determination that the first input meets second appearance-manipulation criteria, the device performs operation 632 and optionally performs one or more of operations 634 and 636. As to operation 632, in accordance with a determination that the first input meets second appearance-manipulation criteria, the device changes the appearance of the interactive user interface object based on lateral movement of the contact across the touch-sensitive surface that is detected after the characteristic intensity of the contact (at least momentarily) exceeds the second intensity threshold (e.g., as shown in FIG. 5F). In some embodiments, changing the appearance of the interactive user interface object includes dynamically changing the displayed view of the interactive UI object based on the lateral movement of the contact across the touch-sensitive surface. In some embodiments, changing the appearance of the interactive user interface object includes panning the displayed view of the interactive UI object in accordance with the lateral movement of the contact (e.g., panning to the left if the lateral movement is in a substantially leftward direction, as shown in FIG. 5F). In some embodiments, the second appearance-manipulation criteria include a criterion that is met when the characteristic intensity of the contact exceeds a second intensity threshold, greater than the first intensity threshold, during the first input (e.g., the second appearance-manipulation criteria require that the characteristic intensity of the contact exceed the second intensity threshold during the first input in order for the second appearance-manipulation criteria to be met).

Returning to optional performance of operation 634, in accordance with a determination that the first input meets second appearance-manipulation criteria, the device optionally ceases (634) to display the second content. In some embodiments, instead of ceasing to display the second content, the second content is blurred (e.g., as shown in FIGS. 5E-5H for second content 504-A) and/or a display size associated with the interactive user interface object is increased.

Returning to optional performance of operation 636, the device optionally provides (636) second tactile output, via the electronic device (e.g., via one or more tactile output devices of the electronic device, such as tactile output generator 167, FIG. 1A), in accordance with the determination that the first input meets the second appearance-manipulation criteria. In some embodiments, the first and second tactile outputs are different, so that the user is provided with distinct haptic feedback depending on which appearance-manipulation criteria have been met. Providing the user with distinct haptic feedback depending on which appearance-manipulation criteria have been met provides a clear haptic signal to the user, in addition to displayed visual information, which assists the user in interacting with user interface objects for which respective interactive behavior is available. This enhances operability of the device and makes the user-device interface more efficient (e.g., by ensuring that the user is provided with a clear haptic signal as to when respective appearance-manipulation criteria have been met, so that the user is aware that different appearance-manipulation criteria have been met based on provision of differing haptic feedback). In some embodiments, the first and second tactile outputs are the same.

In some embodiments, after the determination that the first input meets the second appearance-manipulation criteria, the device detects (638-*i*) vertical movement of the contact on the touch-sensitive surface. In some embodiments, in response to detecting the vertical movement of the contact, the device changes (638-*ii*) the appearance of the interactive user interface object based on the vertical movement without scrolling the second content (e.g., as shown in FIG. 5G). For example, the device changes a pitch angle of the interactive UI object or of a model associated with the interactive UI object without scrolling the second content (e.g., textual content 504-A).

In some embodiments, after the determination that the first input meets the second appearance-manipulation criteria, the device detects (640-*i*) a decrease in the characteristic intensity of the contact such that the characteristic intensity of the contact falls below the second intensity threshold. In some embodiments, while the characteristic intensity of the contact remains below the second threshold, the device continues (640-*ii*) to change the appearance of the interactive user interface object based on lateral movement of the contact across the touch-sensitive surface (e.g., movement of the contact in the x and/or y direction along the touch-sensitive surface). In this way, after exceeding the second intensity threshold, a user is able to remain within an appearance-manipulation mode in which lateral movement of a contact still manipulates the interactive user interface object (even though intensity of the contact may later drop below the second threshold). For example, if the contact 505 dropped below $IT_L$ at FIG. 5F, then the lateral movement shown in FIG. 5F would still result in a change in appearance of the interactive user interface object.

In some embodiments, after changing the appearance of the interactive user interface object in accordance with the determination that the first input meets the second appearance-manipulation criteria (without meeting a third appearance-manipulation criteria), the device detects (642-*i*) an end of the first input (e.g., liftoff of the contact from the touch-sensitive surface). In some embodiments, in response to detecting the end of the first input, the device reverses (642-*ii*) the changes to the appearance of the interactive user interface object (e.g., by providing an animation in which the changes are undone and the interactive UI object reverts to its original appearance, prior to the first input). For example, if the contact 505 is lifted-off from the touch screen 112 at FIG. 5H, then the interactive UI object included in the graphical content 504-B is reverted back to its original appearance before contact 505 was detected (e.g., the original appearance shown for 504-B in FIG. 5C).

In some embodiments, in accordance with a determination that the first input meets third appearance-manipulation criteria, the device performs one or more of operations 646 and 648. In some embodiments, the third appearance-manipulation criteria include a criterion that is met when the characteristic intensity of the contact exceeds a third intensity threshold, greater than the first intensity threshold and greater than the second intensity threshold, during the first input. As to operation 646, in accordance with a determination that the first input meets third appearance-manipulation criteria, the device ceases (646) to display the second content and displays the interactive user interface object in an increased-interaction display mode (e.g., as shown in FIG. 5I). Ceasing to display the second content and displaying the interactive user interface object in the increased-interactive display mode provides users with a larger portion of the display with which to interact with the interactive user interface object. Providing users with a larger portion of the display with which to interact with the interactive user interface object enhances operability of the device and makes the user-device interface more efficient (e.g., by providing users with additional space with which to manipulate the interactive user interface object and then view corresponding visual effects associated with the interactive user interface object). In some embodiments, the increased-interaction display mode is a sticky display mode in which the user interface object reacts to changes in position of the contact on the touch-sensitive surface as well as changes in characteristic intensity of the contact. In some embodiments, the increased-interaction display mode is a full-screen display mode in which the interactive user interface object is increased in size to occupy a majority of or all of the display (optionally with the exception of a portion of the display that is reserved for device status information such as date, time, battery level, wireless and cellular connectivity status, and other status information).

In some embodiments, as to performance of operation 648, the device provides (648) third tactile output (e.g., third tactile output distinct from first and second tactile outputs), via the electronic device, in accordance with the determination that the first input meets the third appearance-manipulation criteria. In some embodiments, the first, second, and third tactile outputs are different from each other, so that the user is provided with distinct haptic feedback depending on which appearance-manipulation criteria have been met. Providing the user with distinct haptic feedback depending on which appearance-manipulation criteria have been met provides a clear haptic signal to the user, in addition to displayed visual information, which assists the user in interacting with user interface objects for which respective interactive behavior is available. This enhances operability of the device and makes the user-device interface more efficient (e.g., by ensuring that the user is provided with a clear haptic signal as to when respective appearance-manipulation criteria have been met, so that the user is aware that different appearance-manipulation criteria have been met based on the provision of differing haptic feedback). In some embodiments, the first, second, and third tactile outputs are the same.

In some embodiments, while displaying the interactive user interface object in the increased-interaction display mode, the device detects (650-*i*) an end of the first input (e.g., liftoff of the contact from the touch-sensitive surface). In some embodiments, in response to detecting the end of the first input, the device maintains (650-*ii*) display of the interactive user interface object in the increased-interaction display mode (e.g., as shown in FIG. 5J, contact 505 ended and the interactive user interface object remains in the increased-interaction display mode).

In some embodiments, the device receives (652) a second input (e.g., a double tap gesture or a second deep press gesture) while the interactive user interface object is displayed in the increased-interaction display mode and, in response to receiving the second input, the device exits the increased-interaction display mode and displays the interactive user interface object with the second content. For example, in response to receiving second input 509 while the interactive UI object is displayed in the increased-interaction display mode (e.g., as shown in FIG. 5K) the device exits the increased-interaction display mode and displays the interactive UI object with the second content (e.g., as shown in FIG. 5L). Exiting the increased-interaction display mode and displaying the interactive user interface object with the second content in response to the second input provides the user with a simple gesture with which to exit the increased-interaction display mode. In this way, operability of the device is enhanced and the user-device interface is made more efficient (e.g., by ensuring that users are able to easily and quickly exit the increase-interaction display mode and return to a mode in which the interactive UI object is displayed with the second content).

In some embodiments, the interactive object includes a 3D object that is associated with a first axis of rotation and a second axis of rotation and the respective interactive behavior includes rotating the 3D object about the first axis of rotation in accordance with the change in intensity of the contact without rotating the 3D object about the second axis of rotation. In these embodiments, changing the appearance of the interactive user interface object based on lateral movement of the contact across the touch-sensitive surface includes rotating the 3D object about the second axis of rotation in accordance with the lateral movement of the contact across the touch-sensitive surface.

In some embodiments, the interactive user interface object includes a 3D feature having separate component parts (e.g., first content 514-B includes a 3D feature of a birdhouse with separate component parts 516-A to 516-E). In these embodiments, changing the appearance of the interactive user interface object based on the characteristic intensity of the contact includes dynamically expanding the 3D feature to reveal at least some of the separate component parts (e.g., shown an exploded view of the 3D feature with its separate component parts, as shown in FIGS. 5M-5R). In some embodiments, dynamically expanding the 3D feature includes splitting layers apart and/or revealing more information about the 3D feature by increasing the distance between the separate component parts and/or changing a size of one or more of the separate component parts (e.g., as shown in FIGS. 5P-5Q, as the intensity of the contact 515 increases, the distance between the separate component parts 516-A to 516-E increases accordingly (thus helping users to more clearly view each of the separate component parts).

In some embodiments, the interactive user interface object includes two or more location-based identifiers (e.g., destinations or waypoints for a vacation or trip, as shown in FIG. 5S). In some embodiments, changing the appearance of the interactive user interface object based on the characteristic intensity of the contact includes updating the interactive user interface object to move between displaying each of the two or more location-based identifiers. In some embodiments, as the characteristic intensity of the contact increases, the interactive user interface object is updated to traverse through at least some of the two or more location-based identifiers (e.g., as shown in FIGS. 5S-5X).

It should be understood that the particular order in which the operations in FIG. 6A-6D have been described is merely one example and is not intended to indicate that the described order is the only order in which the operations could be performed. One of ordinary skill in the art would recognize various ways to reorder the operations described herein.

Figure 7:
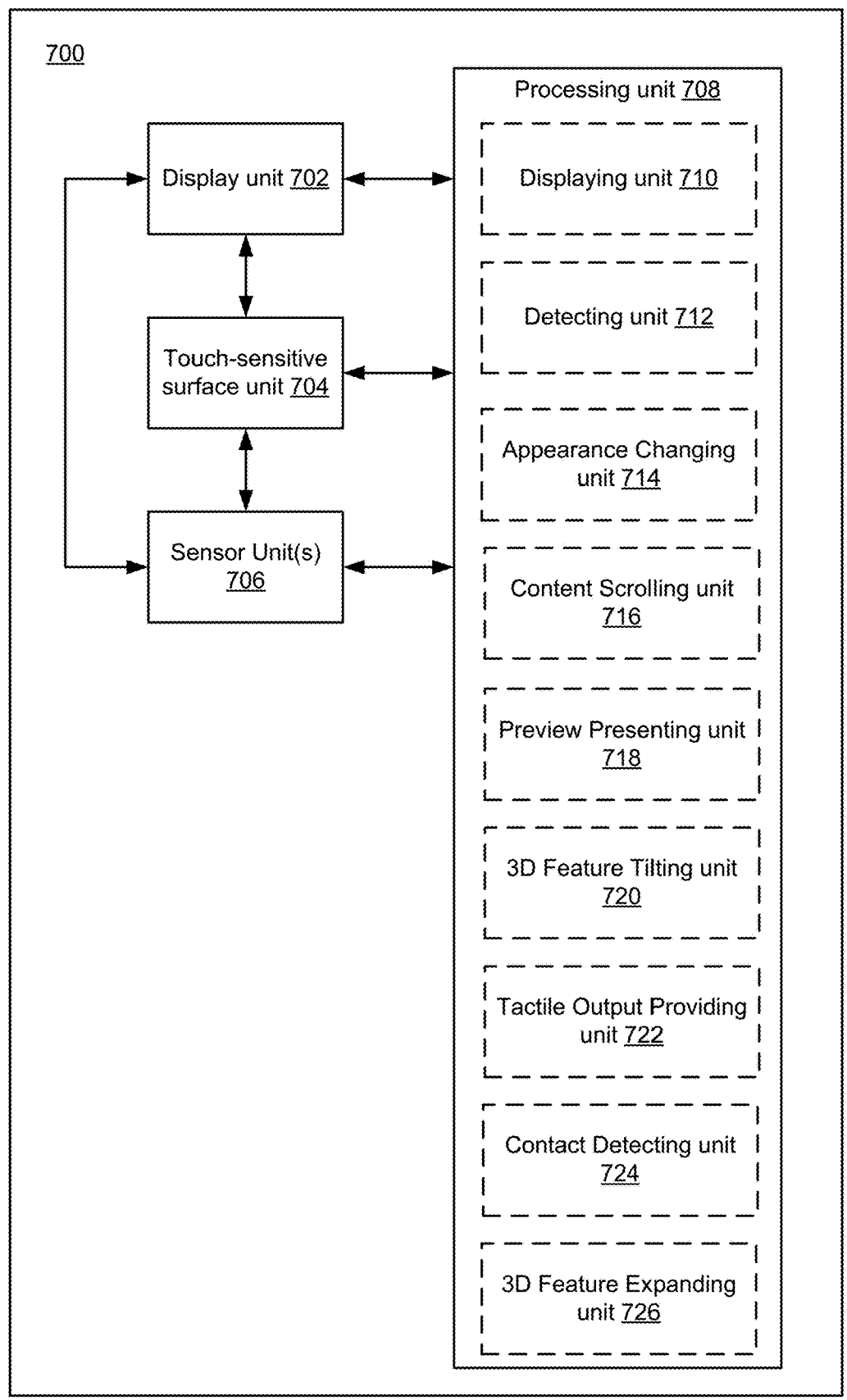
FIG. 7 is functional block diagrams of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, the electronic device 700, includes a display unit 702 configured to display information (e.g., touch-sensitive display system 112 (also referred to as a touch screen, touch-sensitive display, and touch screen display), FIG. 1A), a touch-sensitive surface unit 704 (e.g., display controller 156 and touch-sensitive display system 112, FIG. 1A) configured to receive contacts, gestures, and other user inputs on the touch-sensitive display, sensor unit(s) 706 configured to detect intensities of contact with the touch-sensitive surface unit 704, and a processing unit 708 coupled with the display unit 702, the touch-sensitive surface unit 704, and the sensor unit(s) 706. In some embodiments, the processing unit includes a displaying unit (e.g., displaying unit 710), a detecting unit (e.g., detecting unit 712), an appearance changing unit (e.g., appearance changing unit 714), a content scrolling unit (e.g., content scrolling unit 716), a preview presenting unit (e.g., preview presenting unit 718), a 3D feature tilting unit (e.g., 3D feature tilting 720), a tactile output providing unit (e.g., tactile output providing unit 722), a contact detecting unit (e.g., contact detecting unit 724), and a 3D feature expanding unit (e.g., 3D feature expanding unit 726). In some embodiments, the processing unit is configured to: display (e.g., with the displaying unit 710 in conjunction with the display unit 702), on the display: (i) first content that includes an interactive user interface object that conditionally exhibits respective interactive behavior responsive to changes in detected contact intensity, and (ii) second content, distinct from the first content, that does not exhibit the respective interactive behavior responsive to changes in detected contact intensity. The processing unit is also configured to: detect (e.g., with the contact detecting unit 724 in conjunction with the touch-sensitive surface unit 704 and/or the sensor unit(s) 706) a first input by a contact while a focus selector is over the interactive user interface object on the display. In accordance with a determination that the first input meets first appearance-manipulation criteria, the processing unit is configured to: change an appearance (e.g., with the appearance changing unit 714 in conjunction with the display unit 702) of the interactive user interface object based on the characteristic intensity of the contact and independent of lateral movement of the contact across the touch-sensitive surface. In some embodiments, the first appearance-manipulation criteria include a criterion that is met when a characteristic intensity of the contact exceeds a first intensity threshold during the first input. In accordance with a determination that the first input meets second appearance-manipulation criteria, the processing unit is configured to: change the appearance (e.g., with the appearance changing unit 714 in conjunction with the display unit 702) of the interactive user interface object based on lateral movement of the contact across the touch-sensitive surface that is detected after the characteristic intensity of the contact exceeds the second intensity threshold. In some embodiments, the second appearance-manipulation criteria include a criterion that is met when the characteristic intensity of the contact exceeds a second intensity threshold, greater than the first intensity threshold, during the first input.

In some embodiments of the device 700, the processing unit is further configured to: after the determination that the first input meets the second appearance-manipulation criteria, continue to change the appearance (e.g., with the appearance changing unit 714 in conjunction with the display unit 702) of the interactive user interface object as the characteristic intensity of the contact increases above the second intensity threshold.

In some embodiments of the device 700, the processing unit is further configured to: in accordance with the determination that the first input meets the second appearance-manipulation criteria, cease to display the second content (e.g., with the displaying unit 710 in conjunction with the display unit 702).

In some embodiments of the device 700, the processing unit is further configured to: in accordance with the determination that the first input meets the first appearance-manipulation criteria, continue to display the second content while changing the appearance (e.g., with the appearance changing unit 714 in conjunction with the display unit 702) of the interactive user interface object.

In some embodiments of the device 700, the processing unit is further configured to: in accordance with a determination that the first input meets scrolling criteria, scroll the first content and the second content in a first direction on the display (e.g., with the displaying unit 710 in conjunction with the display unit 702). In some embodiments, the scrolling criteria do not require that a characteristic intensity of the contact increase above the first intensity threshold during the first input in order for the scrolling criteria to be met.

In some embodiments of the device 700, scrolling the first content and the second content includes presenting on the display a preview of the respective interactive behavior of the interactive user interface object while scrolling the first content and the second content (e.g., with the displaying unit 710 in conjunction with the display unit 702).

In some embodiments of the device 700, presenting the preview includes tilting at least one 3D feature within the interactive user interface object out of a frame surrounding the interactive user interface object on the display (e.g., with the 3D feature tilting unit 720 in conjunction with the display unit 702).

In some embodiments of the device 700, scrolling the second content includes maintaining an appearance of the second content while presenting the preview of the respective interactive behavior of the interactive user interface object (e.g., with the appearance changing unit 714 in conjunction with the display unit 702).

In some embodiments of the device 700, changing the appearance of the interactive user interface object based on the characteristic intensity of the contact includes tilting at least one 3D feature within the interactive user interface object out of a frame surrounding the interactive user interface object on the display (e.g., with the 3D feature tilting unit 720 in conjunction with the display unit 702).

In some embodiments of the device 700, the processing unit is further configured to: provide first tactile output, via the electronic device, in accordance with the determination that the first input meets the first appearance-manipulation criteria (e.g., with the tactile output providing unit 722).

In some embodiments of the device 700, the processing unit is further configured to: after the determination that the first input meets first appearance-manipulation criteria, detect a decrease in the characteristic intensity of the contact such that the characteristic intensity of the contact falls below the first intensity threshold (e.g., with the contact detecting unit 724 in conjunction with the sensor unit(s) 706). While the characteristic intensity of the contact remains below the first intensity threshold, the processing unit is configured to: detect vertical movement of the contact on the touch-sensitive surface (e.g., with the contact detecting unit 724 in conjunction with the sensor unit(s) 706). In response to detecting the vertical movement of the contact, the processing unit is configured to: scroll the first content and the second content on the display (e.g., with the displaying unit 710 in conjunction with the display unit 702).

In some embodiments of the device 700, the processing unit is further configured to: after changing the appearance of the interactive user interface object in accordance with the determination that the first input meets the first appearance-manipulation criteria, detect an end of the first input (e.g., with the contact detecting unit 724 in conjunction with the sensor unit(s) 706). In response to detecting the end of the first input, the processing unit is configured to: revert back to the appearance of the interactive user interface object before the increase in intensity of the contact was detected (e.g., with the appearance changing unit 714 in conjunction with the display unit 702).

In some embodiments of the device 700, the processing unit is further configured to: provide second tactile output, via the electronic device, in accordance with the determination that the first input meets the second appearance-manipulation criteria (e.g., with the tactile output providing unit 722).

In some embodiments of the device 700, the processing unit is further configured to: after the determination that the first input meets the second appearance-manipulation criteria, detect a decrease in the characteristic intensity of the contact such that the characteristic intensity of the contact falls below the second intensity threshold (e.g., with the contact detecting unit 724 in conjunction with the sensor unit(s) 706). While the characteristic intensity of the contact remains below the second threshold, the processing unit is configured to: continue to change the appearance of the interactive user interface object based on lateral movement of the contact across the touch-sensitive surface (e.g., with the appearance changing unit 714 in conjunction with the display unit 702).

In some embodiments of the device 700, the processing unit is further configured to: after the determination that the first input meets the second appearance-manipulation criteria, detect vertical movement of the contact on the touch-sensitive surface (e.g., with the contact detecting unit 724 in conjunction with the sensor unit(s) 706). In response to detecting the vertical movement of the contact, the processing unit is configured to: change the appearance of the interactive user interface object based on the vertical movement without scrolling the second content (e.g., with the appearance changing unit 714 in conjunction with the display unit 702).

In some embodiments of the device 700, the processing unit is further configured to: after changing the appearance of the interactive user interface object in accordance with the determination that the first input meets the second appearance-manipulation criteria, detect an end of the first input (e.g., with the contact detecting unit 724 in conjunction with the sensor unit(s) 706). In response to detecting the end of the first input, the processing unit is configured to: reverse the changes to the appearance of the interactive user interface object (e.g., with the appearance changing unit 714 in conjunction with the display unit 702).

In some embodiments of the device 700, the processing unit is further configured to: in accordance with a determination that the first input meets third appearance-manipulation criteria, cease to display the second content and display the interactive user interface object in an increased-interaction display mode (e.g., with the displaying unit 710 and the display unit 702). In some embodiments, the third appearance-manipulation criteria include a criterion that is met when the characteristic intensity of the contact exceeds a third intensity threshold, greater than the first intensity threshold and greater than the second intensity threshold, during the first input.

In some embodiments of the device 700, the processing unit is further configured to: while displaying the interactive user interface object in the increased-interaction display mode, detect an end of the first input (e.g., with the contact detecting unit 724 in conjunction with the sensor unit(s) 706). In response to detecting the end of the first input, the processing unit is configured to: maintain display of the interactive user interface object in the increased-interaction display mode (e.g., with the displaying unit 710 and the display unit 702).

In some embodiments of the device 700, the processing unit is further configured to: provide third tactile output, via the electronic device, in accordance with the determination that the first input meets the third appearance-manipulation criteria (e.g., with the tactile output providing unit 722).

In some embodiments of the device 700, the processing unit is further configured to: receive a second input while the interactive user interface object is displayed in the increased-interaction display mode. In response to receiving the second input, the method includes: exiting the increased-interaction display mode and displaying the interactive user interface object with the second content (e.g., with the displaying unit 710 and the display unit 702).

In some embodiments of the device 700, the interactive object includes a 3D object that is associated with a first axis of rotation and a second axis of rotation; the respective interactive behavior includes rotating the 3D object about the first axis of rotation in accordance with the change in intensity of the contact without rotating the 3D object about the second axis of rotation; and changing the appearance of the interactive user interface object based on lateral movement of the contact across the touch-sensitive surface includes rotating the 3D object about the second axis of rotation in accordance with the lateral movement of the contact across the touch-sensitive surface (e.g., with the appearance changing unit 714 in conjunction with the display unit 702).

In some embodiments of the device 700, the interactive user interface object includes a 3D feature having separate component parts, and changing the appearance of the interactive user interface object based on the characteristic intensity of the contact includes dynamically expanding the 3D feature to reveal the separate component parts (e.g., with the 3D feature expanding unit 726).

In some embodiments of the device 700, the interactive user interface object includes two or more location-based identifiers, and changing the appearance of the interactive user interface object based on the characteristic intensity of the contact includes updating the interactive user interface object to move between displaying each of the two or more location-based identifiers (e.g., with the displaying unit 710 and the display unit 702).

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 6A-6D are, optionally, implemented by components depicted in FIGS. 1A-1B or FIG. 7. For example, appearance changing operations (e.g., appearance changing operation 618) and determination operations (e.g., 616) are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing one or more programs, the one or more programs comprising instructions which, when executed by an electronic device with a display, a touch-sensitive surface, and one or more sensors to detect intensities of contacts with the touch-sensitive surface, cause the electronic device to:
display, on the display:
first content that includes an interactive user interface object that conditionally exhibits respective interactive behavior responsive to changes in a detected contact characteristic, and
second content, distinct from the first content, that does not exhibit the respective interactive behavior responsive to changes in the detected contact characteristic;
detect a first input by a contact while a focus selector is over the interactive user interface object on the display;
in accordance with a determination that the first input meets first appearance-manipulation criteria, wherein the first appearance-manipulation criteria include a criterion that is met when a characteristic of the contact exceeds a first threshold during the first input, change an appearance of the interactive user interface object based on the characteristic of the contact, wherein changing the appearance of the interactive user interface object is independent of lateral movement of the contact across the touch-sensitive surface; and,
in accordance with a determination that the first input meets second appearance-manipulation criteria, wherein the second appearance-manipulation criteria include a criterion that is met when the characteristic of the contact exceeds a second threshold, greater than the first threshold, during the first input, change the appearance of the interactive user interface object based on lateral movement of the contact across the touch-sensitive surface that is detected after the characteristic of the contact exceeds the second threshold.

2. The non-transitory computer-readable storage medium of claim 1, including instructions which, when executed by the electronic device, cause the electronic device to:
after the determination that the first input meets the second appearance-manipulation criteria, continue to change the appearance of the interactive user interface object as the characteristic of the contact increases above the second threshold.

3. The non-transitory computer-readable storage medium of claim 1, including instructions which, when executed by the electronic device, cause the electronic device to:
in accordance with the determination that the first input meets the second appearance-manipulation criteria, cease to display the second content.

4. The non-transitory computer-readable storage medium of claim 1, including instructions which, when executed by the electronic device, cause the electronic device to:
in accordance with the determination that the first input meets the first appearance-manipulation criteria, continue to display the second content while changing the appearance of the interactive user interface object.

5. The non-transitory computer-readable storage medium of claim 1, including instructions which, when executed by the electronic device, cause the electronic device to:
in accordance with a determination that the first input meets scrolling criteria, wherein the scrolling criteria do not require that a characteristic of the contact increase above the first threshold during the first input in order for the scrolling criteria to be met, scroll the first content and the second content in a first direction on the display.

6. The non-transitory computer-readable storage medium of claim 5, wherein scrolling the first content and the second content includes presenting on the display a preview of the respective interactive behavior of the interactive user interface object while scrolling the first content and the second content.

7. The non-transitory computer-readable storage medium of claim 6, wherein presenting the preview includes tilting at least one 3D feature within the interactive user interface object out of a frame surrounding the interactive user interface object on the display.

8. The non-transitory computer-readable storage medium of claim 6, wherein scrolling the second content includes maintaining an appearance of the second content while presenting the preview of the respective interactive behavior of the interactive user interface object.

9. The non-transitory computer-readable storage medium of claim 1, wherein changing the appearance of the interactive user interface object based on the characteristic of the contact includes tilting at least one 3D feature within the interactive user interface object out of a frame surrounding the interactive user interface object on the display.

10. The non-transitory computer-readable storage medium of claim 1, including instructions which, when executed by the electronic device, cause the electronic device to:
provide first tactile output, via the electronic device, in accordance with the determination that the first input meets the first appearance-manipulation criteria.

11. The non-transitory computer-readable storage medium of claim 1, including instructions which, when executed by the electronic device, cause the electronic device to:
after the determination that the first input meets first appearance-manipulation criteria, detect a decrease in the characteristic of the contact such that the characteristic of the contact falls below the first threshold;
while the characteristic of the contact remains below the first threshold, detect vertical movement of the contact on the touch-sensitive surface; and,
in response to detecting the vertical movement of the contact, scroll the first content and the second content on the display.

12. The non-transitory computer-readable storage medium of claim 1, including instructions which, when executed by the electronic device, cause the electronic device to:
after changing the appearance of the interactive user interface object in accordance with the determination that the first input meets the first appearance-manipulation criteria, detect an end of the first input; and,
in response to detecting the end of the first input, revert back to the appearance of the interactive user interface object before an increase in characteristic of the contact was detected.

13. The non-transitory computer-readable storage medium of claim 1, including instructions which, when executed by the electronic device, cause the electronic device to:
provide second tactile output, via the electronic device, in accordance with the determination that the first input meets the second appearance-manipulation criteria.

14. The non-transitory computer-readable storage medium of claim 1, including instructions which, when executed by the electronic device, cause the electronic device to:
after the determination that the first input meets the second appearance-manipulation criteria, detect a decrease in the characteristic of the contact such that the characteristic of the contact falls below the second threshold; and,
while the characteristic of the contact remains below the second threshold, continue to change the appearance of the interactive user interface object based on lateral movement of the contact across the touch-sensitive surface.

15. The non-transitory computer-readable storage medium of claim 1, including instructions which, when executed by the electronic device, cause the electronic device to:
after the determination that the first input meets the second appearance-manipulation criteria, detect vertical movement of the contact on the touch-sensitive surface; and,
in response to detecting the vertical movement of the contact, change the appearance of the interactive user interface object based on the vertical movement without scrolling the second content.

16. The non-transitory computer-readable storage medium of claim 1, including instructions which, when executed by the electronic device, cause the electronic device to:
after changing the appearance of the interactive user interface object in accordance with the determination that the first input meets the second appearance-manipulation criteria, detect an end of the first input; and,
in response to detecting the end of the first input, revert back to the appearance of the interactive user interface object before an increase in the characteristic of the contact was detected.

17. The non-transitory computer-readable storage medium of claim 1, including instructions which, when executed by the electronic device, cause the electronic device to:
in accordance with a determination that the first input meets third appearance-manipulation criteria, wherein the third appearance-manipulation criteria include a criterion that is met when the characteristic of the contact exceeds a third threshold, greater than the first threshold and greater than the second threshold, during the first input, cease to display the second content and displaying the interactive user interface object in an increased-interaction display mode.

18. The non-transitory computer-readable storage medium of claim 17, including instructions which, when executed by the electronic device, cause the electronic device to:
while displaying the interactive user interface object in the increased-interaction display mode, detect an end of the first input; and,
in response to detecting the end of the first input, maintain display of the interactive user interface object in the increased-interaction display mode.

19. The non-transitory computer-readable storage medium of claim 17, including instructions which, when executed by the electronic device, cause the electronic device to:
provide third tactile output, via the electronic device, in accordance with the determination that the first input meets the third appearance-manipulation criteria.

20. The non-transitory computer-readable storage medium of claim 17, including instructions which, when executed by the electronic device, cause the electronic device to:
receive a second input while the interactive user interface object is displayed in the increased-interaction display mode; and,
in response to receiving the second input, exit the increased-interaction display mode and displaying the interactive user interface object with the second content.

21. The non-transitory computer-readable storage medium of claim 1, wherein:
the interactive user interface object includes a 3D object that is associated with a first axis of rotation and a second axis of rotation;
the respective interactive behavior includes rotating the 3D object about the first axis of rotation in accordance with the change in the characteristic of the contact without rotating the 3D object about the second axis of rotation; and
changing the appearance of the interactive user interface object based on lateral movement of the contact across the touch-sensitive surface includes rotating the 3D object about the second axis of rotation in accordance with the lateral movement of the contact across the touch-sensitive surface.

22. The non-transitory computer-readable storage medium of claim 1, wherein the interactive user interface object includes a 3D feature having separate component parts, and further wherein changing the appearance of the interactive user interface object based on the characteristic of the contact includes dynamically expanding the 3D feature to reveal the separate component parts.

23. The non-transitory computer-readable storage medium of claim 1, wherein the interactive user interface object includes two or more location-based identifiers, and further wherein changing the appearance of the interactive user interface object based on the characteristic of the contact includes updating the interactive user interface object to move between displaying each of the two or more location-based identifiers.

24. An electronic device, comprising:
a display;
a touch-sensitive surface;
one or more sensors to detect intensities of contacts with the touch-sensitive surface;
one or more processors;
memory storing one or more programs that are configured to be executed by the one or more processors, the one or more programs including instructions for:
displaying, on the display:
first content that includes an interactive user interface object that conditionally exhibits respective interactive behavior responsive to changes in a detected contact characteristic, and
second content, distinct from the first content, that does not exhibit the respective interactive behavior responsive to changes in the detected contact characteristic;
detecting a first input by a contact while a focus selector is over the interactive user interface object on the display;
in accordance with a determination that the first input meets first appearance-manipulation criteria, wherein the first appearance-manipulation criteria include a criterion that is met when a characteristic of the contact exceeds a first threshold during the first input, changing an appearance of the interactive user interface object based on the characteristic of the contact, wherein changing the appearance of the interactive user interface object is independent of lateral movement of the contact across the touch-sensitive surface; and,
in accordance with a determination that the first input meets second appearance-manipulation criteria, wherein the second appearance-manipulation criteria include a criterion that is met when the characteristic of the contact exceeds a second threshold, greater than the first threshold, during the first input, changing the appearance of the interactive user interface object based on lateral movement of the contact across the touch-sensitive surface that is detected after the characteristic of the contact exceeds the second threshold.

25. A method comprising:
at an electronic device with a display, a touch-sensitive surface, and one or more sensors to detect intensities of contacts with the touch-sensitive surface:
displaying, on the display:
first content that includes an interactive user interface object that conditionally exhibits respective interactive behavior responsive to changes in a detected contact characteristic, and
second content, distinct from the first content, that does not exhibit the respective interactive behavior responsive to changes in detected contact intensity;
detecting a first input by a contact while a focus selector is over the interactive user interface object on the display;
in accordance with a determination that the first input meets first appearance-manipulation criteria, wherein the first appearance-manipulation criteria include a criterion that is met when a characteristic of the contact exceeds a first threshold during the first input, changing an appearance of the interactive user interface object based on the characteristic of the contact, wherein changing the appearance of the interactive user interface object is independent of lateral movement of the contact across the touch-sensitive surface; and, in accordance with a determination that the first input meets second appearance-manipulation criteria, wherein the second appearance-manipulation criteria include a criterion that is met when the characteristic of the contact exceeds a second threshold, greater than the first threshold, during the first input, changing the appearance of the interactive user interface object based on lateral movement of the contact across the touch-sensitive surface that is detected after the characteristic of the contact exceeds the second threshold.

26. The non-transitory computer-readable storage medium of claim 1, wherein the detected contact characteristic is a detected contact intensity, wherein the first threshold is a first intensity threshold, and wherein the second threshold is a second intensity threshold.

27. The electronic device of claim 24, wherein the one or more programs include instructions for:
after the determination that the first input meets the second appearance-manipulation criteria, continuing to change the appearance of the interactive user interface object as the characteristic of the contact increases above the second threshold.

28. The electronic device of claim 24, wherein the one or more programs include instructions for:
in accordance with the determination that the first input meets the second appearance-manipulation criteria, ceasing to display the second content.

29. The electronic device of claim 24, wherein the one or more programs include instructions for:
in accordance with the determination that the first input meets the first appearance-manipulation criteria, continue to display the second content while changing the appearance of the interactive user interface object.

30. The electronic device of claim 24, wherein the one or more programs include instructions for:
in accordance with a determination that the first input meets scrolling criteria, wherein the scrolling criteria do not require that a characteristic of the contact increase above the first threshold during the first input in order for the scrolling criteria to be met, scroll the first content and the second content in a first direction on the display.

31. The electronic device of claim 24, wherein changing the appearance of the interactive user interface object based on the characteristic of the contact includes tilting at least one 3D feature within the interactive user interface object out of a frame surrounding the interactive user interface object on the display.

32. The electronic device of claim 24, wherein the one or more programs include instructions for:
provide first tactile output, via the electronic device, in accordance with the determination that the first input meets the first appearance-manipulation criteria.

33. The electronic device of claim 24, wherein the one or more programs include instructions for:
after the determination that the first input meets first appearance-manipulation criteria, detect a decrease in the characteristic of the contact such that the characteristic of the contact falls below the first threshold;
while the characteristic of the contact remains below the first threshold, detect vertical movement of the contact on the touch-sensitive surface; and,
in response to detecting the vertical movement of the contact, scroll the first content and the second content on the display.

34. The electronic device of claim 24, wherein the one or more programs include instructions for:
after changing the appearance of the interactive user interface object in accordance with the determination that the first input meets the first appearance-manipulation criteria, detect an end of the first input; and,
in response to detecting the end of the first input, revert back to the appearance of the interactive user interface object before an increase in characteristic of the contact was detected.

35. The electronic device of claim 24, wherein the one or more programs include instructions for:
provide second tactile output, via the electronic device, in accordance with the determination that the first input meets the second appearance-manipulation criteria.

36. The electronic device of claim 24, wherein the one or more programs include instructions for:
after the determination that the first input meets the second appearance-manipulation criteria, detect a decrease in the characteristic of the contact such that the characteristic of the contact falls below the second threshold; and,
while the characteristic of the contact remains below the second threshold, continue to change the appearance of the interactive user interface object based on lateral movement of the contact across the touch-sensitive surface.

37. The electronic device of claim 24, wherein the one or more programs include instructions for:
after the determination that the first input meets the second appearance-manipulation criteria, detect vertical movement of the contact on the touch-sensitive surface; and,
in response to detecting the vertical movement of the contact, change the appearance of the interactive user interface object based on the vertical movement without scrolling the second content.

38. The electronic device of claim 24, wherein the one or more programs include instructions for:
after changing the appearance of the interactive user interface object in accordance with the determination that the first input meets the second appearance-manipulation criteria, detect an end of the first input; and,
in response to detecting the end of the first input, revert back to the appearance of the interactive user interface object before an increase in the characteristic of the contact was detected.

39. The electronic device of claim 24, wherein the one or more programs include instructions for:
in accordance with a determination that the first input meets third appearance-manipulation criteria, wherein the third appearance-manipulation criteria include a criterion that is met when the characteristic of the contact exceeds a third threshold, greater than the first threshold and greater than the second threshold, during the first input, cease to display the second content and displaying the interactive user interface object in an increased-interaction display mode.

40. The electronic device of claim 24, wherein:
the interactive user interface object includes a 3D object that is associated with a first axis of rotation and a second axis of rotation;
the respective interactive behavior includes rotating the 3D object about the first axis of rotation in accordance with the change in the characteristic of the contact without rotating the 3D object about the second axis of rotation; and
changing the appearance of the interactive user interface object based on lateral movement of the contact across the touch-sensitive surface includes rotating the 3D object about the second axis of rotation in accordance with the lateral movement of the contact across the touch-sensitive surface.

41. The electronic device of claim 24, wherein the interactive user interface object includes a 3D feature having separate component parts, and further wherein changing the appearance of the interactive user interface object based on the characteristic of the contact includes dynamically expanding the 3D feature to reveal the separate component parts.

42. The electronic device of claim 24, wherein the interactive user interface object includes two or more location-based identifiers, and further wherein changing the appearance of the interactive user interface object based on the characteristic of the contact includes updating the interactive user interface object to move between displaying each of the two or more location-based identifiers.

43. The electronic device of claim 24, wherein the detected contact characteristic is a detected contact intensity, wherein the first threshold is a first intensity threshold, and wherein the second threshold is a second intensity threshold.

\* \* \* \* \*